(12) United States Patent
Nomura et al.

(10) Patent No.: US 7,719,225 B2
(45) Date of Patent: May 18, 2010

(54) OPTICAL IMAGE STABILIZER AND A METHOD OF CONTROLLING THE OPTICAL IMAGE STABILIZER

(75) Inventors: Hiroshi Nomura, Saitama (JP); Shinichi Kakiuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 812 days.

(21) Appl. No.: 11/341,446

(22) Filed: Jan. 30, 2006

(65) Prior Publication Data

US 2006/0170388 A1    Aug. 3, 2006

(30) Foreign Application Priority Data

Jan. 31, 2005  (JP) .............................. 2005-022417
Jan. 31, 2005  (JP) .............................. 2005-022418

(51) Int. Cl.
*G05B 19/40* (2006.01)

(52) U.S. Cl. .................. 318/685; 318/611; 348/208.99; 348/208.4; 396/52; 396/55

(58) Field of Classification Search ................. 318/685, 318/560, 611, 599; 348/208.99, 208.4; 396/52, 396/55

See application file for complete search history.

(56) References Cited

U.S. PATENT DOCUMENTS

| | | | | |
|---|---|---|---|---|
| 4,462,671 A | * | 7/1984 | Suzuki et al. ................. | 396/54 |
| 4,970,540 A | * | 11/1990 | Vasey et al. .................... | 396/55 |
| 5,020,369 A | * | 6/1991 | Washisu et al. ........... | 73/514.02 |
| 5,117,246 A | * | 5/1992 | Takahashi et al. ............. | 396/55 |
| 5,144,359 A | | 9/1992 | Hayashi et al. | |
| 5,172,150 A | * | 12/1992 | Teramoto et al. .............. | 396/55 |
| 5,623,704 A | | 4/1997 | Miyamoto et al. | |
| 5,672,862 A | * | 9/1997 | Ohara et al. ................. | 250/204 |
| 5,831,671 A | | 11/1998 | Chigira et al. | |
| 5,850,575 A | * | 12/1998 | Ohishi ......................... | 396/52 |
| 5,861,915 A | | 1/1999 | Sato et al. | |

(Continued)

FOREIGN PATENT DOCUMENTS

CN    1140949    1/1997

(Continued)

OTHER PUBLICATIONS

English Language Abstract of JP 2000-009465.

(Continued)

*Primary Examiner*—Bentsu Ro
*Assistant Examiner*—Antony M Paul
(74) *Attorney, Agent, or Firm*—Greenblum & Bernstein, P.L.C.

(57) ABSTRACT

An optical image stabilizer includes an optical system including at least one image shake counteracting optical element movable in a plane orthogonal to an optical axis; at least one stepping motor for moving the image shake counteracting optical element in the plane; at least one shake velocity sensor which senses the speed of shake applied to the optical system; and a controller which calculates the number of driving pulses for the stepping motor based on shake speed information output from the shake velocity sensor, and drives the stepping motor so that the image shake counteracting optical element moves in the plane to counteract image shake on an imaging surface of the optical system. The controller changes power supplied to the stepping motor in accordance with the shake speed information when driving the stepping motor.

29 Claims, 32 Drawing Sheets

U.S. PATENT DOCUMENTS

| | | | |
|---|---|---|---|
| 5,995,762 A | 11/1999 | Enomoto et al. | |
| 6,070,016 A * | 5/2000 | Kaneda | 396/64 |
| 6,112,028 A * | 8/2000 | Okada | 396/55 |
| 6,137,252 A | 10/2000 | Kojima et al. | |
| 6,181,875 B1 | 1/2001 | Hamada et al. | |
| 6,208,810 B1 * | 3/2001 | Imada | 396/55 |
| 6,226,124 B1 * | 5/2001 | Enomoto et al. | 359/557 |
| 6,332,060 B1 | 12/2001 | Miyamoto et al. | |
| 6,374,048 B1 * | 4/2002 | Uenaka et al. | 396/52 |
| 6,456,789 B1 * | 9/2002 | Uenaka | 396/55 |
| 6,630,950 B1 * | 10/2003 | Ohkawara et al. | 348/208.12 |
| 6,778,768 B2 * | 8/2004 | Ohkawara et al. | 396/55 |
| 7,088,512 B2 * | 8/2006 | Haga | 359/554 |
| 2001/0030275 A1 | 10/2001 | Tsukamoto et al. | |
| 2002/0015237 A1 | 2/2002 | Shirai | |
| 2004/0085464 A1 | 5/2004 | Higurashi et al. | |

FOREIGN PATENT DOCUMENTS

| | | |
|---|---|---|
| CN | 1216877 | 5/1999 |
| JP | 57-000811 | 1/1982 |
| JP | 58-62330 | 4/1983 |
| JP | 3-274032 | 12/1991 |
| JP | 6-265962 | 9/1994 |
| JP | 7-191358 | 7/1995 |
| JP | 7-234429 | 9/1995 |
| JP | 11-95128 | 4/1999 |
| JP | 11-341318 | 12/1999 |
| JP | 2000-009465 | 1/2000 |
| JP | 2001-317940 | 11/2001 |

OTHER PUBLICATIONS

English Language Abstract of JP 2001-317940.
U.S. Appl. No. 11/289,602 to Nomura, filed Nov. 30, 2005.
U.S. Appl. No. 11/289,481 to Nomura, filed Nov. 30, 2005.
U.S. Appl. No. 11/289,558 to Nomura, filed Nov. 30, 2005.
U.S. Appl. No. 11/289,601 to Nomura, filed Nov. 30, 2005.
U.S. Appl. No. 11/289,739 to Nomura, filed Nov. 30, 2005.
English Language Abstract of JP 7-191358.
English Language Abstract of JP 3-274032.
English Language Abstract of JP 6-265962.
English language Abstract of CN 1216877, May 19, 1999.
English language Abstract of CN 1140949, Jan. 22, 1997.
English language Abstract of JP 7-234429, Sep. 5, 1995.

* cited by examiner

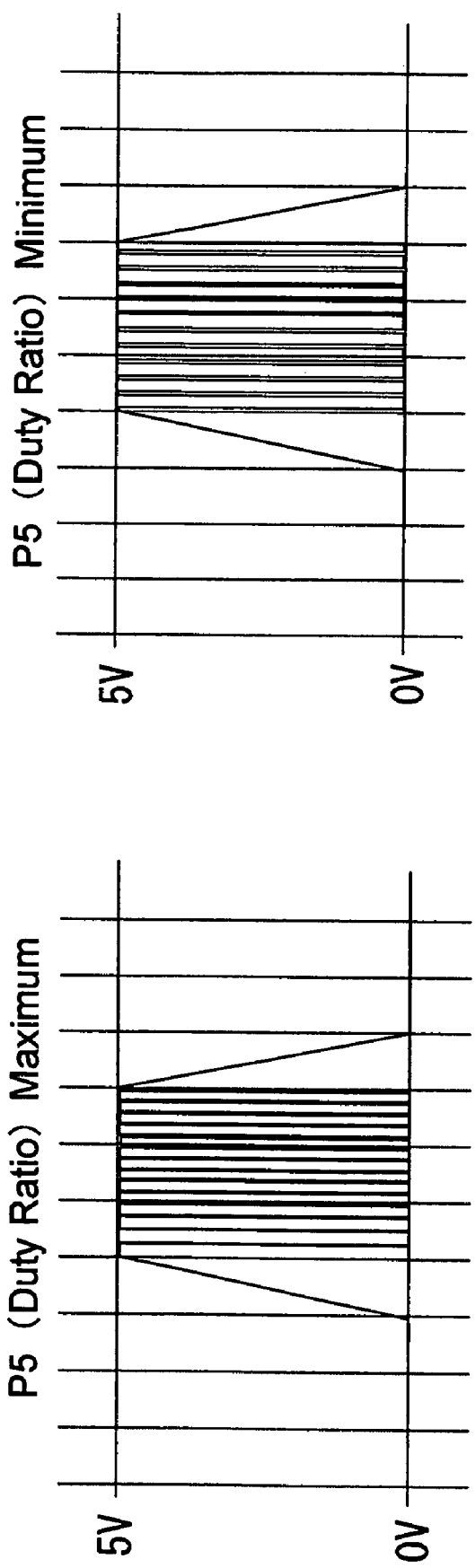

OPTICAL IMAGE STABILIZER AND A METHOD OF CONTROLLING THE OPTICAL IMAGE STABILIZER

BACKGROUND OF THE INVENTION

1. Field of the Invention

The present invention relates to an optical image stabilizer for an optical instrument and a method of controlling an optical image stabilizer incorporated in an optical instrument.

2. Description of the Related Art

This type of optical image stabilizer for an optical instrument typically operates to stabilize an object image on an imaging surface (imaging plane) by moving a part of an optical system of the optical instrument relative to the optical axis of the optical system in accordance with vibrations applied to the body of the optical instrument, and has often been incorporated especially in a digital camera or a pair of binoculars in recent years.

In a mobile optical instrument such as digital camera and binoculars, there has been a strong demand for an extension of a battery lifetime. Accordingly, there has been a demand for a reduction of power consumption of even the optical image stabilizer. Different types of drive sources such as a drive coil and a stepping motor (pulse motor) have been proposed as a drive source for moving an image-stabilizing optical element in the optical image stabilizer. In the case of a drive coil, the drive coil needs to be energized even when the image-stabilizing optical element is in a halted state in the drive-coil-using optical image stabilizer, whereas a stepping-motor-using optical image stabilizer has an advantage in that the image-stabilizing optical element can be halted without supplying power to the stepping motor when no image stabilizing operation is performed. Nevertheless, the power consumption of the stepping motor tends to be greater than that of the drive coil during an image-stabilizing operation.

SUMMARY OF THE INVENTION

The present invention provides a low-power-consumption optical image stabilizer using at least one stepping motor as a drive source for moving an image-stabilizing optical element. The prevent invention further provides a method of controlling such an optical image stabilizer so as to consume less power.

According to an aspect of the present invention, an optical image stabilizer is provided, including an optical system including at least one image shake counteracting optical element movable in a plane orthogonal to an optical axis; at least one stepping motor for moving the image shake counteracting optical element in the plane; at least one shake velocity sensor which senses the speed of shake applied to the optical system; and a controller which calculates the number of driving pulses for the stepping motor based on shake speed information output from the shake velocity sensor, and drives the stepping motor so that the image shake counteracting optical element moves in the plane to counteract image shake on an imaging surface of the optical system. The controller changes power supplied to the stepping motor in accordance with the shake speed information when driving the stepping motor.

It is desirable for the controller to change a driving voltage for the stepping motor in accordance with the shake speed information that is output from the shake velocity sensor.

It is desirable for the controller to change a pulse width of time-divided pulses obtained as a result of time-dividing each unit pulse in accordance with the shake speed information that is output from the shake velocity sensor.

It is desirable for the controller to change a frequency of time-divided pulses obtained as a result of time-dividing each unit pulse in accordance with the shake speed information that is output from the shake velocity sensor.

It is desirable for the optical image stabilizer to include a temperature sensor, wherein the controller changes the power supplied to the stepping motor in accordance with the shake speed information that is output from the shake velocity sensor and temperature information output from the temperature sensor.

It is desirable for the shake velocity sensor to be an angular velocity sensor.

It is desirable for the stepping motor to include a first stepping motor and a second stepping motor for moving the image shake counteracting optical element in the plane in two directions intersecting each other, respectively, and for the controller to change power supplied to each of the first stepping motor and the second stepping motor in accordance with the shake speed information that is output from the shake velocity sensor.

It is desirable for the image shake counteracting optical element to include an image sensor.

In an embodiment, an optical image stabilizer is provided, including an optical system including at least one image shake counteracting optical element movable in a plane orthogonal to an optical axis; at least one stepping motor for moving the image shake counteracting optical element in the plane; at least one shake velocity sensor which senses the speed of shake applied to the optical system; and a controller which calculates the number of driving pulses for the stepping motor based on shake speed information output from the shake velocity sensor, and drives the stepping motor so that the image shake counteracting optical element moves in the plane to counteract image shake on an imaging surface of the optical system. The controller changes power supplied to the stepping motor in accordance with the number of driving pulses for the stepping motor per unit of time when driving the stepping motor.

It is desirable for the controller to change a driving voltage for the stepping motor in accordance with the number of driving pulses per unit of time.

It is desirable for the controller to change a pulse width of time-divided pulses obtained as a result of time-dividing each unit pulse in accordance with the number of driving pulses per unit of time.

It is desirable for the controller to change a frequency of time-divided pulses obtained as a result of time-dividing each unit pulse in accordance with the number of driving pulses per unit of time.

It is desirable for the optical image stabilizer to include a temperature sensor, wherein the controller changes the power supplied to the stepping motor in accordance with the number of driving pulses per unit of time and temperature information output from the temperature sensor.

It is desirable for the shake velocity sensor to be an angular velocity sensor.

It is desirable for the stepping motor to include a first stepping motor and a second stepping motor for moving the image shake counteracting optical element in the plane in two directions intersecting each other, respectively, and for the controller to change power supplied to each of the first stepping motor and the second stepping motor in accordance with the number of driving pulses per unit of time.

It is desirable for the image shake counteracting optical element to include an image sensor.

In an embodiment, a method of controlling an optical image stabilizer is provided, which moves at least one image shake counteracting optical element of an optical system in a plane orthogonal to an optical axis by at least one stepping motor in a manner so as to counteract image shake on an imaging surface of the optical system, wherein the method includes detecting the speed of shake applied to the optical system; setting a power level supplied to the stepping motor in accordance with information on the shake speed; calculating the number of driving pulses for the stepping motor based on the information on the shake speed; and driving the stepping motor at the power level.

In an embodiment, a method of controlling an optical image stabilizer is provided, which moves at least one image shake counteracting optical element of an optical system in a plane orthogonal to an optical axis by at least one stepping motor in a manner so as to counteract image shake on an imaging surface of the optical system, wherein the method includes detecting the speed of shake applied to the optical system; calculating the number of driving pulses for the stepping motor based on information on the shake speed; setting a power level supplied to the stepping motor in accordance with the number of driving pulses per unit of time; and driving the stepping motor at the power level.

In an embodiment, an optical image stabilizer is provided, including an optical system including at least one image shake counteracting optical element movable in a plane orthogonal to an optical axis; at least one stepping motor for moving the image shake counteracting optical element in the plane; a controller which senses the speed of shake applied to the optical system, calculates the number of driving pulses for the stepping motor based on information on the shake speed, and drives the stepping motor so that the image shake counteracting optical element moves in the plane to counteract image shake on an imaging surface of the optical system; and a focal length detector which detects a focal length of the optical system. The controller changes power supplied to the stepping motor in accordance with information on the focal length of the optical system, which is detected by the focal length detector, when driving the stepping motor.

It is desirable for the controller to change a driving voltage for the stepping motor in accordance with the information on the focal length of the optical system.

It is desirable for the controller to change a pulse width of time-divided pulses obtained as a result of time-dividing each unit pulse in accordance with the information on the focal length of the optical system.

It is desirable for the controller to change a frequency of time-divided pulses obtained as a result of time-dividing each unit pulse in accordance with the information on the focal length of the optical system.

It is desirable for the optical image stabilizer to include a temperature sensor, wherein the controller changes the power supplied to the stepping motor in accordance with the information on the focal length of the optical system and temperature information output from the temperature sensor.

It is desirable for the controller to decrease the power supplied to the stepping motor as the focal length of the optical system becomes shorter.

The optical system can be a zoom lens.

It is desirable for the optical system to include a fixed-focal-length interchangeable lens selected from among a plurality of fixed-focal-length interchangeable lenses having different focal lengths.

It is desirable for the stepping motor to include a first stepping motor and a second stepping motor for moving the image shake counteracting optical element in the plane in two directions intersecting each other, respectively, and for the controller to change power supplied to each of the first stepping motor and the second stepping motor in accordance with the information on the focal length of the optical system.

It is desirable for the image shake counteracting optical element to include an image sensor.

In an embodiment, a method of controlling an optical image stabilizer is provided, which moves at least one image shake counteracting optical element of an optical system in a plane orthogonal to an optical axis by at least one stepping motor in a manner so as to counteract image shake on an imaging surface of the optical system, wherein the method includes detecting focal length of the optical system; detecting the speed of shake applied to the optical system; calculating the number of driving pulses for the stepping motor based on information on the shake speed and information on the focal length of the optical system; setting a power level supplied to the stepping motor in accordance with the information on the focal length of the optical system when driving the stepping motor; and driving the stepping motor at the power level.

According to an aspect of the optical image stabilizer and the method of controlling the optical image stabilizer, power consumption can be reduced with no deterioration in performance of the optical image stabilizer by varying power supplied to the stepping motor in accordance with conditions such as angular velocity information and the number of driving pulses.

According to another aspect of the optical image stabilizer and the method of controlling the optical image stabilizer, power consumption can be reduced with no deterioration in performance of the optical image stabilizer by varying power supplied to the stepping motor in accordance with information on focal length of the optical system.

The present disclosure relates to subject matter contained in Japanese Patent Applications Nos. 2005-22417 and 2005-22418 (both filed on Jan. 31, 2005), which are expressly incorporated herein by reference in their entireties.

BRIEF DESCRIPTION OF THE DRAWINGS

The present invention will be described below in detail with reference to the accompanying drawings in which:

FIG. 26A is a waveform chart showing variations of the waveform of a driving pulse in the case where the duty ratio in time-divided pulses is set to a maximum ratio;

FIG. 26B is a waveform chart showing variations of the waveform of a driving pulse in the case where the duty ratio in time-divided pulses is set to a minimum ratio;

DESCRIPTION OF THE PREFERRED EMBODIMENTS

Figure 1:
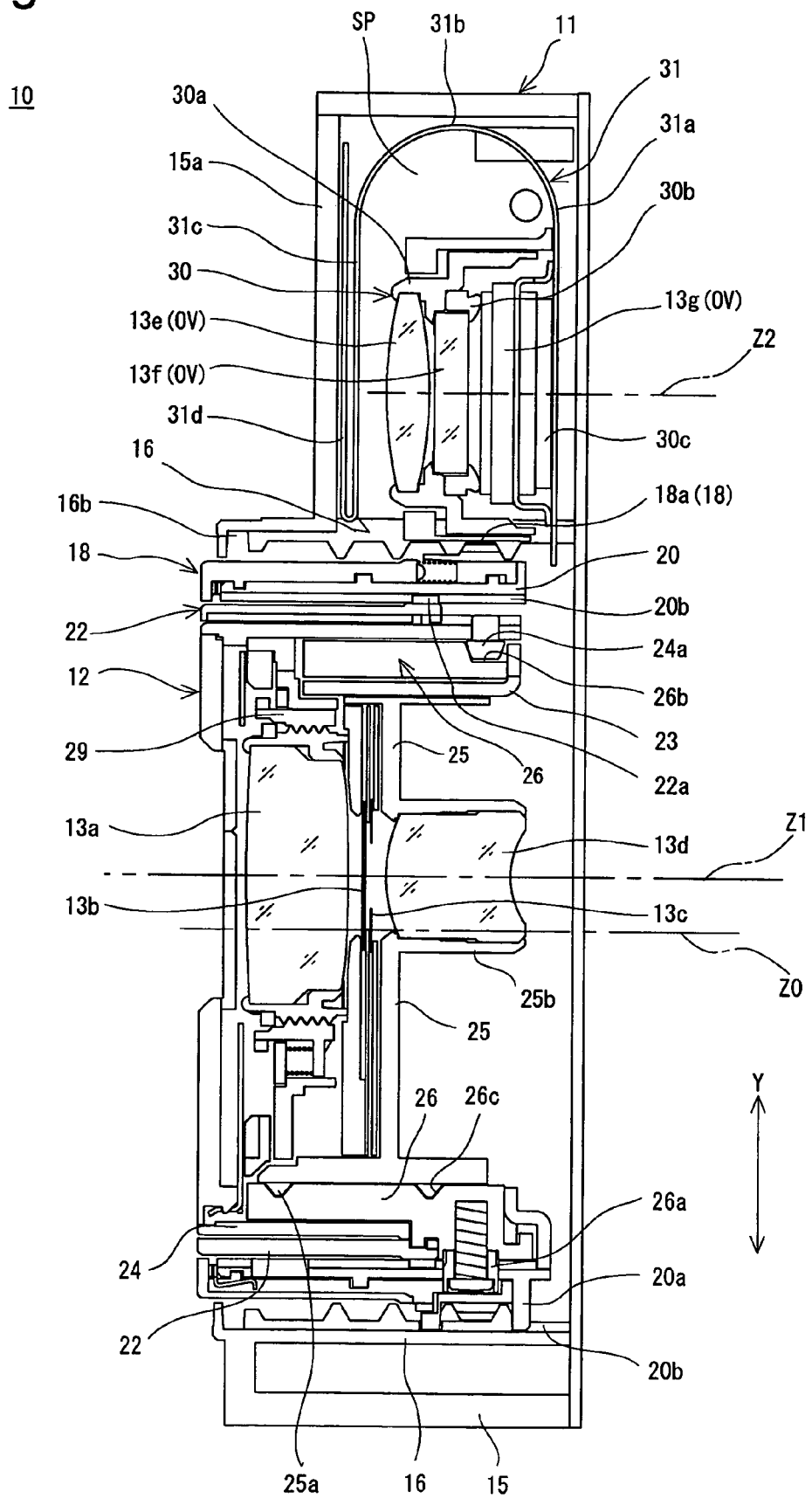
FIG. 1 is a cross-sectional view of an embodiment of a retractable zoom lens to which the present invention is applied in the retracted state of the zoom lens barrel.
Figure 2:
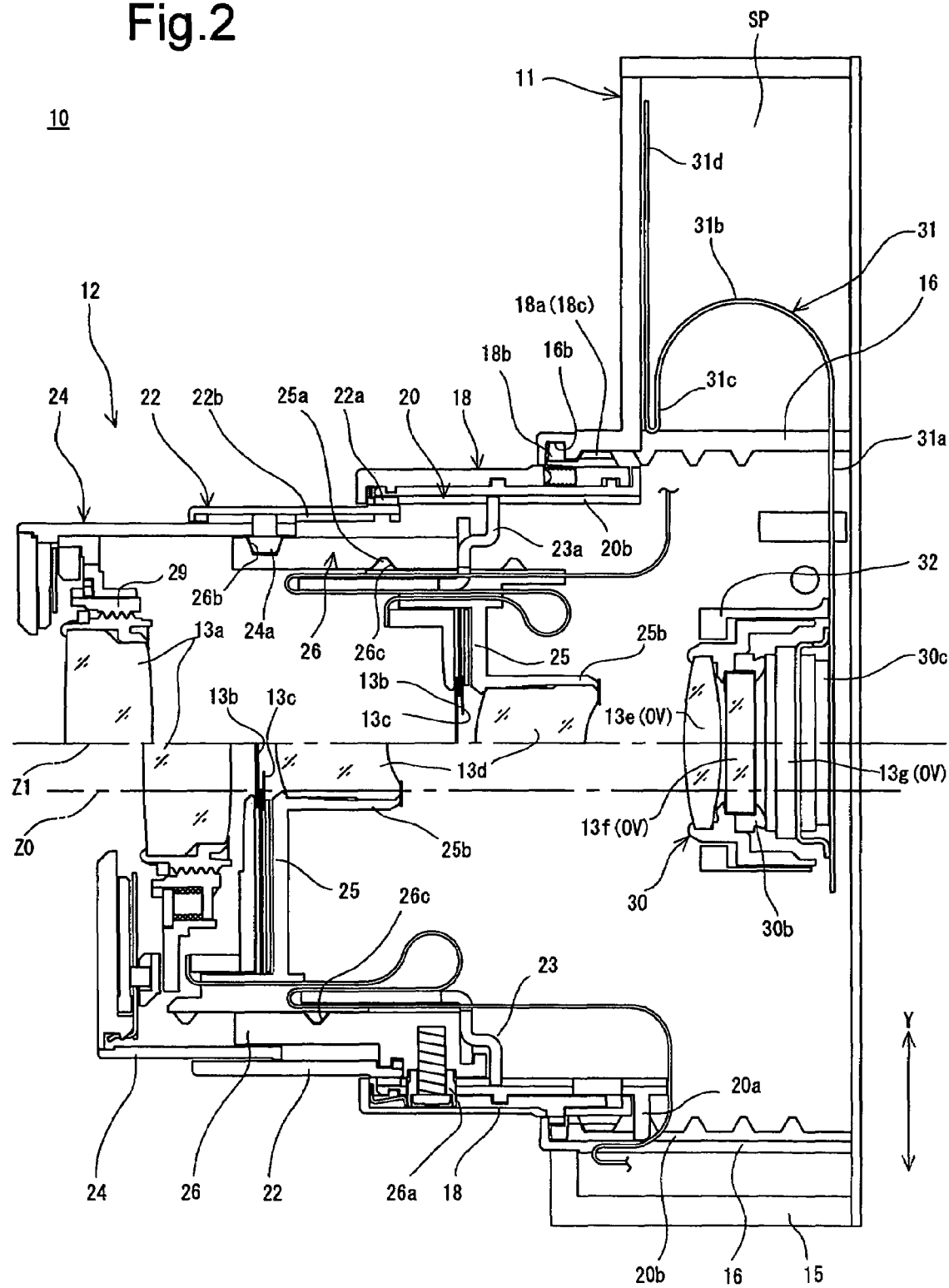
FIG. 2 is a cross-sectional view of the zoom lens shown in FIG. 1 in a photographic state of the zoom lens.
Figure 5:
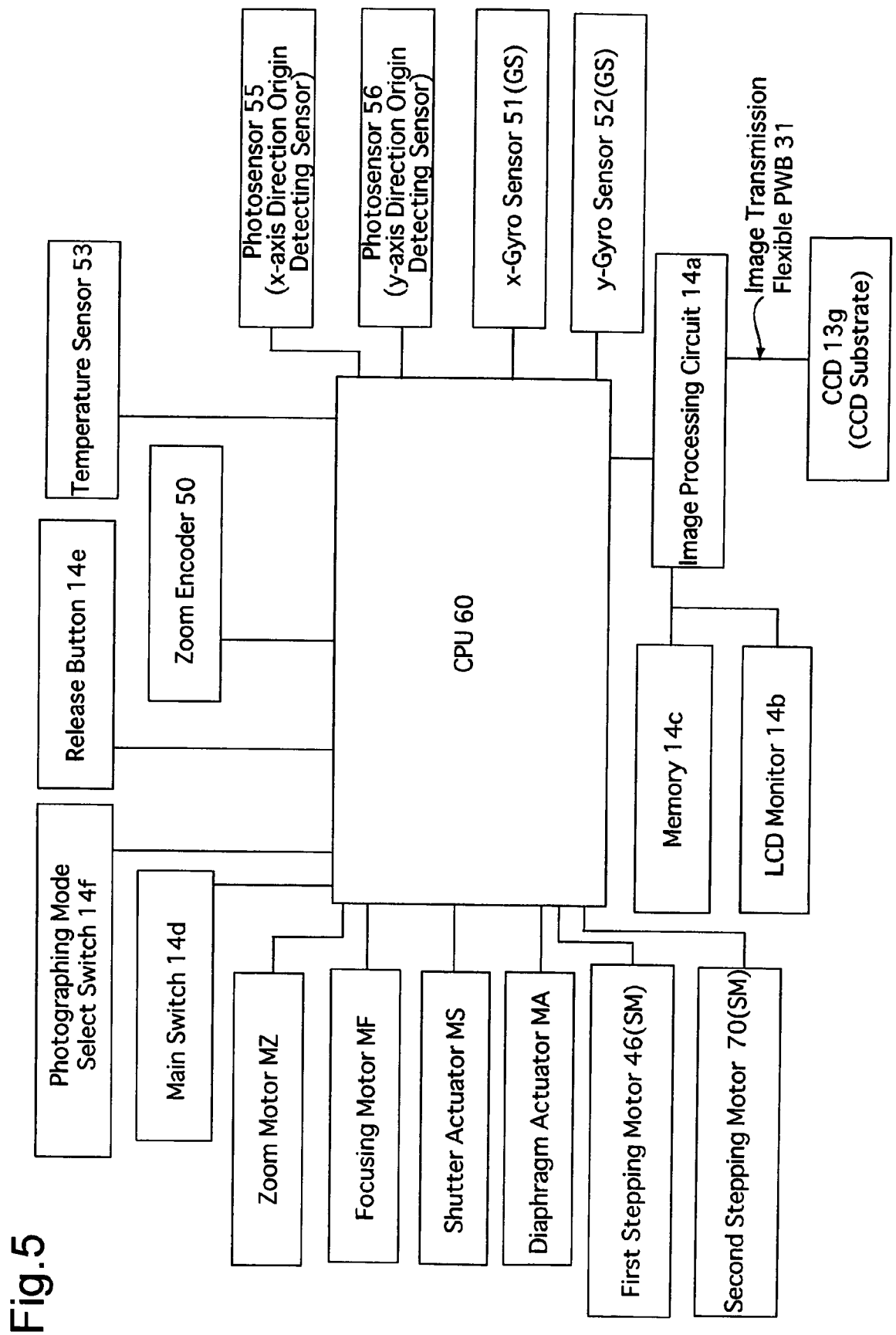
FIG. 5 is a block diagram illustrating a configuration of electrical circuits of a camera equipped with the zoom lens shown in FIGS. 1 and 2.

FIGS. 1 and 2 show cross-sections of a zoom lens 10 which is incorporated in a zoom lens camera. The zoom lens 10 is provided with a box-shaped housing 11 and a retractable barrel portion 12 retractably supported inside the housing 11. The outside of the housing 11 is covered by exterior components of the camera; the exterior components are not shown in the drawings. A photographing optical system of the zoom lens 10 includes a first lens group 13a, a shutter 13b, a diaphragm 13c, a second lens group 13d, a third lens group (radially-retractable optical element/image-stabilizing optical element) 13e, a low-pass filter (radially-retractable optical element/image-stabilizing optical element) 13f, and a CCD image sensor (radially-retractable optical element/image-stabilizing optical element) 13g (hereinafter referred to as a CCD), in that order from the object side (the left side as viewed in FIGS. 1 and 2). As shown in FIG. 5, the CCD 13g is electrically connected to an image processing circuit 14a. Under the control of a CPU (controller) 60 (see FIG. 5), an electronic image can be displayed on an LCD monitor 14b via the image processing circuit 14a while the electronic image data can be recorded in a memory 14c. The LCD monitor 14b is provided on an outer surface of the camera. In a photographic state (ready-to-photograph state) of the zoom lens 10 shown in FIG. 2, all of the optical elements constituting the photographing optical system are aligned on the same photographing optical axis (common optical axis of the photographing optical system) Z1. On the other hand, in an accommodated (radially retracted) state of the zoom lens 10 shown in FIG. 1, the third lens group 13e, the low-pass filter 13f and the CCD 13g are moved away from the photographing optical axis Z1 to be radially retracted upward in the housing 11, and the second lens group 13d is linearly retracted into the space created as a result of the upward radial retracting movement of the third lens group 13e, the low-pass filter 13f and the CCD 13g, which reduces the length of the zoom lens 10 in the retracted state thereof. The overall structure of the zoom lens 10 that includes a radially-retracting mechanism for radially retracting optical elements upward will be described hereinafter. In the following description, the vertical direction and the horizontal direction of the zoom lens camera body equipped with the zoom lens 10 as viewed from the front thereof are defined as a y-axis and an x-axis, respectively.

The housing 11 is provided with a hollow box-shaped portion 15 and a hollow fixed ring portion 16 which is formed on a front wall 15a of the box-shaped portion 15 so as to enclose the photographing optical system about the photographing optical axis Z1. A rotation center axis Z0 serving as the center of the fixed ring portion 16 is parallel to the photographing optical axis Z1 and eccentrically located below the photographing optical axis Z1. A retraction space (accommodation space) SP (FIGS. 1 and 2) is formed inside the box-shaped portion 15 and above the fixed ring portion 16.

Figure 8:
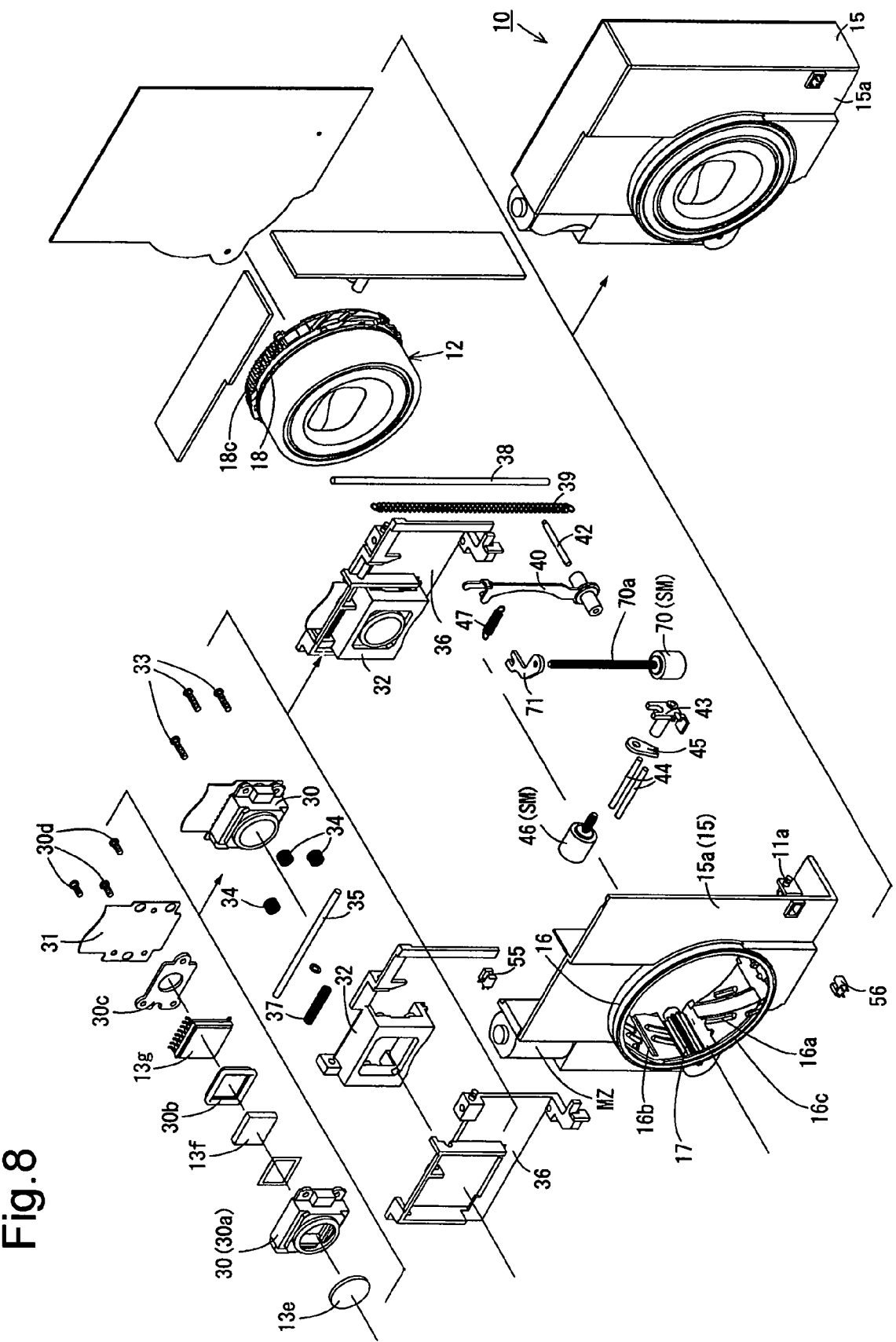
FIG. 8 is an exploded perspective view of the zoom lens shown in FIGS. 1 and 2.

A zoom gear 17 (FIGS. 8, 10 and 11) is supported on an inner peripheral surface side of the fixed ring portion 16 to be rotatable on an axis of rotation parallel to the rotation center axis Z0. The zoom gear 17 is rotated forward and reverse by a zoom motor MZ (FIGS. 5, 10, and 11) supported by the housing 11. In addition, the fixed ring portion 16 is provided on an inner peripheral surface thereof with a female helicoid 16a, a circumferential groove 16b and a plurality of linear guide grooves 16c (only one of them is shown in FIG. 8). The circumferential groove 16b is an annular groove with its center on the rotation center axis Z0, while the plurality of the linear guide grooves 16c are parallel to the rotation center axis Z0 (see FIGS. 3, 4 and 8).

Figure 10:
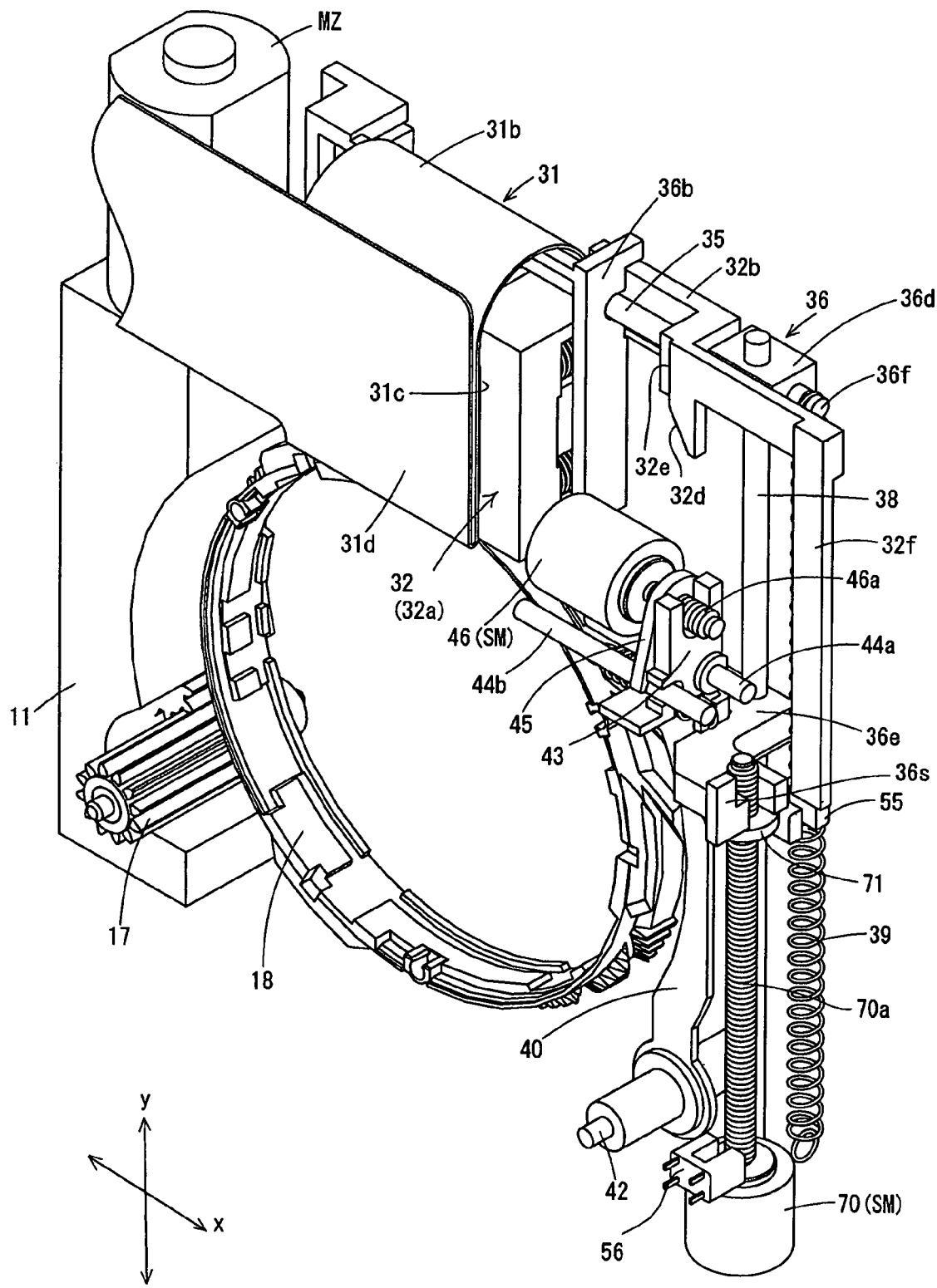
FIG. 10 is a front perspective view of the image stabilizing mechanism and the radially-retracting mechanism, illustrating the retracted state of a CCD holder in the retracted state of the zoom lens shown in FIG. 1.
Figure 11:
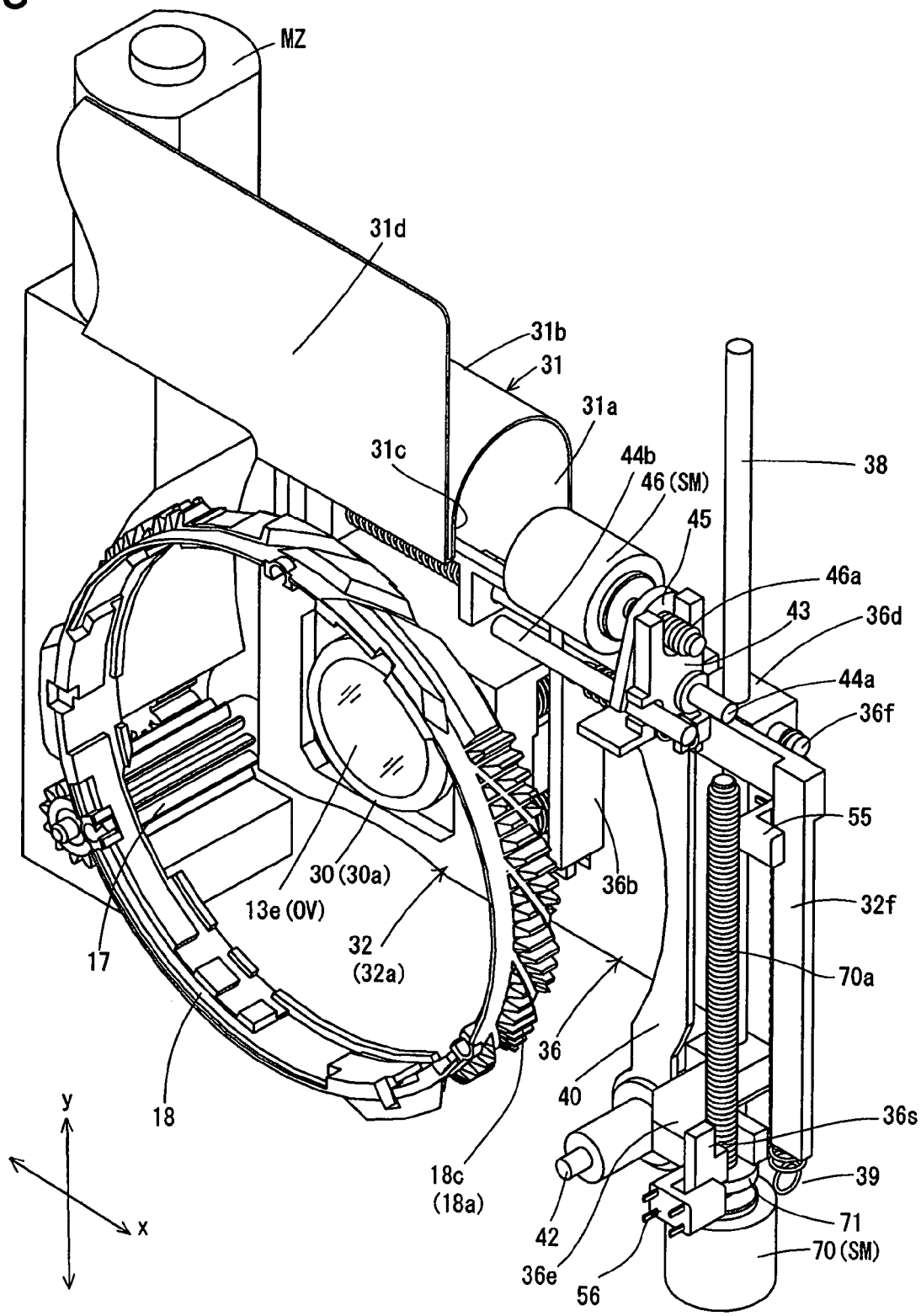
FIG. 11 is a front perspective view of the image stabilizing mechanism and the radially-retracting mechanism, illustrating the optical-axis advanced state of the CCD holder in a photographic state of the zoom lens.

A helicoid ring 18 is supported inside the fixed ring portion 16 to be rotatable about the rotation center axis Z0. The helicoid ring 18 is provided with a male helicoid 18a which is engaged with the female helicoid 16a of the fixed ring portion 16 and thus can advance and retract in the optical axis direction while rotating due to the engagement of the female helicoid 16a with the male helicoid 18a. The helicoid ring 18 is further provided, on an outer peripheral surface thereof in front of the male helicoid 18a, with a plurality of rotation guiding protrusions 18b (only two of them are shown in FIG. 8). In a state shown in FIGS. 2 through 4 in which the helicoid ring 18 advances to the frontmost position thereof with respect to the fixed ring portion 16, the female helicoid 16a and the male helicoid 18a are disengaged from each other while the plurality of rotation guiding protrusions 18b are slidably fitted in the circumferential groove 16b so that the helicoid ring 18 is prevented from further moving in the optical axis direction and is allowed only to rotate at a fixed position in the optical axis direction. The helicoid ring 18 is further provided on threads of the male helicoid 18a with an annular spur gear 18c which is in mesh with the zoom gear 17. Teeth of the spur gear 18c are aligned parallel to the photographing optical axis Z1. The zoom gear 17 is elongated in the axial direction thereof so as to remain engaged with the spur gear 18c at all times over the entire range of movement of the helicoid ring 18 from a retracted state of the helicoid ring 18 shown in FIGS. 1 and 10 to an extended state of the helicoid ring 18 shown in FIGS. 2 and 11. The helicoid ring 18 is constructed by combining two ring members which are splittable in the optical axis direction. In FIGS. 10 and 11, only the rear ring member of the helicoid ring 18 is shown.

Figure 3:
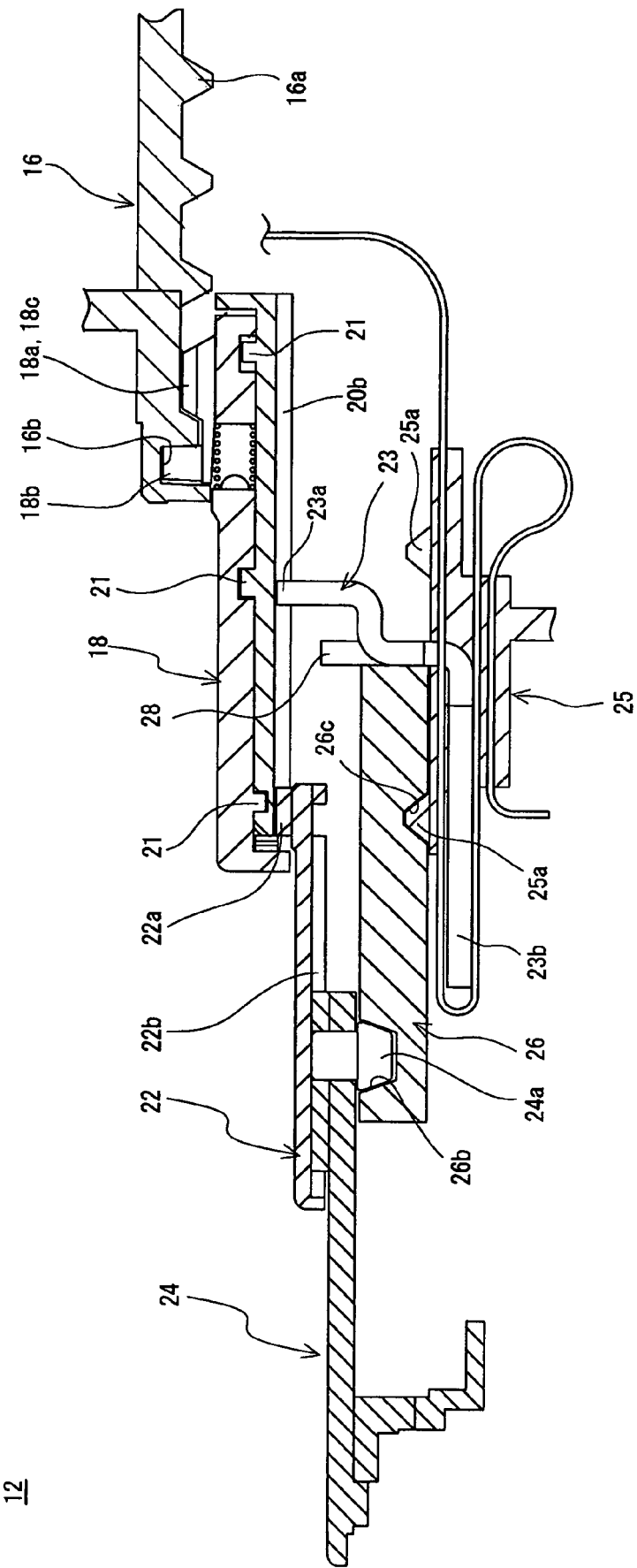
FIG. 3 is an enlarged cross-sectional view of a part of the zoom lens at the wide-angle extremity thereof.
Figure 4:
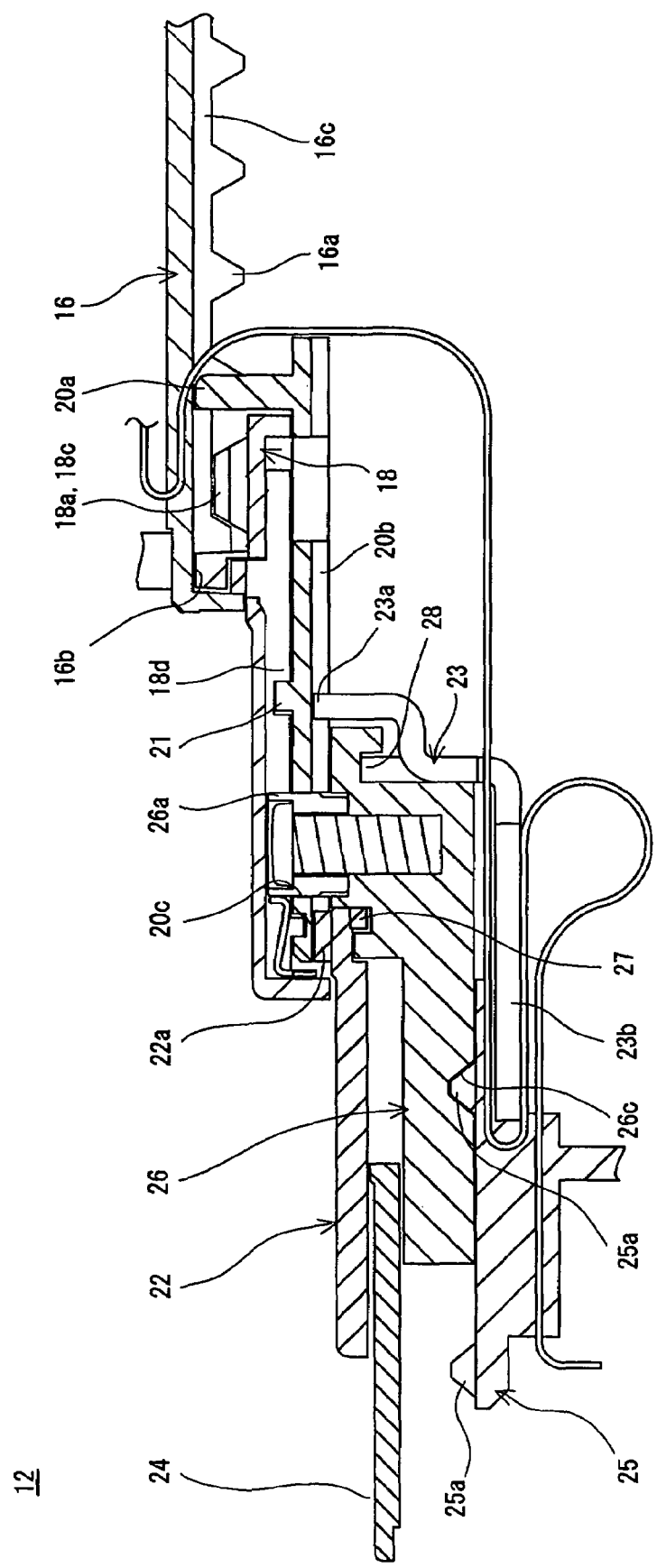
FIG. 4 is an enlarged cross-sectional view of a part of the zoom lens at the telephoto extremity thereof.

A linear guide ring 20 is supported inside the helicoid ring 18. The linear guide ring 20 is provided in the vicinity of the rear end thereof with a linear guide projection 20a, and is guided linearly along the rotation center axis Z0 (and the photographing optical axis Z1) by the slidable engagement of the linear guide projection 20a with the linear guide groove 16c of the fixed ring portion 16 as shown in FIG. 4. A rotation guiding portion 21 is provided between the inner peripheral surface of the helicoid ring 18 and the outer peripheral surface of the linear guide ring 20. The helicoid ring 18 is supported by the linear guide ring 20 to be rotatable with respect to the linear guide ring 20 and to be movable together with the linear guide ring 20 in the optical axis direction via the rotation guiding portion 21. The rotation guiding portion 21 consists of a plurality of circumferential grooves provided at different positions in the axial direction and radial protrusions, each of which is slidably engaged in the corresponding circumferential groove (see FIGS. 3 and 4).

The linear guide ring 20 is provided on an inner peripheral surface thereof with a plurality of linear guide grooves 20b (only one of them is shown in each of FIGS. 1 through 4) which extend parallel to the rotation center axis Z0 (and the photographing optical axis Z1). A plurality of linear guide projections 22a (only one of them is shown in each of FIGS. 1 through 4) which project radially outwards from a first lens group linear guide ring 22 and a plurality of linear guide projections 23a (only one of them is shown in each of FIGS. 1 through 4) which project radially outwards from a second lens group linear guide ring 23 are slidably engaged with the plurality of linear guide grooves 20b, respectively. The first lens group linear guide ring 22 guides a first lens group support frame 24 linearly in a direction parallel to the rotation center axis Z0 (and the photographing optical axis Z1) via a plurality of linear guide grooves 22b (only one of them is shown in each of FIGS. 2 and 3) formed on an inner peripheral surface of the first lens group linear guide ring 22. The second lens group linear guide ring 23 guides a second lens group support frame 25 linearly in a direction parallel to the rotation center axis Z0 (and the photographing optical axis Z1) via a plurality of linear guide keys 23b (only one of them is shown in each of FIGS. 1 through 4). The first lens group support frame 24 supports the first lens group 13a via a focusing frame 29, and the second lens group support frame 25 supports the second lens group 13d.

A cam ring 26 is provided inside the linear guide ring 20 to be rotatable about the rotation center axis Z0. The cam ring 26 is supported by the first lens group linear guide ring 22 and the second lens group linear guide ring 23 to be rotatable with respect to each of the first lens group linear guide ring 22 and the second lens group linear guide ring 23 and to movable in the optical axis direction together therewith via rotation guiding portions 27 and 28 (see FIG. 4). As shown in FIGS. 3 and 4, the rotation guiding portion 27 is composed of a discontinuous circumferential groove 27a (not shown in FIG. 3) which is formed on an outer peripheral surface of the cam ring 26, and an inner flange 27b which projects radially inwards from the first lens group linear guide ring 22 to be slidably engaged in the discontinuous circumferential groove 27a. As shown in FIGS. 3 and 4, the rotation guiding portion 28 is composed of a discontinuous circumferential groove 28a (not shown in FIG. 3) formed on an inner peripheral surface of the cam ring 26 and an outer flange 28b which projects radially outwards from the second lens group linear guide ring 23 to be slidably engaged in the discontinuous circumferential groove 28a.

As shown in FIG. 4, the cam ring 26 is provided thereon with a plurality of follower protrusions 26a (only one of them is shown in FIG. 4) which project radially outwards. The plurality of follower protrusions 26a passes through a plurality of follower guide grooves 20c (only one of them is shown in FIG. 4) formed in the linear guide ring 20 to be engaged in a plurality of rotation transfer grooves 18d (only one of them is shown in FIG. 4) formed on an inner peripheral surface of the helicoid ring 18. Each rotation transfer groove 18d is parallel to the rotation center axis Z0 (and the photographing optical axis Z1), and each follower protrusion 26a is slidably engaged in the associated rotation transfer groove 18d to be prevented from moving in the circumferential direction relative to the associated rotation transfer groove 18d. Accordingly, the rotation of the helicoid ring 18 is transferred to the cam ring 26 via the engagement between the plurality of rotation transfer grooves 18d and the plurality of follower protrusions 26a. Although the development shape of each follower guide groove 20c is not shown in the drawings, each follower guide groove 20c is a guide groove including a circumferential groove portion with its center on the rotation center axis Z0 and an inclined lead groove portion parallel to the female helicoid 16a. Accordingly, when rotated by a rotation of the helicoid ring 18, the cam ring 26 rotates while moving forward or rearward along the rotation center axis Z0 (and the photographing optical axis Z1) if each follower protrusion 26a is engaged in the lead groove portion of the associated follower guide groove 20c, and rotates at a fixed position in the optical axis direction without moving forward or rearward if each follower protrusion 26a is engaged in the circumferential groove portion of the associated follower guide groove 20c.

The cam ring 26 is a double-sided cam ring having a plurality of outer cam grooves 26b (only one of them is shown in FIG. 3) and a plurality of inner cam grooves 26c (only one of them is shown in each of FIGS. 3 and 4) on outer and inner peripheral surfaces of the cam ring 26, respectively. The plurality of outer cam grooves 26b are slidably engaged with a plurality of cam followers 24a (only one of them is shown in FIG. 3) which project radially inwards from the first lens group support frame 24, respectively, while the plurality of inner cam grooves 26c are slidably engaged with a plurality of cam followers 25a (only one of them is shown in each of FIGS. 3 and 4) which project radially outwards from the second lens group support frame 25. Accordingly, when the cam ring 26 is rotated, the first lens group support frame 24 that is guided linearly in the optical axis direction by the first lens group linear guide ring 22 moves forward and rearward along the rotation center axis Z0 (and the photographing optical axis Z1) in predetermined motion in accordance with contours of the plurality of outer cam grooves 26b. likewise, when the cam ring 26 is rotated, the second lens group support frame 25 that is guided linearly in the optical axis direction by the second lens group linear guide ring 23 moves forward and rearward along the rotation center axis Z0 (and the photographing optical axis Z1) in predetermined motion in accordance with contours of the plurality of the plurality of inner cam grooves 26c.

The second lens group support frame 25 is provided with a cylindrical portion 25b (see FIGS. 1 and 2) which holds the second lens group 13d, and supports the shutter 13b and the diaphragm 13c in front of the cylindrical portion 25b to allow each of the shutter 13b and the diaphragm 13c to be opened and closed. The shutter 13b and the diaphragm 13c can be opened and closed by a shutter actuator MS and a diaphragm actuator MA (see FIG. 5), respectively, in accordance with push-down operations of a release button 14e (see FIG. 5). The shutter actuator MS and the diaphragm actuator MA are supported by the second lens group support frame 25. The release button 14e is a conventional two-step button switch; a distance measuring sensor and a photometering sensor (both not shown) are activated to perform a distance measuring operation and a photometering operation, respectively, upon the shutter release operation being depressed in a half way down, and a shutter release operation (an electronic-image recording operation) is performed upon the shutter release operation being fully depressed.

The focusing frame 29 which holds the first lens group 13a is supported by the first lens group support frame 24 to be movable along the rotation center axis Z0 (and the photographing optical axis Z1). The focusing frame 29 can be moved forward and rearward by a focusing motor MF (see FIG. 5).

The operation of each of the zoom motor MZ and the focusing motor MF is controlled by an associated motor driver, and the operation of each of the shutter actuator MS and the diaphragm actuator MA is controlled by an associated actuator driver. In FIG. 5, these drivers are not shown, so that each of the zoom motor MZ, the focusing motor MF, the shutter actuator MS and the diaphragm actuator MA is shown as being directly connected to the CPU 60. Upon turning on a main switch (switching signal generator) 14d (see FIG. 5) of the camera, the zoom motor MZ is driven to bring the zoom lens 10 to the photographic state shown in FIG. 2. Upon turning off the main switch 14d, the zoom lens 10 is moved from the photographic state to the retracted state shown in FIG. 1.

The above described operation of the zoom lens 10 is summarized as follows. Upon turning on the main switch 14d in the retracted state of the zoom lens 10 shown in FIG. 1, the zoom gear 17 is driven to rotate in a lens barrel advancing direction. Accordingly, the helicoid ring 18 moves forward in the optical axis direction while rotating, and simultaneously, the linear guide ring 20 linearly moves forward in the optical axis direction together with the helicoid ring 18. In addition, the rotation of the helicoid ring 18 causes the cam ring 26 to move forward in the optical axis direction while rotating relative to the linear guide ring 20. The first lens group linear guide ring 22 and the second lens group linear guide ring 23 linearly move forward in the optical axis direction together with the cam ring 26. Each of the first lens group support frame 24 and the second lens group support frame 25 moves in the optical axis direction relative to the cam ring 26 in predetermined motion. Therefore, the moving amount of the first lens group 13a in the optical axis direction when the zoom lens 10 is extended from the retracted state thereof is determined by adding the moving amount of the cam ring 26 relative to the fixed ring portion 16 to the moving amount of the first lens group support frame 24 relative to the cam ring 26 (the advancing/retracting, amount of the first lens group support frame 24 by the cam groove 26b). Furthermore, the moving amount of the second lens group 13d in the optical axis direction when the zoom lens 10 is extended from the retracted state thereof is determined by adding the moving amount of the cam ring 26 relative to the fixed ring portion 16 to the moving amount of the second lens group support frame 25 relative to the cam ring 26 (the advancing/retracting amount of the second lens group support frame 25 by the cam groove 26c).

Figure 6:
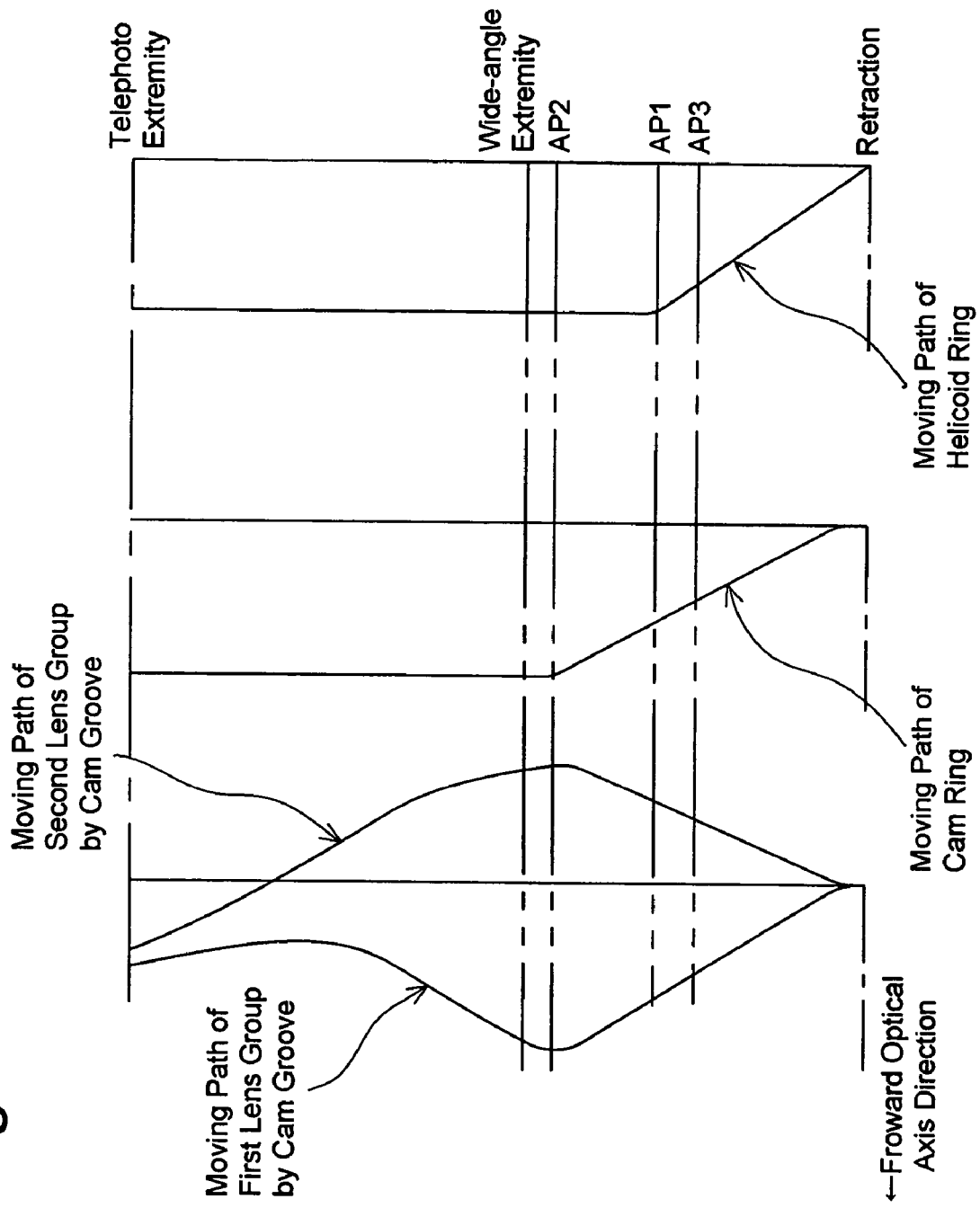
FIG. 6 is a conceptual diagram showing the moving paths of a helicoid ring and a cam ring and the moving paths of a first lens group and a second lens group via movement of the cam ring.
Figure 7:
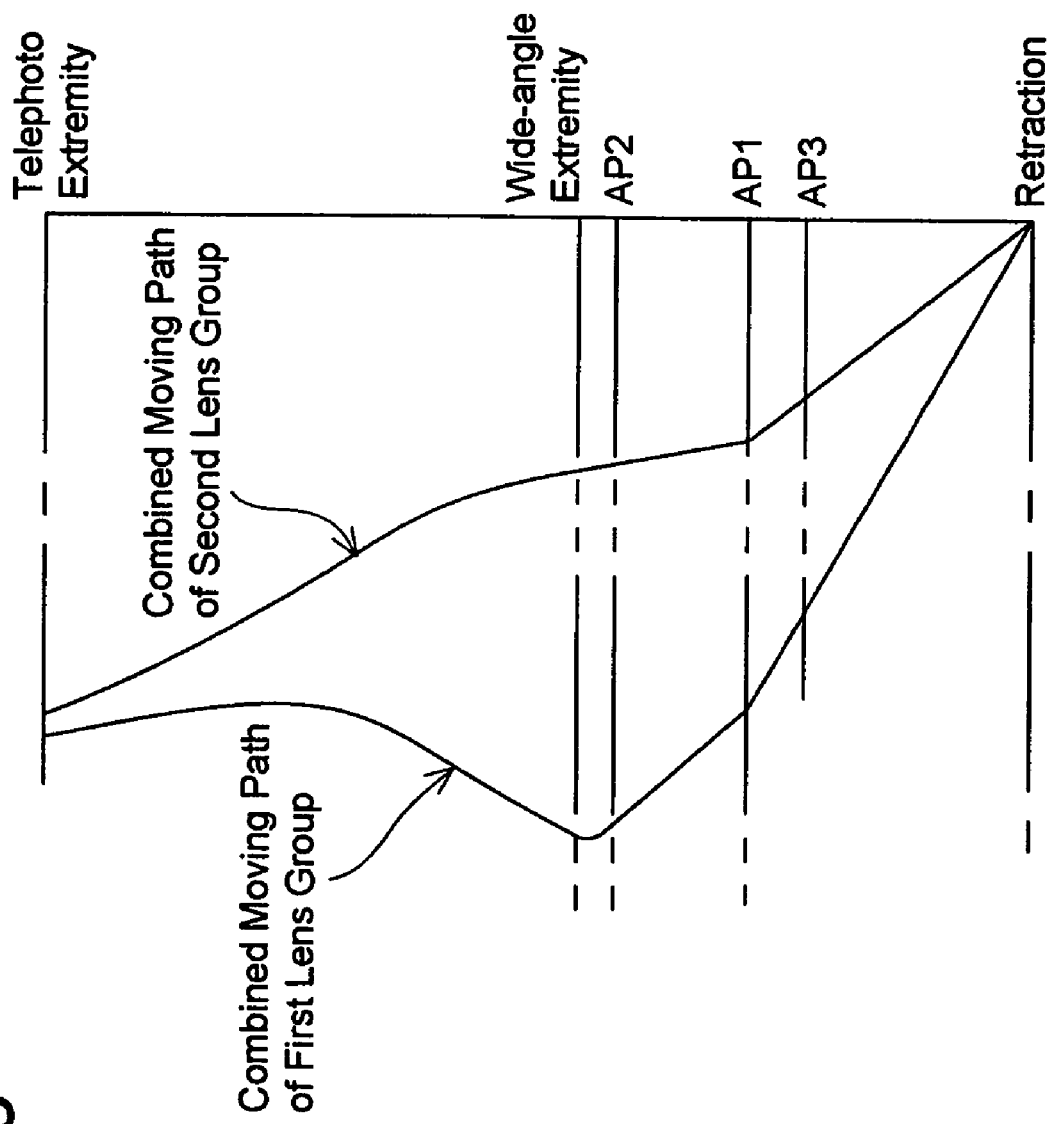
FIG. 7 is a conceptual diagram showing the combined moving path of each of the first lens group and the second lens group, in which the moving paths of the helicoid ring and the cam ring are included.

FIG. 6 shows the moving paths of the helicoid ring 18 and the cam ring 26 and the moving paths of the first lens group 13a and the second lens group 13d relative to the cam ring 26 (the cam diagrams of the cam grooves 26b and 26c). The vertical axis represents the amount of rotation (angular position) of the lens barrel from the retracted state of the zoom lens 10 to the telephoto extremity thereof, and the horizontal axis represents the amount of movement of the lens barrel in the optical axis direction. As shown in FIG. 6, the helicoid ring 18 is moved forward in the optical axis direction while rotating up to an angular position AP1 which is located at about the midpoint in the range of extension of the zoom lens 10 from the retracted position (shown in FIG. 1) to the wide-angle extremity (shown by the upper half of the zoom lens 10 from the photographing optical axis Z1 and shown in FIG. 2), whereas the helicoid ring 18 rotates at a fixed position in the optical axis direction as described above in the range of extension of the zoom lens 10 from the angular position AP1 to the telephoto extremity (shown by the lower half of the zoom lens 10 from the photographing optical axis Z1 and shown in FIG. 4). On the other hand, the cam ring 26 is moved forward in the optical axis direction while rotating up to an angular position AP2 which is located immediately behind the wide-angle extremity of the zoom lens 10 in the range of extension of the zoom lens 10 from the retracted position to the wide-angle extremity, whereas the cam ring 26 rotates at a fixed position in the optical axis direction as described above in the range of extension of the zoom lens 10 from the angular position AP2 to the telephoto extremity, similar to the helicoid ring 18. In the zooming range from the wide-angle extremity to the telephoto-extremity, the moving amount of the first lens group 13a in the optical axis direction is determined from the moving amount of the first lens group support frame 24 relative to the cam ring 26 which rotates at a fixed position in the optical axis direction (the advancing/retracting amount of the first lens group support frame 24 via the cam groove 26b), while the moving amount of the second lens group 13d in the optical axis direction is determined from the moving amount of the second lens group support frame 25 relative to the cam ring 26 which rotates at a fixed position in the optical axis direction (the advancing/retracting amount of the second lens group support frame 25 via the cam groove 26c). The focal length of the zoom lens 10 is varied by the relative movement in the optical axis direction between the first lens group 13a and the second lens group 13d. FIG. 7 shows the actual moving path of the first lens group 13a which is obtained by combining the moving amounts of the helicoid ring 18 and the cam ring 26 with the moving amount of the first lens support frame 24 by the cam groove 26b, and the actual moving path of the second lens group 13d which is obtained by combining the moving amounts of the helicoid ring 18 and the cam ring 26 with the moving amount of the second lens group support frame 25 by the cam groove 26c.

Information on the focal length of the zoom lens 10 from the wide-angle extremity to the telephoto extremity is detected by a zoom encoder (focal length detector) 50 (see FIGS. 5, 22 and 25) to be input to the CPU 60. In the zooming range from the wide-angle extremity to the telephoto extremity, the driving amount of the first lens group 13a for focusing is determined based on this information on the focal length of the zoom lens 10 and information on the object distance obtained by the distance measuring sensor (not shown), and a focusing operation is performed by moving the first lens group 13a in the optical axis direction independently of other optical elements by the focusing motor MF.

Mainly the operations of the first lens group 13a and the second lens group 13d have been described above. In the zoom lens 10 of the present embodiment, the optical elements of the zoom lens 10 from the third lens group 13e to the CCD 13g are retractable away from the photographing position on the photographing optical axis Z1 to an off-optical-axis retracted position (radially retracted position) Z2 located above the photographing position as described above. In addition, by moving the optical elements from the third lens group 13e to the CCD 13g on a plane perpendicular to the photographing optical axis Z1, image shake can also be counter-acted. The retracting mechanism and the image stabilizing mechanism will be discussed hereinafter.

Figure 18:
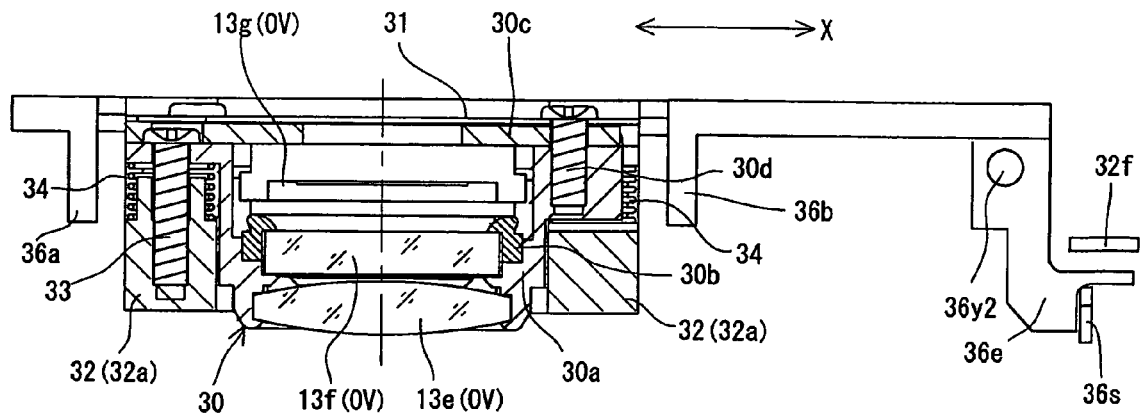
FIG. 18 is a cross-sectional view of the CCD holder, the horizontal moving frame, the vertical moving frame and other elements, taken along a D1-D1 line shown in FIG. 16.
Figure 17:
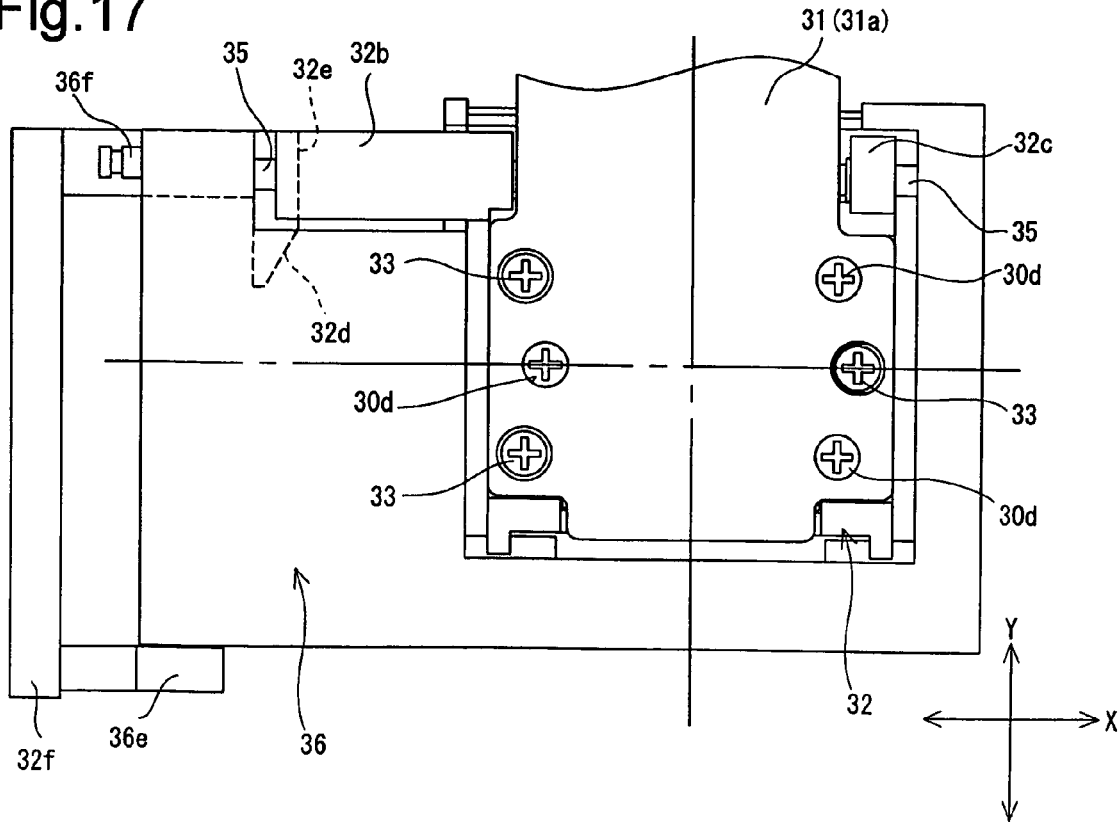
FIG. 17 is a rear view of the horizontal moving frame, the vertical moving frame and the associated elements shown in FIGS. 15 and 16.

As shown in FIGS. 8 and 18, the third lens group 13e, the low-pass filter 13f and the CCD 13g are held by a CCD holder 30 to be provided as a unit. The CCD holder 30 is provided with a holder body 30a, a sealing member 30b and a pressure plate 30c. The third lens group 13e is held by the holder body 30a at a front end aperture thereof. The low-pass filter 13f is held between a flange formed on an inner surface of the holder body 30a and the sealing member 30b, and the CCD 13g is held between the sealing member 30b and the pressure plate 30c. The holder body 30a and the pressure plate 30c are fixed to each other by three fixing screws 30d (see FIGS. 17 and 18) separately arranged around the central axis of the CCD holder 30 (the photographing optical axis Z1 in a photographic state of the zoom lens 10). The three fixing screws 30d also secure one end portion of an image transmission flexible PWB 31 to the rear surface of the pressure plate 30c so that a supporting substrate of the CCD 13g is electrically connected to the image transmission flexible PWB 31.

The image transmission flexible PWB 31 extends from its connection end at the CCD 13g to the retraction space SP in the housing 11. The image transmission flexible PWB 31 is provided with a first linear portion 31a, a U-shaped portion 31b, a second linear portion 31c, and a third linear portion 31d (see FIGS. 1 and 2). The first linear portion 31a is substantially orthogonal to the photographing optical axis Z1 and extends upward. The U-shaped portion 31b is bent forward from the first linear portion 31a. The second linear portion 31c extends downward from the U-shaped portion 31b. The third linear portion 31d is folded upward from the second linear portion 31c. The third linear portion 31d is fixed to an inner surface of the front wall 15a of the housing 11 therealong. The first linear portion 31a, the U-shaped portion 31b and the second linear portion 31c (except the third linear portion 31d) serve as a free-deformable portion which is freely resiliently deformable according to the motion of the CCD holder 30.

The CCD holder 30 is supported by a horizontal moving frame (an element of a second guiding device) 32 via three adjusting screws 33 (see FIGS. 17 and 18) separately arranged around the central axis of the CCD holder 30 (the photographing optical axis Z1 in a ready-photograph state of the zoom lens 10). Three compression coil springs 34 are installed between the CCD holder 30 and the horizontal moving frame 32. The shaft portions of the three adjusting screws 33 are inserted into the three compression coil springs 34, respectively. When the tightening amounts of the adjusting screws 33 are changed, the respective compression amounts of the coil springs 34 are changed. The adjusting screws 33 and the compression coil springs 34 are provided at three different positions around the optical axis of the third lens group 13e, and accordingly, the inclination of the CCD holder 30 with respect to the horizontal moving frame 32, or the inclination of the optical axis of the third lens group 13e with respect to the photographing optical axis Z1, can be adjusted by changing the tightening amounts of the three adjusting screws 33.

Figure 15:
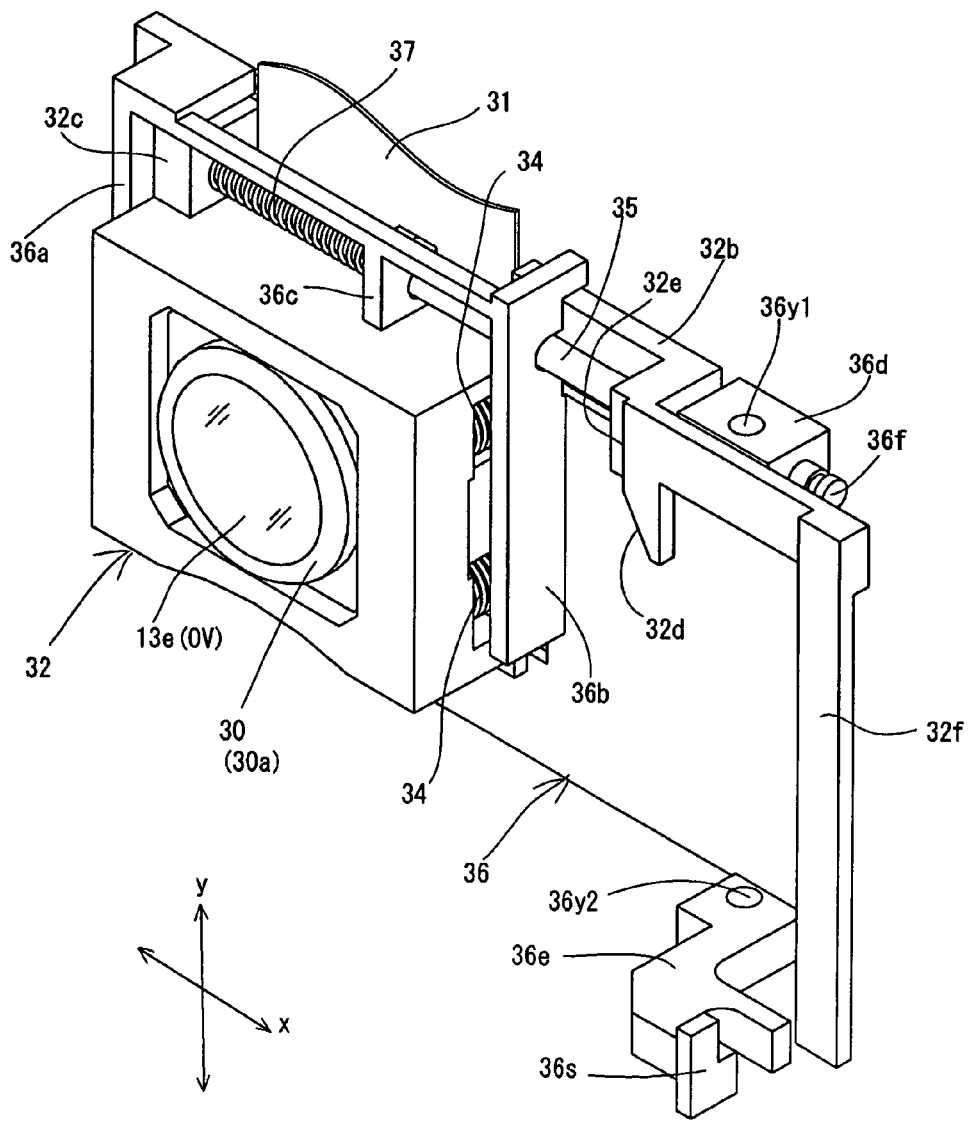
FIG. 15 is a front perspective view of a horizontal moving frame and a vertical moving frame which support the CCD holder, and associated elements.
Figure 16:
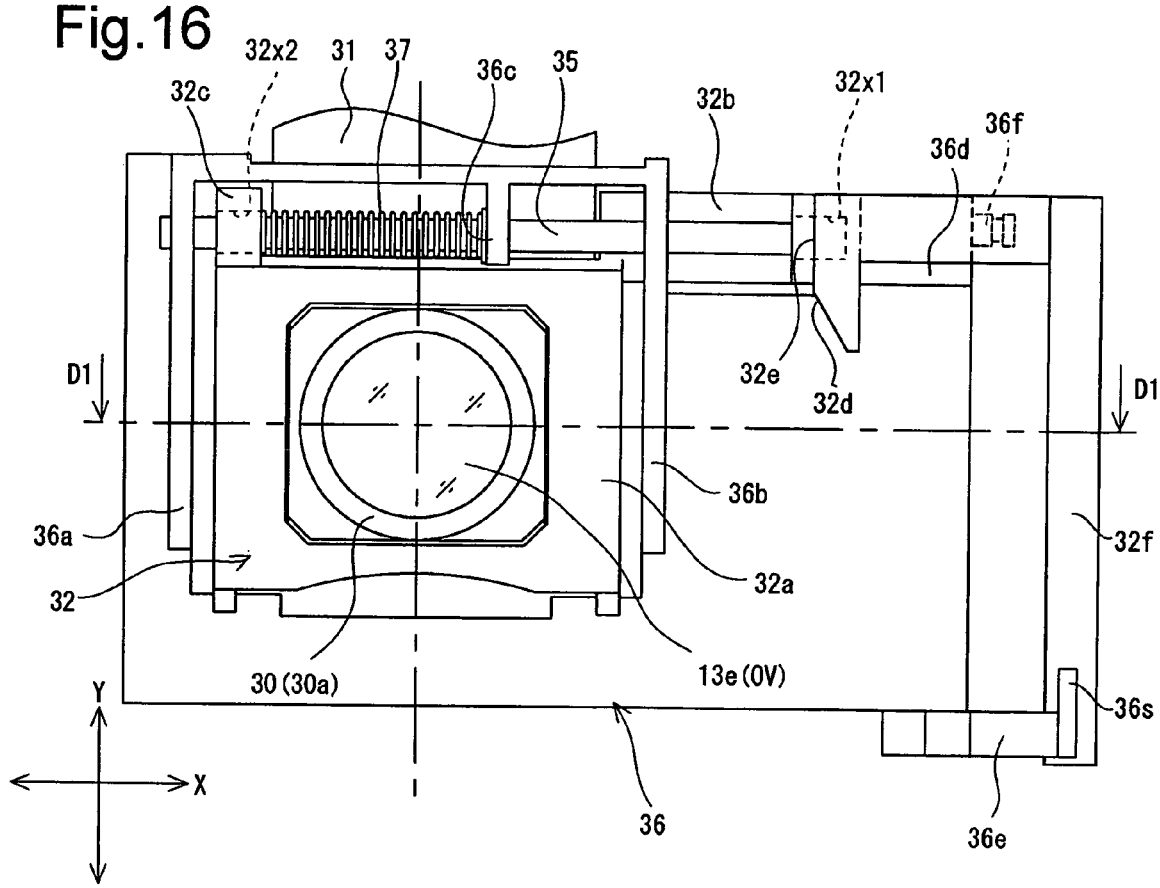
FIG. 16 is a front view of the horizontal moving frame, the vertical moving frame and the associated elements shown in FIG. 15.

As shown in FIG. 15, the horizontal moving frame 32 is supported by a vertical moving frame (an element of a guiding device/holder which holds the retractable optical element) 36 to be movable with respect thereto via a horizontal guide shaft (an element of the second guiding device) 35 extending in the x-axis direction. Specifically, the horizontal moving frame 32 is provided with a rectangular frame portion 32a which encloses the CCD holder 30 and an arm portion 32b which extends horizontally from the frame portion 32a. A spring supporting protrusion 32c is formed on an upper surface of the frame portion 32a, and an inclined surface 32d and a position restricting surface 32e are formed on an end portion of the arm portion 32b. The position restricting surface 32e is a flat surface parallel to the y-axis. On the other hand, the vertical moving frame 36 is provided with a pair of motion restricting frames 36a and 36b, a spring supporting portion 36c, an upper bearing portion 36d, and a lower bearing portion 36e. The pair of motion restricting frames 36a and 36b are provided spaced apart in the x-axis direction. The spring supporting portion 36c is located between the pair of the motion restricting frames 36a and 36b. The upper bearing portion 36d is located on a line extended from the spring supporting portion 36c in the x-axis direction. The lower bearing portion 36e is located below the upper bearing portion 36d. As shown in FIG. 16, the horizontal moving frame 32 is supported by the vertical moving frame 36 in a state where the frame portion 32a is positioned in the space between the pair of motion restricting frames 36a and 36b and where the inclined surface 32d and the position restricting surface 32e of the arm portion 32b are positioned between the motion restricting frame 36b and the upper bearing portion 36d.

One end of the horizontal guide shaft 35 is fixed to the motion restricting frame 36a of the vertical moving frame 36, and the other end of the horizontal guide shaft 35 is fixed to the upper bearing portion 36d of the vertical moving frame 36. Two through-holes are respectively formed in the motion restricting frame 36b and the spring supporting portion 36c to be horizontally aligned to each other so as to allow the horizontal guide shaft 35 to pass through the motion restricting frame 36b and the spring supporting portion 36c. Horizontal through-holes 32x1 and 32x2 (see FIG. 16) into which the horizontal guide shaft 35 is inserted are formed in the arm portion 32b and the spring supporting protrusion 32c of the horizontal moving frame 32, respectively. The horizontal through-holes 32x1 and 32x2 of the horizontal moving frame 32 and the aforementioned two through-holes which are respectively formed in the motion restricting frame 36b and the spring supporting portion 36c are horizontally aligned with each other. Since the horizontal guide shaft 35 is slidably fitted in the horizontal through-holes 32x1 and 32x2, the horizontal moving frame 32 is supported by the vertical moving frame 36 to be movable with respect to the vertical moving frame 36 in the x-axis direction. A horizontal moving frame biasing spring 37 is installed on the horizontal guide shaft 35 between the spring supporting protrusion 32c and the spring supporting portion 36c. The horizontal moving frame biasing spring 37 is a compression coil spring and biases the horizontal moving frame 32 in a direction (leftward as viewed in FIG. 16) to make the spring supporting protrusion 32c approach the motion restricting frame 36a.

Vertical through-holes 36y1 and 36y2 (see FIG. 15) are further formed in the upper bearing portion 36d and the lower bearing portion 36e of the vertical moving frame 36, respectively, which extend in a line along the y-axis direction which is orthogonal to the photographing optical axis Z1. The vertical through-hole 36y1 and the vertical through-hole 36y2 are vertically aligned, and a vertical guide shaft (an element of the guiding device/first linear guide shaft) 38 (see FIGS. 8 and 9) passes through vertical through-hole 36y1 and the vertical through-hole 36y2. Both ends of the vertical guide shaft 38 are fixed to the housing 11, and therefore, the vertical moving frame 36 can move along the vertical guide shaft 38 in the y-axis direction inside the camera. More specifically, the vertical moving frame 36 can move between the retracted position shown in FIG. 1 and the photographing position shown in FIG. 2. When the vertical moving frame 36 is positioned in the photographing position as shown in FIG. 2, the centers of the third lens group 13e, the low-pass filter 13f and the COD 13g in the COD holder 30 are positioned on the photographing optical axis Z1. When the vertical moving frame 36 is positioned in the radially retracted position as shown in FIG. 1, the centers of the third lens group 13e, the low-pass filter 13f and the COD 13g are positioned in the off-optical-axis retracted position Z2 that is located above the fixed ring portion 16.

The vertical moving frame 36 is provided with a spring hooking portion 36f which projects horizontally from a side surface of the vertical moving frame 36 in a direction away from the vertical through-hole 36y1, and a vertical moving frame biasing spring (biasing device) 39 is extended between the spring hooking portion 36f and a spring hooking portion 11a (see FIG. 8) fixed to the housing 11 therein. The vertical moving frame biasing spring 39 is an extension coil spring and biases the vertical moving frame 36 downward (i.e., toward the photographing position thereof shown in FIG. 2).

As described above, the horizontal moving frame 32 that holds the CCD holder 30 is supported by the vertical moving frame 36 to be movable in the x-axis direction with respect to the vertical moving frame 36, and the vertical moving frame 36 is supported by the housing 11 via the vertical guide shaft 38 to be movable in the y-axis direction with respect to the housing 11. Image shake can be counteracted by moving the CCD holder 30 in the x-axis direction and the y-axis direction. To this end, the zoom lens 10 is provided with a driving device which achieves such movement of the CCD holder 30. This driving device will be discussed hereinafter.

Figure 9:
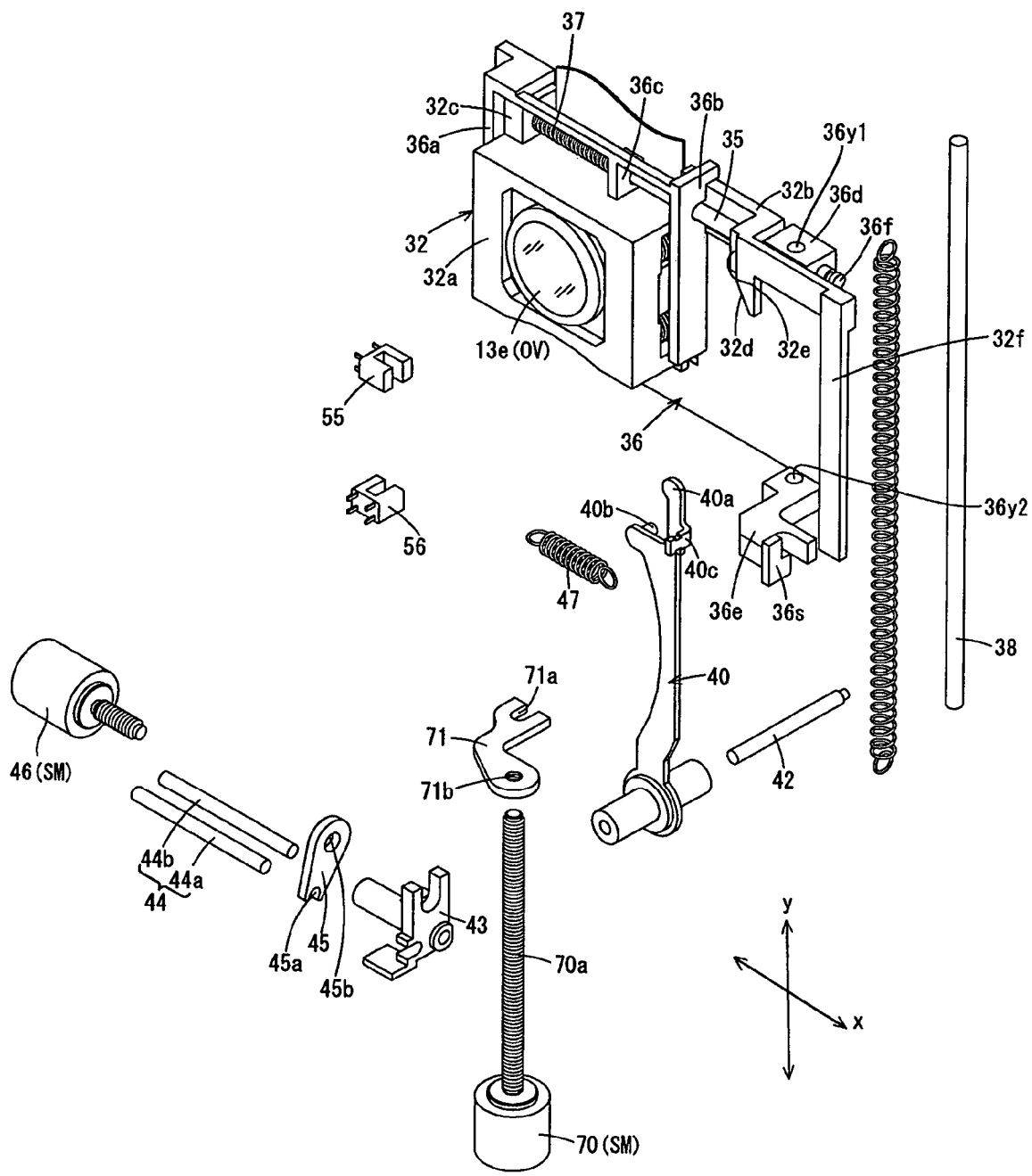
FIG. 9 is an exploded perspective view of elements of an image stabilizing mechanism and a radially-retracting mechanism which are shown in FIG. 8.
Figure 12:
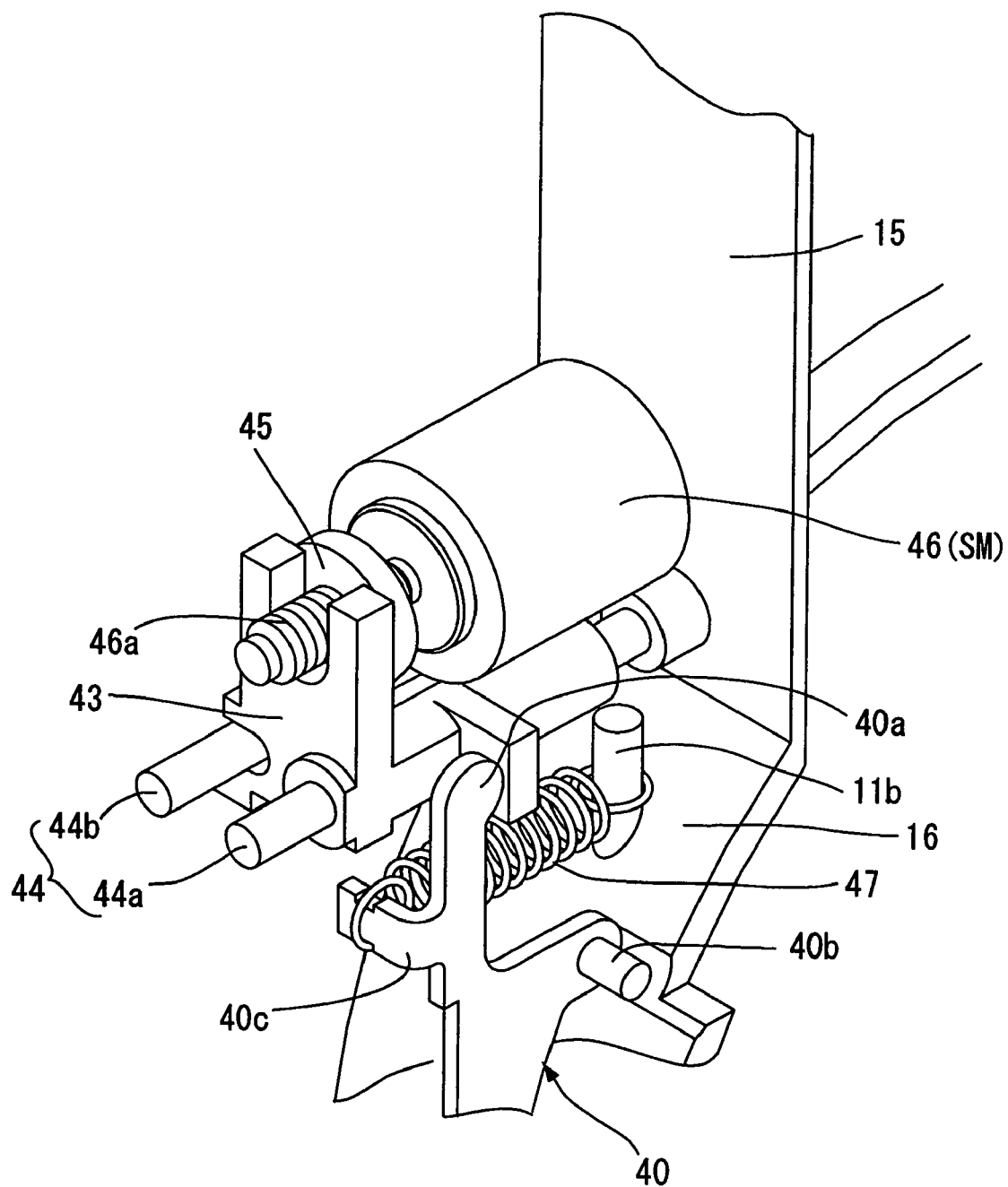
FIG. 12 is a rear perspective view of a portion of the image stabilizing mechanism as viewed from the rear side of FIGS. 10 and 11.
Figure 13:
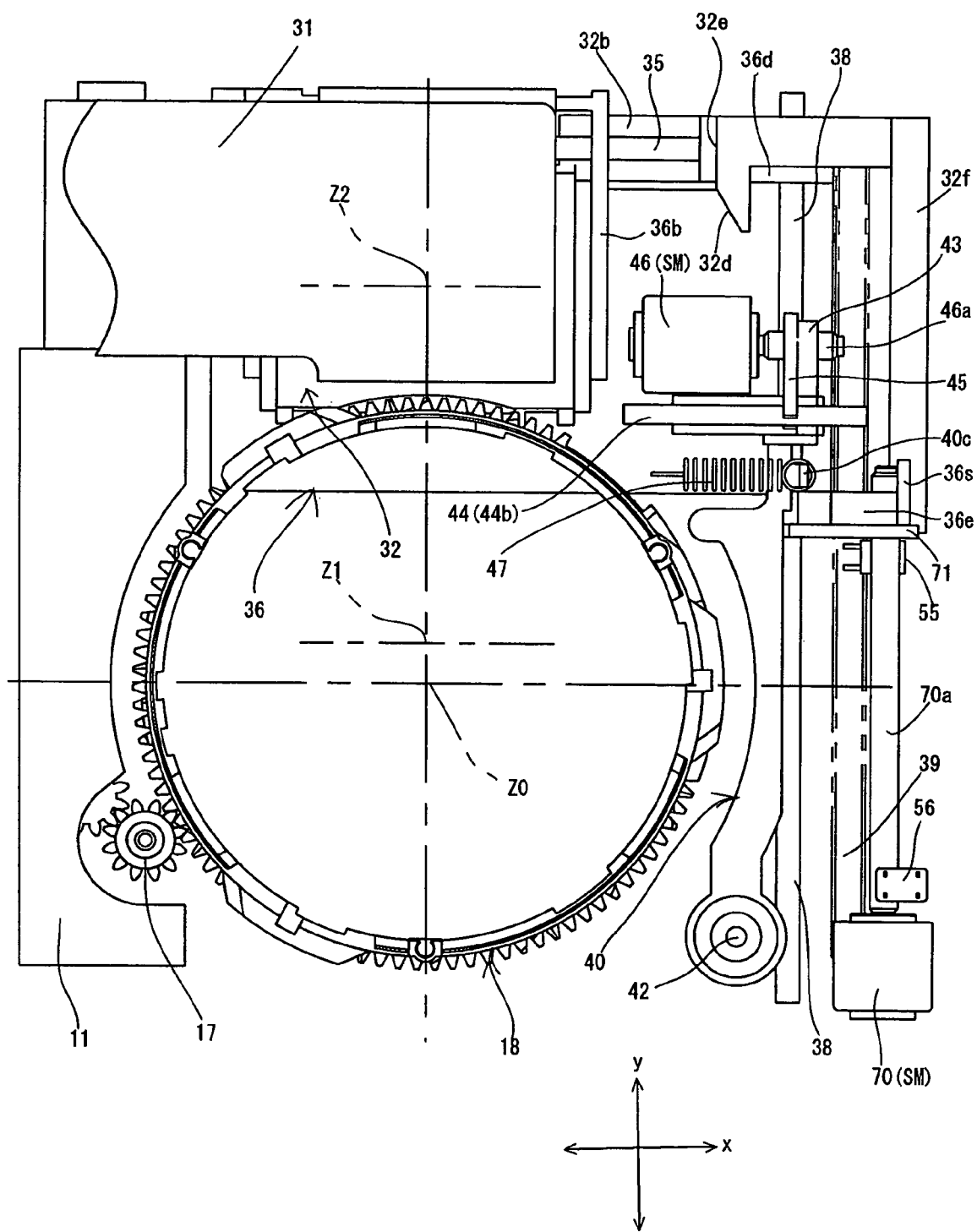
FIG. 13 is a front elevational view of the image stabilizing mechanism and the radially-retracting mechanism in the state shown in FIG. 10, as viewed from the front in the optical axis direction.
Figure 14:
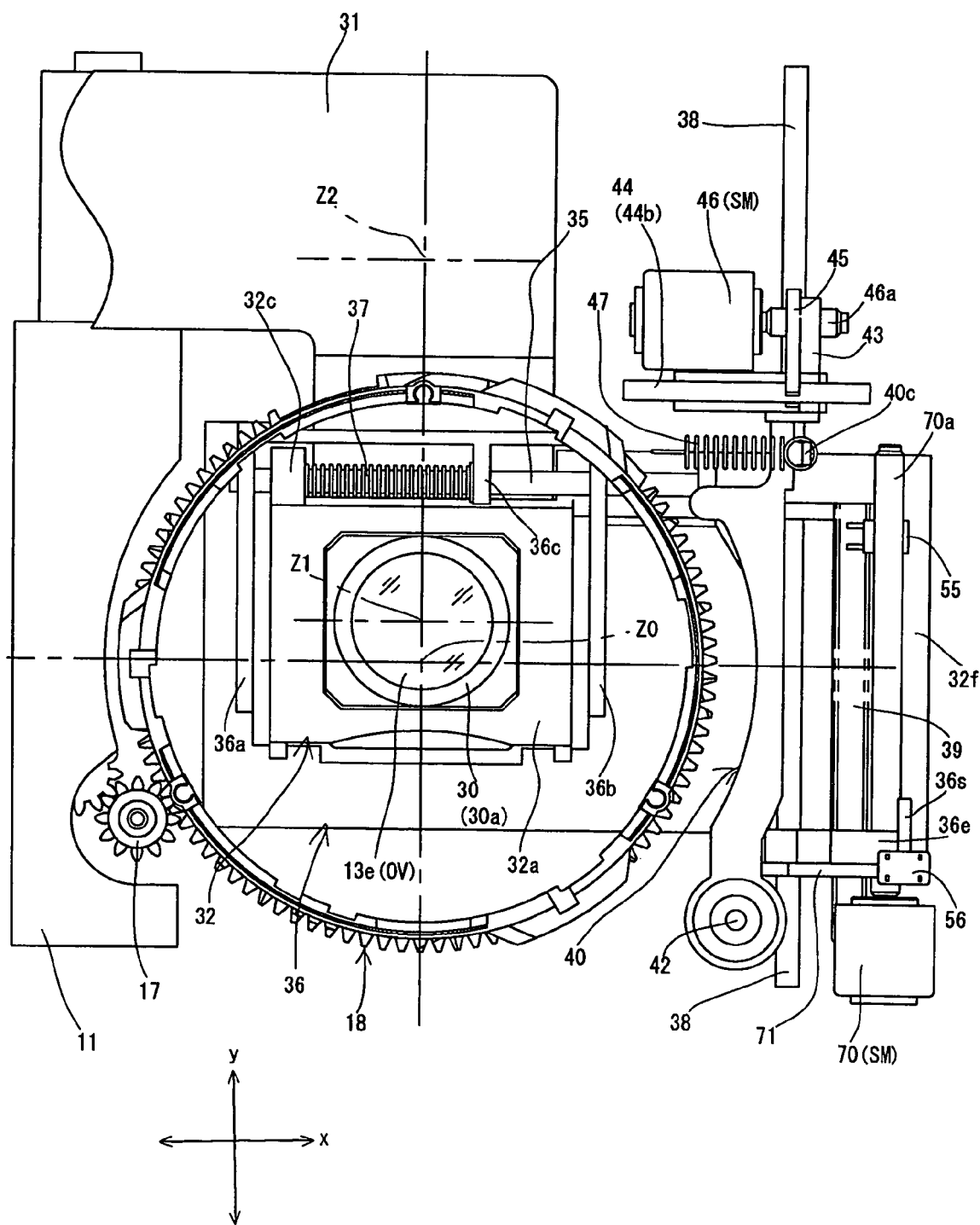
FIG. 14 is a front elevational view of the image stabilizing mechanism and the radially-retracting mechanism in the state shown in FIG. 11, as viewed from the front in the optical axis direction.
Figure 19:
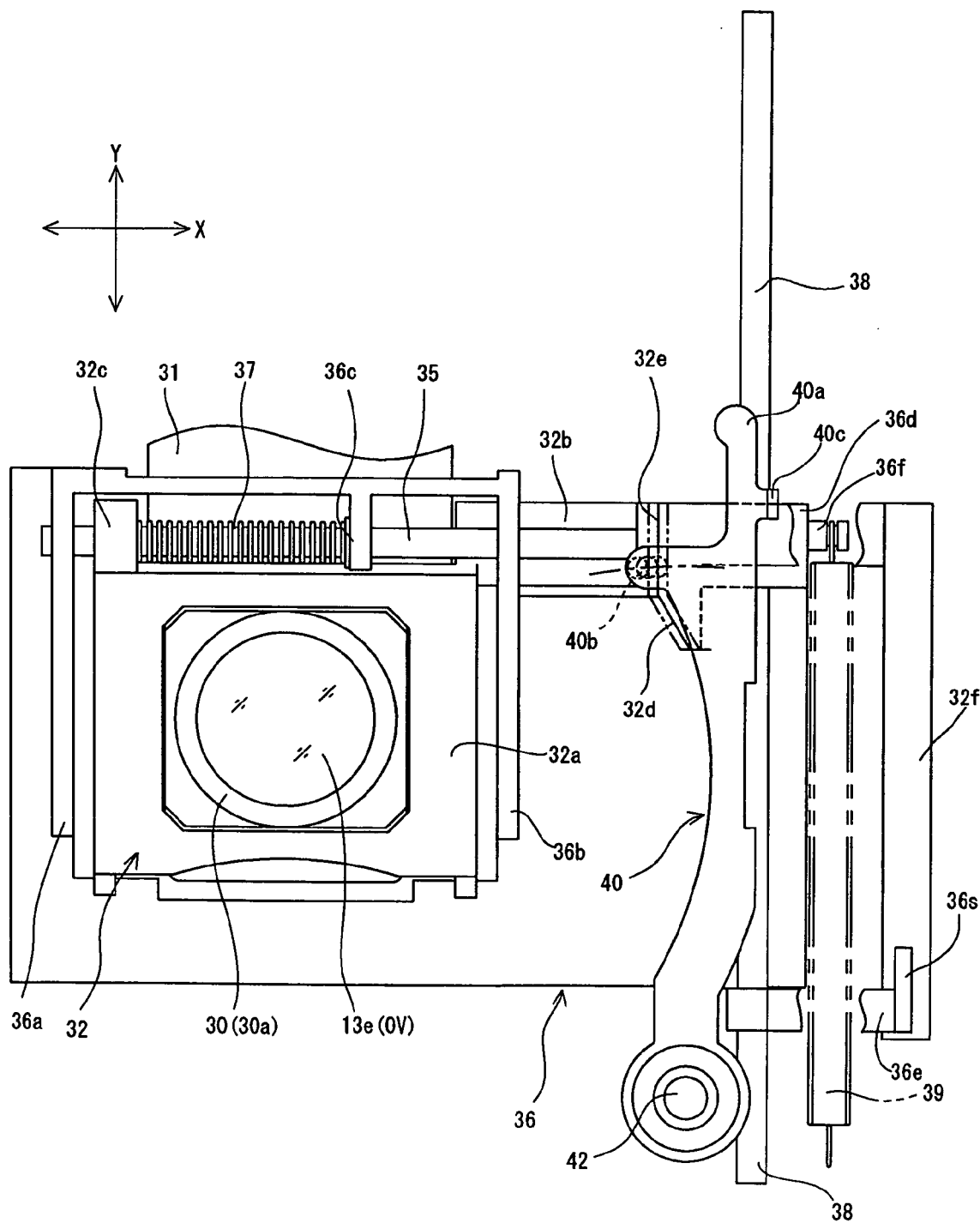
FIG. 19 is a front elevational view of the elements shown in FIGS. 15 through 18 and other associated elements, illustrating an image stabilizing action in the horizontal direction by an operation of a horizontal driving lever.

This driving device is provided with a horizontal driving lever 40. As shown in FIGS. 9 and 19, the horizontal driving lever 40 is pivoted at the lower end thereof on a lever pivot shaft 42 which provided in the housing 11 and fixed thereto to be parallel to the photographing optical axis Z1. The horizontal driving lever 40 is provided at the upper end of the horizontal driving lever 40 with a force-applying end 40a. The horizontal driving lever 40 is provided in the vicinity of the force-applying end 40a with an operation pin 40b which projects rearward in the optical axis direction and a spring hooking portion 40c which projects forward in the optical axis direction. As shown in FIG. 12, the force-applying end 40a of the horizontal driving lever 40 abuts against a lug 43a of a moving member 43. The moving member 43 is supported by a pair of parallel guide bars 44 (44a and 44b) to be slidable thereon in the x-axis direction, and a driven nut member 45 abuts against the moving member 43. The driven nut member 45 is provided with a female screw hole 45b and a rotation restricting groove 45a (see FIG. 9) which is slidably fitted on the guide bar 44b. A drive shaft (a feed screw) 46a of a first stepping motor (second actuator) 46 is screwed into the female screw hole 45b. As shown in FIGS. 13 and 14, the driven nut member 45 abuts against the moving member 43 from the left side. One end of an extension coil spring 47 is hooked on the spring hooking portion 40c of the horizontal driving lever 40, and the other end of the spring 47 is hooked on a spring hooking portion 11b which projects from an inner surface of the housing 11 (see FIG. 12). The extension coil spring 47 biases the horizontal driving lever 40 in a direction to bring the moving member 43 to abut against the driven nut member 45, i.e., in a counterclockwise direction as viewed in FIGS. 13, 14 and 19. Due to this structure, driving the first stepping motor 46 causes the driven nut member 45 to move along the pair of guide bars 44, and at the same time causes the moving member 43 to move together with the driven nut member 45, thus causing the horizontal driving lever 40 to swing about the lever pivot shaft 42. Specifically, moving the driven nut member 45 rightward as viewed in FIGS. 13 and 14 causes the driven nut member 45 to press the moving member 43 in the same direction against the biasing force of the extension spring 47, thus causing the horizontal driving lever 40 to rotate clockwise as viewed in FIGS. 13 and 14. Conversely, moving the driven nut member 45 leftward as viewed in FIGS. 13 and 14 causes the moving member 43 to move in the same direction while following the leftward movement of the driven nut member 45 due to the biasing force of the extension coil spring 47, thus causing the horizontal driving lever 40 to rotate counterclockwise as viewed in FIGS. 13 and 14.

As shown in FIG. 19, the operation pin 40b of the horizontal driving lever 40 abuts against the position restricting surface 32e that is provided on the end portion of the arm portion 32b of the horizontal moving frame 32. Since the horizontal moving frame 32 is biased leftward as viewed in FIG. 19 by the horizontal moving frame biasing spring 37, the operation pin 40b remains in contact with the position restricting surface 32e. When the horizontal driving lever 40 swings, the position of the operation pin 40b changes along the x-axis direction, so that the horizontal moving frame 32 moves along the horizontal guide shaft 35. Specifically, rotating the horizontal driving lever 40 clockwise as viewed in FIG. 19 causes the operation pin 40b to press the position restricting surface 32e, which causes the horizontal moving frame 32 to move rightward as viewed in FIG. 19 against the biasing force of the horizontal moving frame biasing spring 37. Conversely, rotating the horizontal driving lever 40 counterclockwise as viewed in FIG. 19 causes the operation pin 40b to move in a direction away from the position restricting surface 32e (leftward as viewed in FIG. 19), which causes the horizontal moving frame 32 to move in the same direction while following the leftward movement of the operation pin 40b due to the biasing force of the horizontal moving frame biasing spring 37.

As shown in FIGS. 8 through 11, 13 and 14, a second stepping motor (common actuator) 70 and a driven nut member (linearly movable member) 71 are installed in the close vicinity of the vertical guide shaft 38. The second stepping motor 70 is provided with a drive shaft (feed screw) 70a which extends parallel to the vertical guide shaft 38 and with which the driven nut member 71 is screw-engaged. As shown in FIG. 9, the driven nut member 71 is provided with a rotation restricting groove 71a which is slidably fitted on the vertical guide shaft 38, and a female screw hole 71b which is screw-engaged with the drive shaft 70a. Rotating the drive shaft 70a forward and reverse by driving the second stepping motor 70 causes the driven nut member 71 to move upwards and downwards in the y-axis direction along the vertical guide shaft 38. As shown in FIGS. 10, 11, 13 and 14, the driven nut member 71 is in contact with a vertical moving frame 36 from bottom thereof. Due to this structure, driving the second stepping motor 70 causes the driven nut member 71 to move along the vertical guide shaft 38, thus causing the vertical moving frame 36 to move along the vertical guide shaft 38. Specifically, moving the driven nut member 71 upward causes the driven nut member 71 to push a lower bearing portion 36e of the vertical moving frame 36 upward, so that the vertical moving frame 36 moves upward against the biasing force of the vertical moving frame biasing spring 39. Conversely, moving the driven nut member 71 downward causes the vertical moving frame 36 to move downward together with the driven nut member 71 by the biasing force of the vertical moving frame biasing spring 39.

In the above-described structure, the horizontal moving frame 32 can be caused to move left or right in the x-axis direction by driving the first stepping motor 46 forward or reverse. Furthermore, the vertical moving frame 36 can be caused to move upwards or downwards in the y-axis direction by driving the second stepping motor 70 forward or reverse.

The CCD holder 30 is supported by a horizontal moving frame 32. The horizontal moving frame 32 is provided with a plate portion 32f which is formed as a part of the arm portion 32b to extend downward from the arm portion 32b. The plate portion 32f has a substantially inverted-L shape as viewed from the front of the camera, and is elongated in the y-axis direction so that the lower end of the plate portion 32f reaches down to the close vicinity of the lower bearing portion 36e. Additionally, the vertical moving frame 36 is provided at the end of the lower bearing portion 36e with a plate portion 36s. As shown in FIGS. 8 through 11 and 13 through 14, two photo sensors 55 and 56, each having a light emitter and a light receiver which are spaced apart from each other are installed in the housing 11. The initial position of the horizontal moving frame 32 can be detected by the photo sensor 55 when the plate portion 32f passes between the light emitter and the light receiver of the photo sensor 55. The plate portion 32f and the photo sensor 55 constitute a photo interrupter. Likewise, the initial position of the vertical moving frame 36 can be detected by the photo sensor 56 when the plate portion 36s passes between the light emitter and the light receiver of the photo sensor 56. The plate portion 36s and the photo sensor 56 constitute a photo interrupter.

The present embodiment of the zoom lens camera is provided with an x-gyro sensor (angular velocity sensor/shake velocity sensor) 51 and a y-gyro sensor (angular velocity sensor/shake velocity sensor) 52 which are configured to detect the angular velocity around the x-axis and the angular velocity around the Y-axis (see FIG. 5), respectively, and the speed (magnitude) and the direction of vibrations applied to the camera are detected by the x-gyro sensor 51 and the y-gyro sensor 52. Subsequently, the angular velocities in the two axial directions (the x-axis direction and the y-axis direction) which are respectively detected by the x-gyro sensor 51 and the y-gyro sensor 52 are time-integrated by the CPU 60 to determine a moving angle. Subsequently, the CPU 60 calculates, from this moving angle, the moving amounts of the image on a focal plane (imaging surface/light receiving surface of the CCD 13g) in the x-axis direction and in the y-axis direction. The CPU 60 further calculates the driving amounts and the driving directions of the horizontal moving frame 32 and the vertical moving frame 36 for the respective axial directions (driving pulses for the first stepping motor 46 and the second stepping motor 70) in order to counteract camera shake (vibrations). Thereupon, the first stepping motor 46 and the second stepping motor 70 are actuated and the operations thereof are controlled in accordance with the calculated values. In this manner, each of the horizontal moving frame 32 and the vertical moving frame 36 is driven in the calculated direction by the calculated amount in order to counteract the shake of the photographing optical axis Z1 to thereby stabilize the image on the focal plane. The camera can be put into this image stabilization mode by turning on a photographing mode select switch 14f (see FIG. 5). In addition, by operating the photographing mode select switch 14f, a first vibration following mode or a second vibration following mode can be selected in the image stabilization mode. In the first vibration following mode, each of the first stepping motor 46 and the second stepping motor 70 continues to be driven to stabilize the image on the focal plane. In the second vibration following mode, each of the first stepping motor 46 and the second stepping motor 70 is driven to stabilize the image on the focal plane only when the release button 14e is operated (when the release button 14e is depressed in a half way down and when the release button 14e is fully depressed).

With the use of a part of the above-described image stabilizing mechanism, the retracting operation (radially retracting operation) of the third lens group 13e, the low-pass filter 13f and the CCD 13g toward the off-optical-axis retracted position Z2 into the retraction space SP is performed when the zoom lens 10 is retracted from a photographic state. As shown in FIGS. 8 through 11, 13 and 14, the second stepping motor 70 is installed with the body thereof being positioned at the bottom, and the drive shaft 70a that extends upwards from the body of the second stepping motor 70 has a length greater than the amount of retracting movement of the vertical moving frame 36 in the y-axis direction. The vertical guide shaft 38, which is parallel to the drive shaft 70a, has a length greater than the length of the drive shaft 70a. This configuration makes it possible to move the vertical moving frame 36 in the y-axis direction largely beyond a predetermined range of movement of the vertical moving frame 36 which is necessary for image stabilization, i.e., for counteracting image shake. Namely, the third lens group 13e, the low-pass filter 13f and the CCD 13g, which are supported by the vertical moving frame 36, can be moved from a position on the photographing optical axis Z1 (the position shown in FIGS. 11 and 14) to the off-optical-axis retracted position Z2 (the position shown in FIGS. 10 and 13).

The CPU 60 controls the position of the vertical moving frame 36 by driving the second stepping motor 70 in accordance with the status of the zoom lens 10. Firstly, when the zoom lens 10 is in the photographic state (i.e., when the focal length of the zoom lens 10 is set in between the wide-angle extremity and the telephoto extremity), the driven nut member 71 is positioned in the vicinity of the lower end of the drive shaft 70a so that the vertical moving frame 36 (together with the third lens group 13e, the low-pass filter 13f and the CCD 13g) is positioned on the photographing optical axis Z1. In this photographic state, the above described image stabilizing operation can be performed by driving the first stepping motor 46 and the second stepping motor 70 in the x-axis direction and the y-axis direction as appropriate. This image stabilizing operation is performed with the third lens group 13e, the low-pass filter 13f and the CCD 13g remaining on the photographing optical axis Z1. Namely, during the image stabilizing operation, the third lens group 13e, the low-pass filter 13f and the CCD 13g are not moved largely toward the off-optical-axis retracted position Z2 beyond the photographing optical axis Z1.

The zoom lens 10 enters the photographic state shown in FIG. 2 when the main switch 14d (see FIG. 5) of the camera is turned ON, and enters the retracted state shown in FIG. 1 when the main switch 14d is turned OFF. When the zoom lens changes from the photographic state to the retracted state upon the main switch 14d being turned OFF, the retracting operation of the zoom lens 10 is performed by an operation of the zoom motor MZ and simultaneously the second stepping motor 70 is driven to move the driven nut member 71 upward to a position at the close vicinity of the upper end of the drive shaft 70a as shown in FIGS. 10 and 13. Thereupon, the driven nut member 71 lifts the vertical moving frame 36 against the biasing force of the vertical moving frame biasing spring 39, which causes the vertical moving frame 36 to move to the off-optical-axis retracted position Z2 as shown in FIG. 1 while being guided along the vertical guide shaft 38. Consequently, the third lens group 13e, the low-pass filter 13f and the CCD 13g are retracted radially outwards to the off-optical-axis retracted position Z2 from a position on the photographing optical axis Z1.

The retracting operation of the vertical moving frame 36, i.e., the operation of the second stepping motor 70, is controlled to be completed at an angular position AP3 (shown in FIGS. 6 and 7) before the zoom lens 10 is fully retracted. Subsequently, from the angular position AP3 the helicoid ring 18 and the cam ring 26 further move rearward in the optical axis direction while rotating. Thereafter, when the helicoid ring 18 and the cam ring 26 reach their respective retracted positions shown in FIG. 1, the cylindrical portion 25b of the second lens group support frame 25 that holds the second lens group 13d is retracted into the space in the housing 11 which is formerly occupied by the vertical moving frame 36 when the zoom lens 10 is in the photographic state. In this manner, the thickness of the photographing optical system in the optical axis direction can be reduced in the retracted state of the zoom lens 10, which makes it possible to reduce the thickness of the zoom lens 10, which in turn makes it possible to reduce the thickness of a camera incorporating the zoom lens 10. The timing of the commencement of the retracting operation of the vertical moving frame 36 can be freely determined within the range between the wide-angle extremity and the angular position AP3 shown in FIGS. 6 and 7. In the present invention, the retracting operation of the vertical moving frame 36 that is carried out by the second stepping motor 70 is controlled so as to be started in the vicinity of the angular position AP2, at which the cam ring 26 changes its operating state between a state in which the cam ring 26 rotates at a fixed position and a state in which the cam ring 26 rotates while moving forward or rearward.

When the zoom lens 10 changes from the retracted state shown in FIG. 1 to the photographic state shown in FIG. 2, operations of the zoom lens 10 which are reverse to the above described operations of the zoom lens 10 are performed. Firstly, the zoom motor MZ is actuated to start the advancing operation of the zoom lens 10 upon the main switch 14d being turned ON. At this stage, the second stepping motor 70 has not been actuated. The advancing operation of the zoom motor MZ causes the second lens group support frame 25, which supports the second lens group 13d, to move forward from the rearmost position shown in FIG. 1. This forward movement of the second lens group support frame 25 opens the space below the vertical moving frame 36 positioned in the retracted position (and above the photographing optical axis Z1). The advancing operation of the second lens group support frame 25 to a position where the second lens group support frame 25 is not overlapped by the vertical moving frame 36 in the y-axis direction has been completed by the time the lens barrel 10 reaches the angular position AP3 shown in FIGS. 6 and 7. From this state, the second stepping motor 70 is started so as to rotate, so that the driven nut member 71 moves to a position in the vicinity of the lower end of the drive shaft 70a while being guided along the vertical guide shaft 38. At the same time, the vertical moving frame 36 follows the driven nut member 71 to move downward to a position on the photographing optical axis Z1, which is shown in FIGS. 11 and 14, by the biasing force of the vertical moving frame biasing spring 39.

Figure 20:
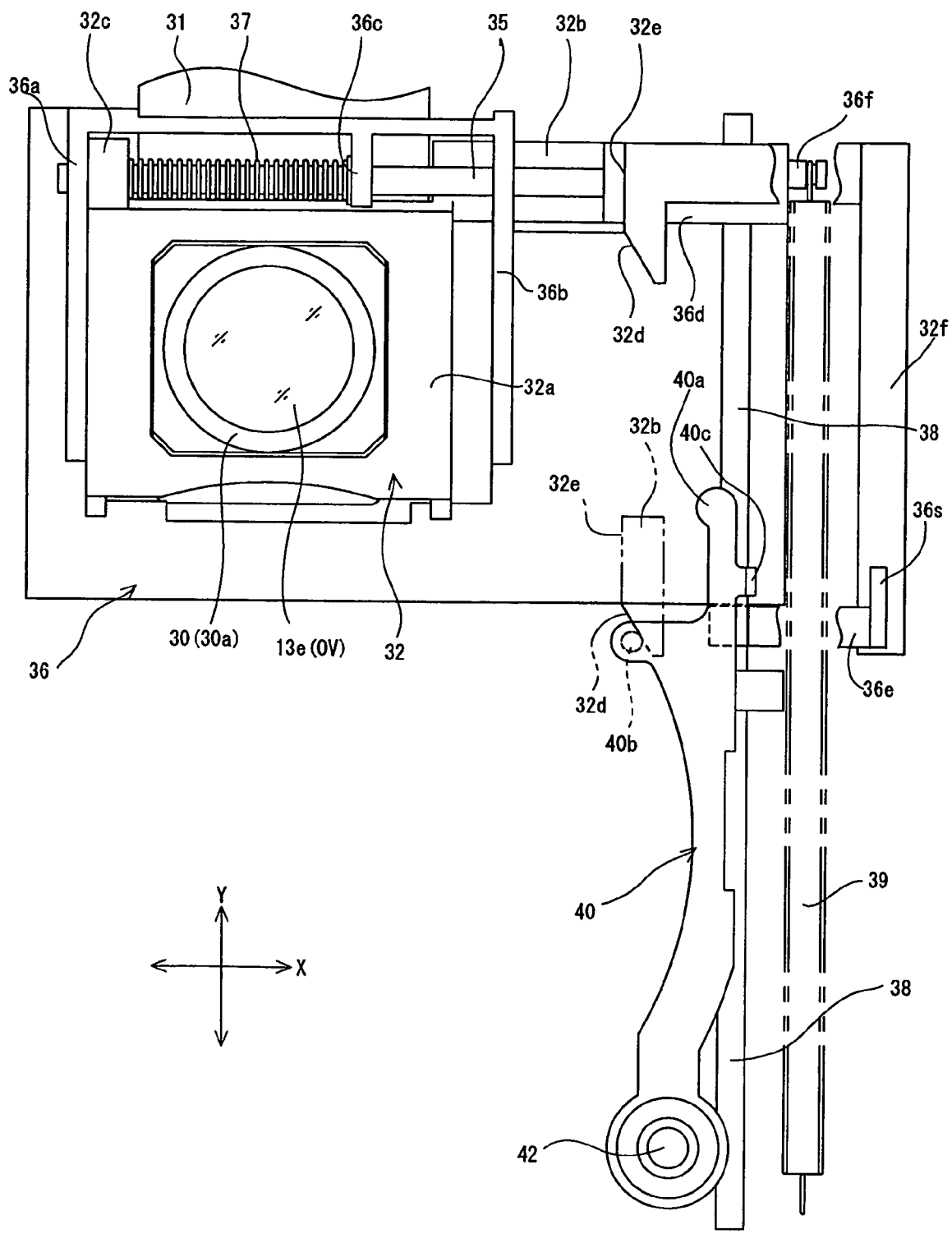
FIG. 20 is a front elevational view of elements shown in FIG. 19 for illustrating the relationship between the horizontal driving lever and the vertical motion of the CCD holder, the horizontal moving frame, and the vertical moving frame.

When the vertical moving frame 36 is retracted upward to the off-optical-axis retracted position Z2 as shown in FIG. 20, the position restricting surface 32e that is provided on the arm portion 32b of the horizontal moving frame 32 is disengaged from the operation pin 40b that is provided on the horizontal driving lever 40. This disengagement of the position restricting surface 32e from the operation pin 40b causes the horizontal moving frame 32 to move leftward as viewed in FIG. 20 by the biasing force of the horizontal moving frame biasing spring 37 up to a point at which the frame portion 32a of the horizontal moving frame 32 abuts against the motion restricting frame 36a of the vertical moving frame 36. From this state, upon the vertical moving frame 36 being moved down to the photographing optical axis Z1, the inclined surface 32d of the horizontal moving frame 32 comes in contact with the operation pin 40b as shown by two-dot chain lines in FIG. 20. The inclined surface 32d is inclined so as to guide the operation pin 40b to the position restricting surface 32e side according to the downward motion of the vertical moving frame 36. Therefore, upon the vertical moving frame 36 being moved down to the photographing position, the operation pin 40b is again engaged with the position restricting surface 32e as shown in FIG. 19 and the frame portion 32a of the horizontal moving frame 32 returns to the neutral position thereof between the motion restricting frame 36a and the motion restricting frame 36b.

As can be understood from the above description, in the present embodiment of the zoom lens 10, the vertical moving frame 36 is lifted from a position on the photographing optical axis Z1 by the driving force of the second stepping motor 70 to move a retractable optical unit which is composed of the third lens group 13e, the low-pass filter 13f and the CCD 13g to the off-optical-axis retracted position Z2 (into the retraction space SP) when the zoom lens is retracted to the retracted position. The second lens group 13d enters the space on the photographing optical axis Z1 which is created after the third lens group 13e, the low-pass filter 13f and the CCD 13g are retracted to the off-optical-axis retracted position Z2 as shown in FIG. 1, which makes it possible to reduce the thickness of the zoom lens 10 in the direction of the photographing optical axis Z1, and in turn makes it possible to achieve a compact camera incorporating the zoom lens 10 when the camera is in a non-photographing state even though the camera includes an optical image stabilizer.

In the zoom lens 10, the CCD holder 30 is driven in the x-axis direction and the y-axis direction by the first stepping motor 46 and the second stepping motor 70, which serve as drive sources for driving the CCD holder 30, to counteract image shake as mentioned above. A feature of the present invention is that the power consumption of the first stepping motor 46 and the second stepping motor 70 can be reduced when an image stabilizing operation is performed compared to that of the prior art. The technical principle therefor can be similarly applied to either the image stabilizing operation in the x-axis direction or the image stabilizing operation in the y-axis direction; and accordingly, each of the first stepping motor 46 and the second stepping motor 70 is also referred to as a stepping motor SM in the following description. Additionally, each of the x-gyro sensor 51 and the y-axis gyro sensor 52 is also referred to as a gyro sensor (shake velocity sensor) GS in the following description. The third lens group 13e, the low-pass filter 13f and the CCD image sensor 13g, which are driven when an image stabilizing operation is performed, will also be collectively referred to as image shake counteracting optical elements OV.

Figure 21:
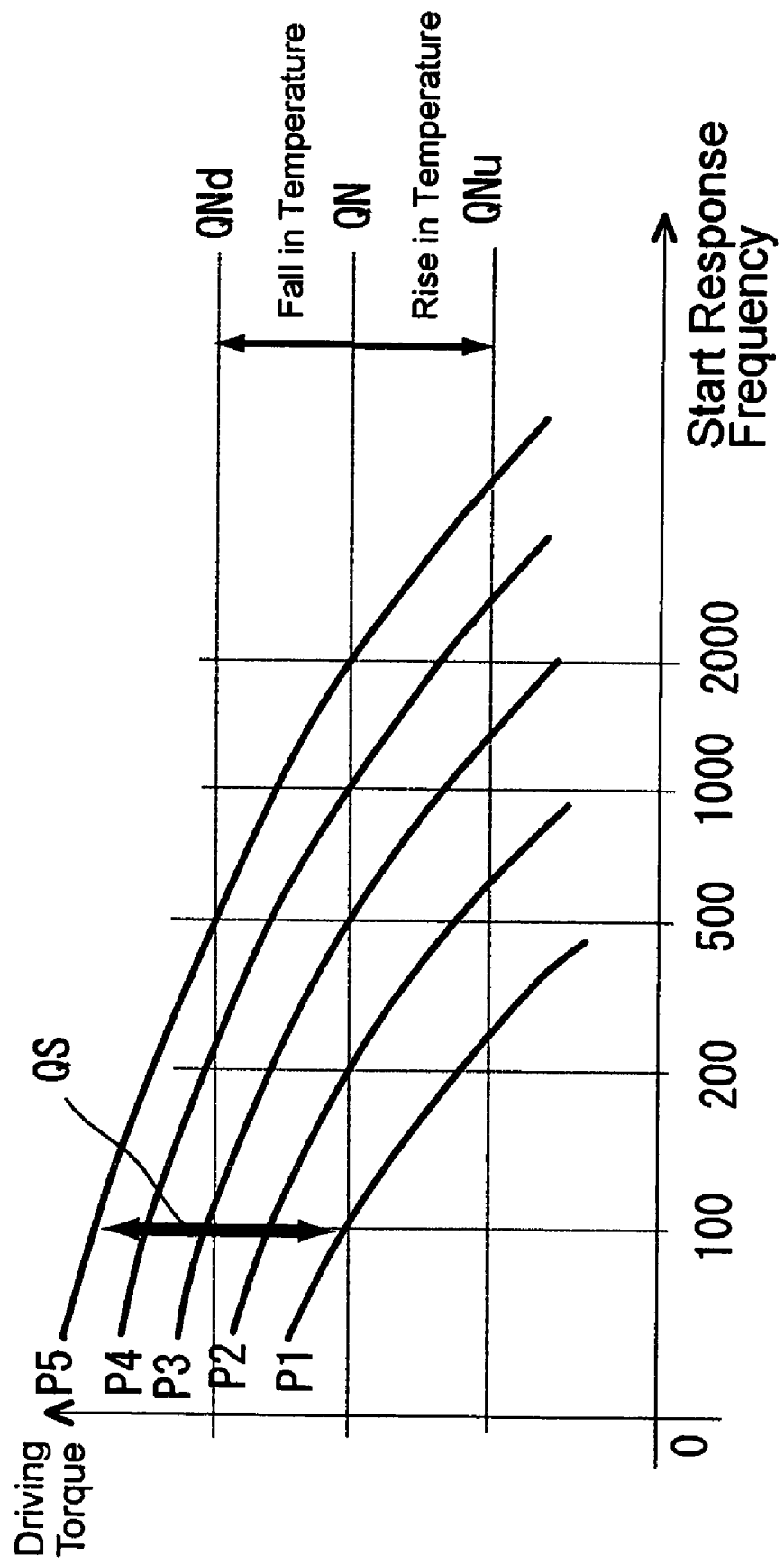
FIG. 21 is a graph showing characteristics of each stepping motor of the image stabilizing mechanism.

FIG. 21 shows characteristics of the stepping motor SM. The vertical axis shows the driving torque of the stepping motor SM which increases in a direction away from the origin (0). The horizontal axis shows the starting response frequency (maximum pulse speed), wherein the numerical value thereof increases in proportion to the driving amount of the stepping motor SM per unit of time, i.e., the speed (magnitude) of the camera shake. A driving torque QN necessary for driving the image shake counteracting optical elements OV is predetermined to be constant in accordance with the weight of movable parts including the image shake counteracting optical elements OV, the CCD holder 30, the horizontal moving frame 32 and the vertical moving frame 36 and the frictional resistance produced at sliding parts such as the horizontal guide shaft 35 and the vertical guide shaft 38. The energy (power) which should be given to the stepping motor SM to obtain the driving torque QN for driving the image shake counteracting optical elements OV varies depending on the starting response frequency and needs to be increased as the starting response frequency is greater. Therefore, in the prior art, a conventional stepping motor (which corresponds to the stepping motor SM) is driven at a constant power which satisfies the maximum driving frequency predetermined in accordance with the specifications thereof. For instance, in the case where the maximum driving frequency is 2 kHz, as plotted in the graph shown in FIG. 21, power P5 is applied to the stepping motor to drive the stepping motor at all times, regardless of variations of the actual driving frequency.

However, in the case where the maximum driving frequency is 100 Hz, a surplus torque QS that exceeds a necessary driving torque QN is produced if the stepping motor is driven at power P5 (see FIG. 21). The prevent invention has been devised from the viewpoint that the power consumption can be reduced by controlling the operation of the stepping motor SM in a manner to avoid such production of the surplus torque QS. In the present invention, the driving power which is supplied to the stepping motor SM is a variable power, not a constant power, and a low-level driving power is selected within a range in which the necessary driving torque QN is obtained in accordance with variations of the starting response frequency. Specifically, in the case where the starting response frequency is 100 Hz, 200 Hz, 500 Hz, 1 kHz and 2 kHz, powers P1, P2, P3, P4 and P5 having different magnitudes are supplied to the stepping motor SM to drive the stepping motor SM, respectively. The powers P1, P2, P3, P4 and P5 represent powers necessary to obtain the necessary driving torque QN at a starting response frequency of 100 Hz, 200 Hz, 500 Hz, 1 kHz and 2 kHz, respectively, having the following relationship:

P1<P2<P3<P4<P5.

Figure 22:
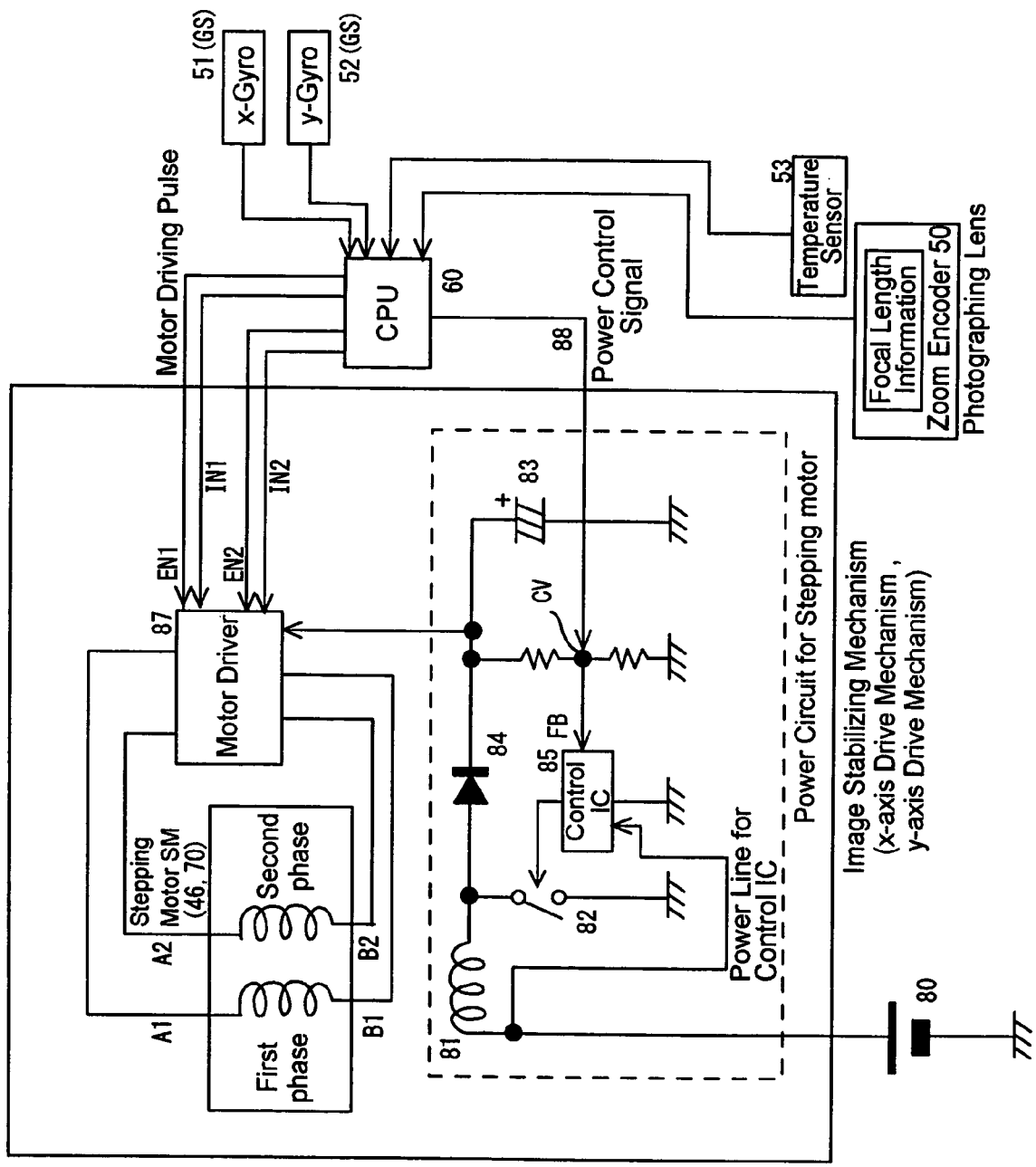
FIG. 22 is a schematic block diagram of an embodiment of a type of power circuit which changes the driving power for each stepping motor in accordance with voltage variations.

Since the equation "$P=V^2/R$" is established in a power circuit wherein power, voltage, resistance (constant value) are designated as P, V and R, respectively, the driving power supplied to the stepping motor SM can be adjusted by varying the voltage V. FIG. 22 shows an embodiment of a type of power circuit which changes the driving power supplied to the stepping motor in accordance with voltage variations. This power circuit is a switching regulator which is provided with a battery 80, a coil 81, a switching transistor 82, a smoothing capacitor 83, a diode 84 for backflow prevention, and a control IC 85 which controls ON/OFF operations of the switching transistor 82. As is known in the art, if the power circuit is short-circuited to the ground via the switching transistor 82, the switching transistor 82 is turned OFF (opened), which causes a current to be passed through the smoothing capacitor 83 so that the smoothing capacitor 83 accumulates electric charges. The control IC 85 compares a preset reference voltage with a comparison voltage input from a feedback terminal FB of the control IC 85, and controls ON/OFF operations of the switching transistor 82 so that the reference voltage and the comparison voltage become with the same as each other so as to maintain the output voltage of the power circuit at a prescribed voltage. Thereupon, the power circuit supplies power to a motor driver 87 so that the motor driver 87 drives the stepping motor SM in accordance with a motor driving signal output from the CPU 60. The stepping motor SM is a two-phase excitation stepping motor. A driving signal for the first phase (EN1, IN1) and a driving signal for the second phase (EN2, IN2) are sent to the motor driver 87.

Figure 23:
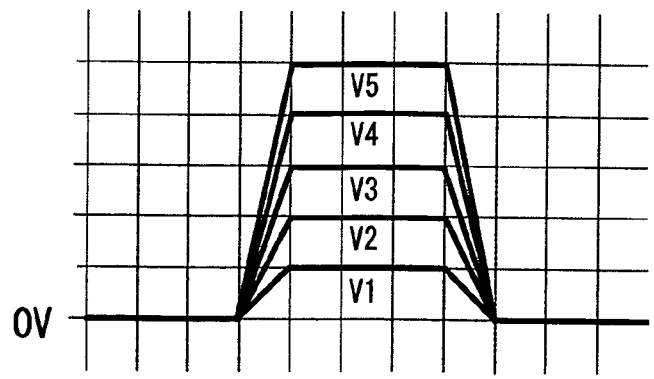
FIG. 23 is a waveform chart showing variations of the waveform of a driving pulse when the output voltage of the power circuit is changed.
Figure 24:
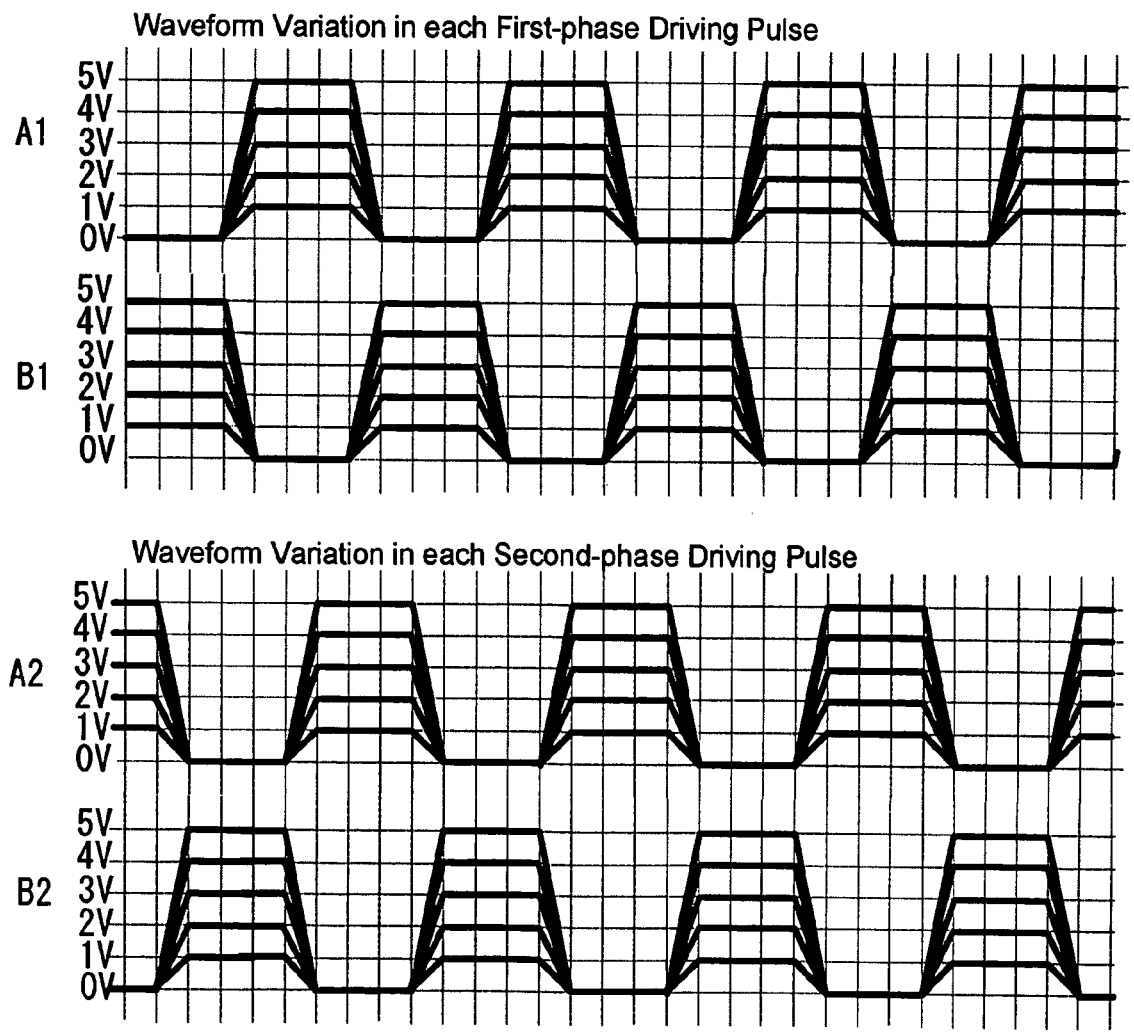
FIG. 24 shows waveform charts showing variations of the waveform of each of four driving pulses (two driving pulses for the first phase and two driving pulses for the second phase) for driving a two-phase excitation stepping motor, to which the concept of the waveform variations shown in FIG. 23 is applied.

The power circuit is provided with a control signal transmission line 88 for transmitting a voltage control signal from the CPU 60 to a voltage detection point CV for detection of the comparison voltage. Since the control IC 85 operates to make the comparison voltage correspond to the reference voltage as described above, the output voltage can be changed intentionally by inputting voltage information different from the actual comparison voltage to the voltage detection point CV. Specifically, the control IC 85 operates to increase the output voltage of the power circuit if a voltage lower than the reference voltage is input to the voltage detection point CV, and operates to decrease the output voltage of the power circuit if a voltage higher than the reference voltage is input to the voltage detection point CV. This control makes it possible to freely change the voltage supplied to the stepping motor SM. For instance, when the power P5 shown in FIG. 21 is required to obtain the necessary driving torque QN, the output voltage is set to a voltage V5, which is the greatest among five levels of voltages V1 through V5 shown in FIG. 23, and the control IC 85 controls the output voltage of the power circuit so that the output voltage at each driving pulse decreases in stages from V4 to V1 as the power level necessary to obtain the necessary driving torque QN decreases from P4 to P1. Since the stepping motor SM is a two-phase excitation stepping motor, there are actually four driving signals (pulse signals: two pulse signals A1 and B1 for the first phase and two pulse signal A2 and B2 for the second phase) in total as shown in FIG. 24, and the amplitude of each pulse changes according to variations (V1 through V5) of the output voltage in each driving signal.

Figure 25:
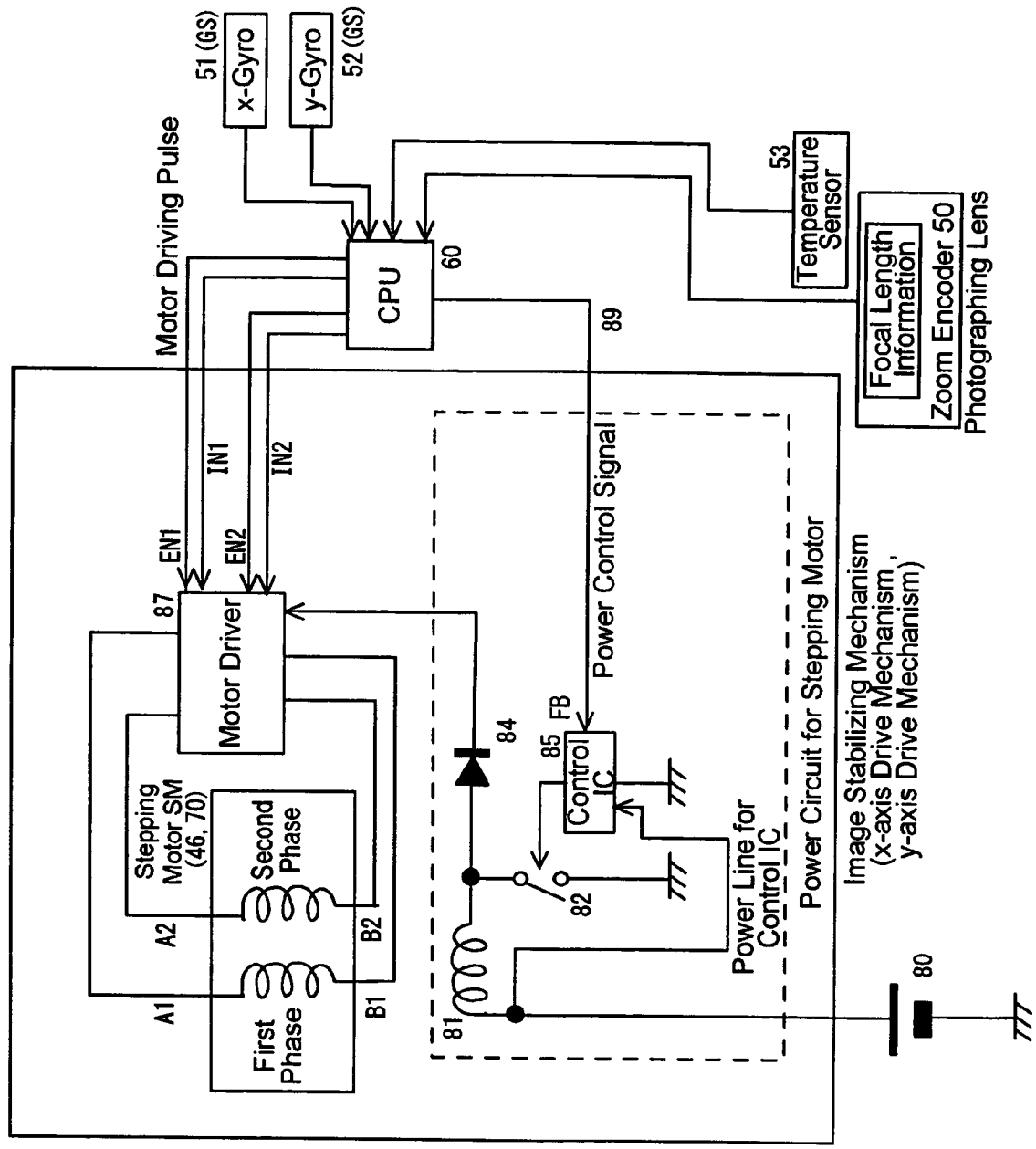
FIG. 25 is a schematic block diagram of an embodiment of a type of power circuit which changes the driving power for each stepping motor by changing the duty ratio in time-divided pulses or the frequency of time-divided pulses.

A type of power circuit as shown in FIG. 25 in which the operation of the control IC 85 is directly controlled by a voltage control signal transmitted from the CPU 60 can be used as another type of power circuit which changes the driving power supplied to the stepping motor SM, instead of the type of power circuit as shown in FIG. 22 in which feedback control with a comparison voltage is performed. The power circuit shown in FIG. 25 is different from the power circuit shown in FIG. 22 in that the power circuit shown in FIG. 25 does not have either the smoothing capacitor 83 or the voltage detection point CV that the power circuit shown in FIG. 22 has, and a control signal transmission line 89 for transmitting a voltage control signal from the CPU 60 is directly connected to the feedback terminal FB of the control IC 85. Except for these elements, the elements of the power circuit shown in FIG. 25 and the elements of the power circuit shown in FIG. 22 are identical. The control IC 85 controls ON/OFF operations of the switching transistor 82 in accordance with a voltage control signal transmitted from the CPU 60. In the type of power circuit shown in FIG. 25, the driving power supplied to the stepping motor SM can be changed by PWM (pulse width modulation) control or PFM (pulse frequency modulation) control.

As is known in the art, PWM control refers to the control of the driving power by time-dividing each unit pulse into a plurality of rectangular waves (divided pulses) and changing a periodic time of the rectangular waves and the ratio on the high-pulse side (pulse width/duty ratio). Namely, the driving power can be maintained at a desired level by increasing the duty ratio if the actual driving power drops below the desired level of driving power, and by decreasing the duty ratio if the actual driving power exceeds the desired level of driving power. By adapting this capability, the CPU 60 controls the operation of the control IC 85 to change the duty ratio so as to change the magnitude of the driving power supplied to the stepping motor SM. Specifically, the duty ratio is set to a maximum ratio to increase the driving power supplied to the stepping motor SM as shown in FIG. 26A in a state where the driving power P5 shown in FIG. 21 is necessary to counteract image shake. Conversely, in a state where the driving power P1 shown in FIG. 21 is sufficient for counteracting image shake, the duty ratio is set to a minimum ratio to decrease the driving power supplied to the stepping motor SM as shown in FIG. 26B. Although FIGS. 26A and 26B only show the case where the duty ratio is maximum and minimum, respectively, the magnitude of the driving power supplied to the stepping motor SM can be changed freely to any of the powers P2, P3 and P4 shown in FIG. 21 by setting the duty ratio to an intermediate ratio between the maximum and minimum duty ratios.

Figure 27B:
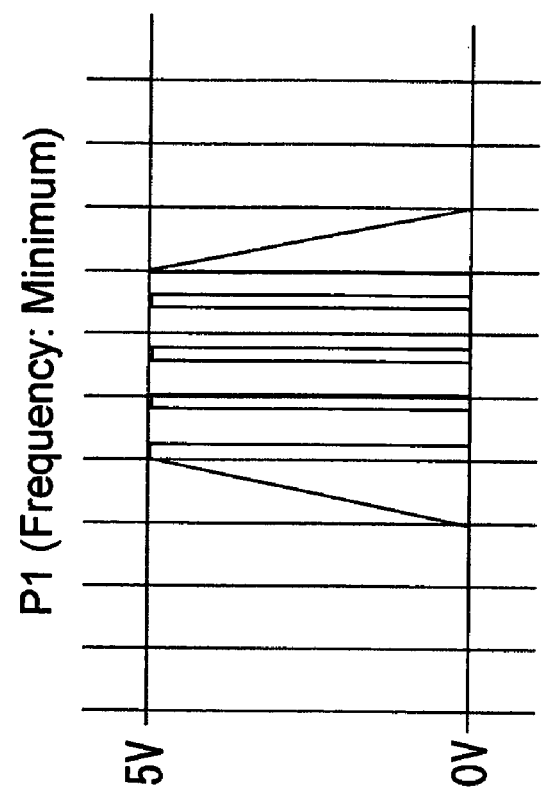
FIG. 27B is a waveform chart showing variations of the waveform of a driving pulse in the case where the frequency of time-divided pulses is set to a minimum frequency.
Figure 27A:
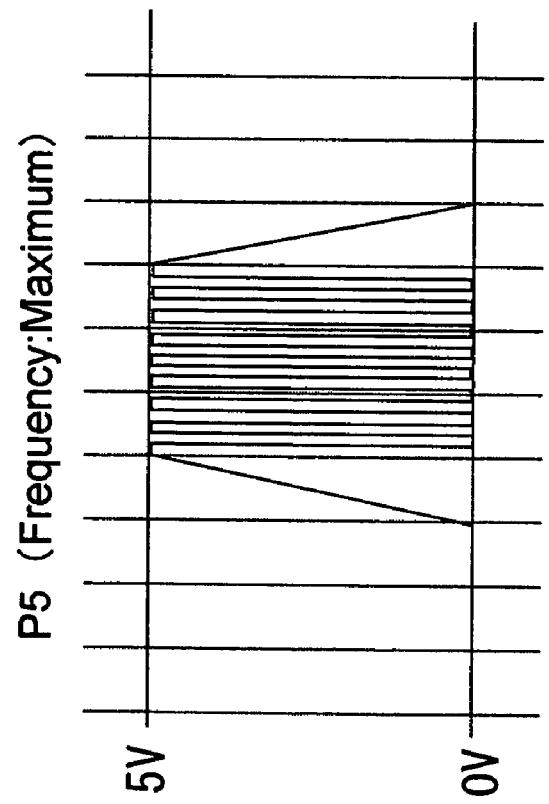
FIG. 27A is a waveform chart showing variations of the waveform of a driving pulse in the case where the frequency of time-divided pulses is set to a maximum frequency.

On the other hand, PFM control refers to the control of the output voltage by time-dividing each unit pulse into a plurality of rectangular waves (divided pulses) and making the time (width) on the high-pulse side invariable and the low-pulse side variable. Namely, PFM control controls the output voltage of the power circuit by changing the switching frequency per unit of pulse. Specifically, the driving power can be maintained at a desired level by increasing the frequency if the actual driving power drops below the desired level of driving power and by decreasing the frequency if the actual driving power exceeds the desired level of driving power, respectively. By adapting this capability, the CPU 60 controls the operation of the control IC 85 to change the frequency so as to change the magnitude of the driving power supplied to the stepping motor SM. Specifically, the frequency is set to a maximum frequency to increase the driving power supplied to the stepping motor SM as shown in FIG. 27A in a state where the driving power P5 shown in FIG. 21 is necessary to counteract image shake. Conversely, in a state where the driving power P1 shown in FIG. 21 is sufficient for counteracting image shake, the frequency is set to a minimum frequency to decrease the driving power supplied to the stepping motor SM as shown in FIG. 27B. Although FIGS. 27A and 27B only show the case where the frequency is maximum and minimum, respectively, the magnitude of the driving power supplied to the stepping motor SM can be changed freely to any of the powers P2, P3 and P4 shown in FIG. 21 by setting the frequency to an intermediate frequency between the maximum and minimum frequencies.

Figure 28:
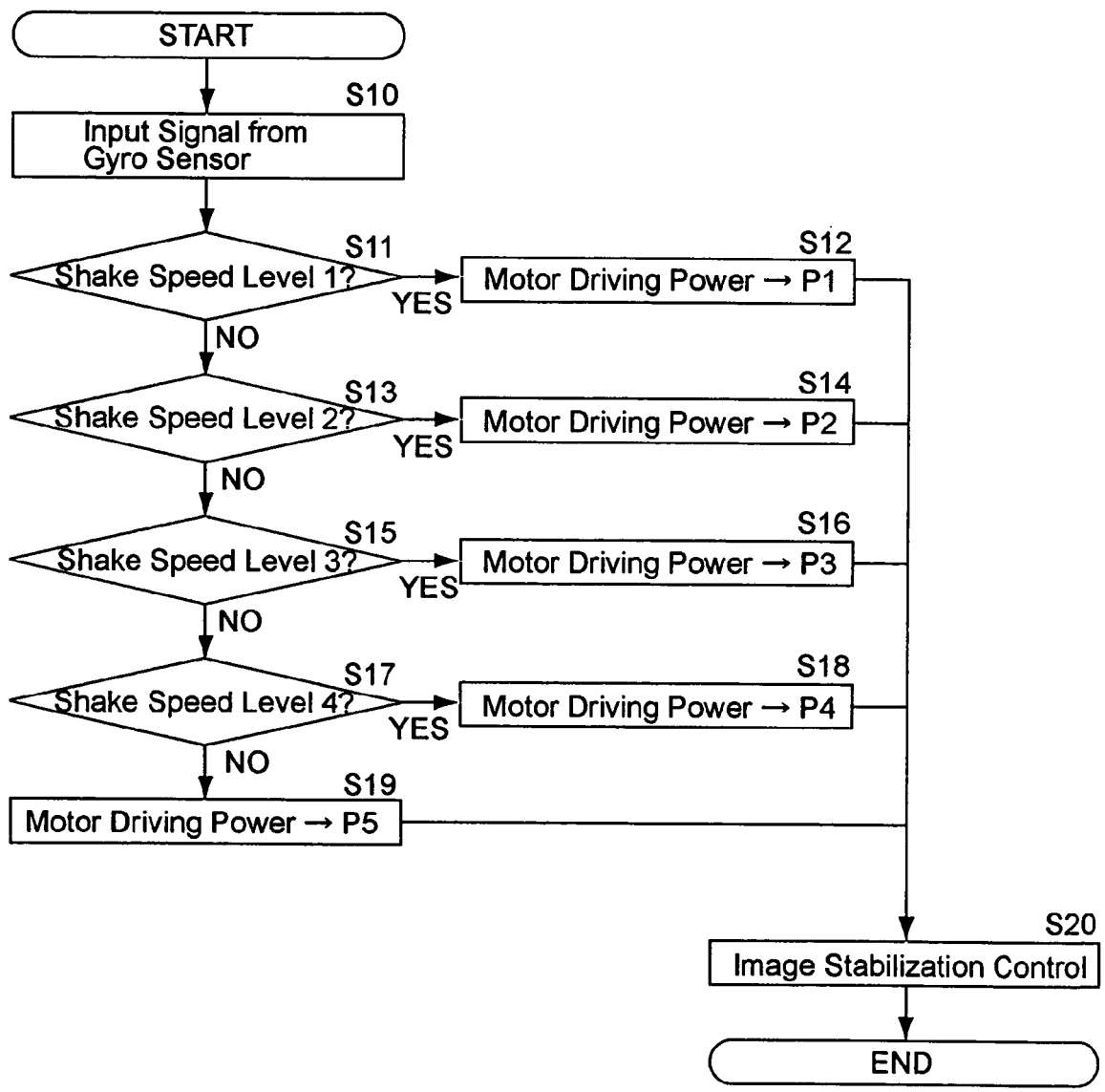
FIG. 28 is a flow chart showing a type of control which sets the driving power for each stepping motor based on data of the speed of camera shake which is input from a gyro sensor.
Figure 29:
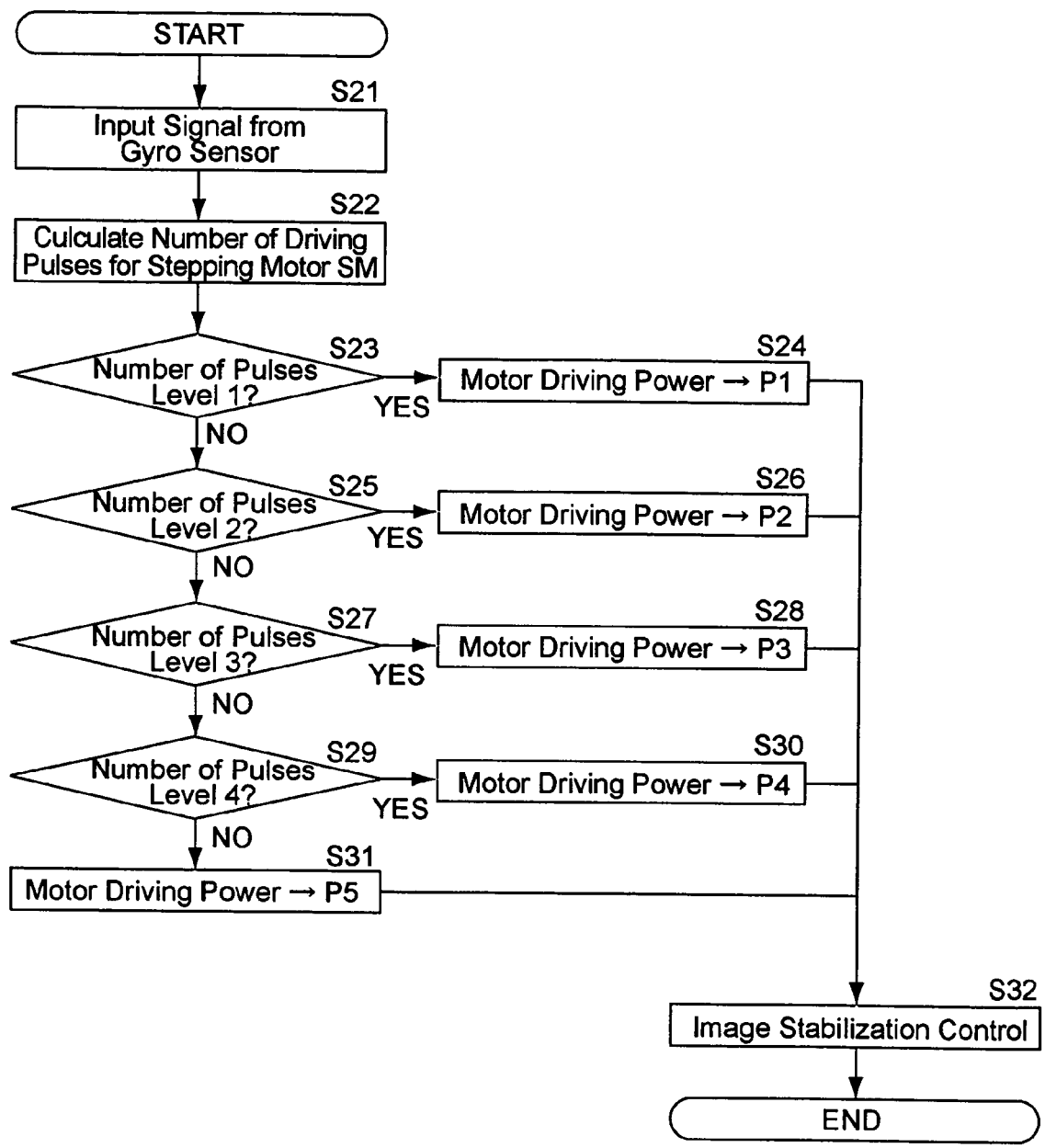
FIG. 29 is a flow chart showing a type of control which sets the driving power for each stepping motor based on the number of driving pulses which is obtained by calculation.

In summary, the driving power supplied to the stepping motor SM can be changed by adopting at least one of the following three techniques:

(1) Changing the output voltage per unit of pulse (2) Changing the duty ratio (pulse width) in time-divided pulses obtained as a result of time-dividing each unit pulse (3) Changing the frequency of time-divided pulses obtained as a result of time-dividing each unit pulse As described above, the power necessary for driving the stepping motor SM depends on the magnitude of the starting response frequency. The starting response frequency corresponds to the driving amount of the stepping motor SM per unit of time (the number of driving pulses for the stepping motor SM per unit of time), and this driving amount of the stepping motor SM per unit of time is determined to correspond to the speed (magnitude) of camera shake (image shake). Therefore, at each of the following two stages: the stage where the angular velocity of camera shake has been detected by the gyro sensor GS and the stage where the number of driving pulses for driving the stepping motor SM has been calculated, the magnitude of the driving power necessary for obtaining the necessary driving torque QN can be ascertained. FIG. 28 shows a type of control for setting the driving power for the stepping motor SM based on the data at the former stage, and FIG. 29 shows another type of control for setting the driving power for the stepping motor SM based on the data at the latter stage.

The control represented by the flow chart shown in FIG. 28 will be discussed hereinafter. Control enters this flow chart upon an image stabilization mode being selected, and each of the following steps is controlled by the CPU 60. Firstly, a signal (angular velocity signal) representing the angular velocity of vibration applied to the camera is input to the CPU 60 from the gyro sensor GS (step S10). The speed of camera shake is classified into five levels: level 1 (minimum level) to level 5 (maximum level), and it is determined which of the five levels the angular velocity signal input from the gyro sensor GS is in. If the angular velocity signal is within level 1 (if YES at step S11), the driving power is set to minimum power P1 (step S12). If the angular velocity signal is greater than level 1 and within level 2 (if NO at step S11 and YES at step S13), the driving power is set to the second smallest power: power P2 (step S14). Subsequently, in a similar manner, the driving power is set to P3 (step S16) if the angular velocity signal is greater than level 2 and within level 3 (if NO at step S13 and YES at step S15), or the driving power is set to P4 (step S18) if the angular velocity signal is greater than level 3 and within level 4 (if NO at step S15 and YES at step S17). If the angular velocity signal is greater than level 4 (if NO at step S17), this means the angular velocity signal is in level 5, so that the driving power is set to maximum power P5 (step S19). After each of the driving power setting operations at steps S12, S14, S16, S18 and S19, control proceeds to step S20 at which an image stabilization control is performed. The magnitude of the driving power Pn (n is any number between 1 and 5) set at each of steps S12, S14, S16, S18 and S19 is a sufficient value for obtaining at least the necessary driving torque QN at the corresponding level n (n is any number between 1 and 5) of angular velocity, and has the relationship "P1<P2<P3<P4<P5" (see FIG. 21). Setting and changing the driving power herein can be carried out by one of the above noted three techniques: (1) changing the output voltage per unit of pulse, (2) changing the duty ratio (pulse width) in time-divided pulses obtained as a result of time-dividing each unit pulse, and (3) changing the frequency of time-divided pulses obtained as a result of time-dividing each unit pulse.

For instance, regarding technique (1), with reference to the circuit shown in FIG. 22, the CPU 60 sets the power supply voltage supplied to the motor driver 87 to a minimum voltage V1 and a maximum voltage V5 if the angular velocity is in level 1 and level 5, respectively, and a voltage control signal corresponding to the set power supply voltage is input to the control IC 85. Thereupon, the control IC 85 controls ON/OFF operations of the switching transistor 82 in accordance with the voltage control signal input to the control IC 85 to make the power supply voltage that is supplied to the motor driver 87 one of the five voltages V1 to V5 which corresponds to the speed of image shake. Thereupon, the stepping motor SM is driven at the set driving power to move the image shake counteracting optical elements OV so that the image stabilization control is performed (step S20). In the image stabilization control at step S20, the angular velocity signal input from the gyro sensor GS is converted into a displacement of the imaging surface to determine the driving amount of the image shake counteracting optical elements OV, the number of driving pulses for driving the stepping motor SM is calculated, and the stepping motor SM is driven based on the calculated number of driving pulses. As long as the camera is in the image stabilization mode, the routine from step S11 to step S20 is repeated at a predetermined interval. In practice, the image stabilization control shown in FIG. 28 of the x-axis direction image stabilizing operation with the use of the x-gyro sensor 51 and the first stepping motor 46, and the image stabilization control shown in FIG. 28 of the y-axis direction image stabilizing operation with the use of the y-gyro sensor 52 and the second stepping motor 70, are carried out independently.

The control represented by the flow chart in FIG. 29 will be discussed hereinafter. Control enters this flow chart upon an image stabilization mode being selected, and each of the following steps is controlled by the CPU 60. Immediately after a signal (angular velocity signal), which represents the angular velocity of vibration applied to the camera, is input from the gyro sensor GS (step S21), this angular velocity signal is converted into a displacement of the imaging surface to determine the driving amount of the CCD 13g, and the number of driving pulses for driving the stepping motor SM is calculated (step S22). The control represented by the flow chart in FIG. 29 is different from that in FIG. 28 in that the driving power for the stepping motor SM is determined in accordance with the number of driving pulses for the stepping motor SM per unit of time which has been calculated at step S22, not in accordance with the angular velocity signal input at step S21. Subsequently, it is determined whether the number of driving pulses calculated at step S22 is in one of five levels: level 1 (minimum level) to level 5 (maximum level). If the number of driving pulses is within level 1 (if YES at step S23), the driving power is set to minimum power P1 (step S24). If the number of driving pulses is greater than level 1 and within level 2 (if NO at step S23 and YES at step S25), the driving power is set to the second smallest power: power P2 (step S26). Subsequently, in a similar manner, the driving power is set to P3 (step S28) if the number of driving pulses is greater than level 2 and within level 3 (if NO at step S25 and YES at step S27), or the driving power is set to P4 (step S30) if the number of driving pulses is greater than level 3 and within level 4 (if NO at step S27 and YES at step S29). If the number of driving pulses is greater than level 4 (if NO at step S29), this means the number of driving pulses is in level 5, so that the driving power is set to maximum power P5 (step S31). After each of the driving power setting operations at steps S24, S26, S28, S30 and S31, control proceeds to step S32 at which an image stabilization control is performed. The magnitude of the driving power Pn (n is any number between 1 and 5) set at each of steps S24, S26, S28, S30 and S31 is a sufficient value for obtaining at least the necessary driving torque QN at the corresponding level n (n is any number between 1 and 5) of the calculated number of driving pulses, and has the relationship "P1<P2<P3<P4<P5" (see FIG. 21). Setting and changing the driving power herein can be carried out by one of the above noted three techniques: (1) changing the output voltage per unit of pulse, (2) changing the duty ratio (pulse width) in time-divided pulses obtained as a result of time-dividing each unit pulse, and (3) changing the frequency of time-divided pulses obtained as a result of time-dividing each unit pulse. For instance, in the case of technique (1), the CPU 60 sets the power supply voltage supplied to the motor driver 87 to one of the five voltages V1 to V5 which corresponds to the calculated number of driving pulses. The control IC 85 operates to make the power supply voltage that is supplied to the motor driver 87 one of the five voltages V1 to V5 which corresponds to the number of driving pulses per unit of time. Thereupon, the stepping motor SM is driven at the set driving power to move the image shake counteracting optical elements OV so that the image stabilization control is performed (step S32). As long as the camera is in the image stabilization mode, the routine from step S21 to step S32 is repeated at a predetermined interval. In practice, the image stabilization control shown in FIG. 29 of the x-axis direction image stabilizing operation with the use of the x-gyro sensor 51 and the first stepping motor 46, and the image stabilization control shown in FIG. 29 of the y-axis direction image stabilizing operation with the use of the y-gyro sensor 52 and the second stepping motor 70, are carried out independently.

As can be understood from the above description, the power consumption of the stepping motor SM can be reduced by changing power supplied to the stepping motor SM from the power circuit as appropriate in accordance with conditions such as the speed of camera shake detected by the gyro sensor GS or the number of driving pulses per unit of time. Since the set driving power P1, P2, P3, P4 or P5, with which the necessary driving torque QN (see FIG. 21) can be obtained, is appropriately selected under such conditions, the image shake counteracting optical elements OV can be driven at an adequate speed with no deterioration in performance of the optical image stabilizer even if the driving power is varied. Although the driving power for the stepping motor SM is changed in five levels in each of the two types of controls shown in FIGS. 28 and 29, this driving power changing manner is only one example. Namely, the driving power for the stepping motor SM can be changed in more than five levels or less than five levels.

As shown in FIG. 21, the driving torque of the stepping motor SM which is necessary for driving the image shake counteracting optical elements OV is also sensitive to the ambient temperature. The necessary driving torque QN increases as the ambient temperature decreases (see QNd in FIG. 21, while the necessary driving torque QN decreases as the ambient temperature increases (see QNu in FIG. 21). Therefore, it is further desirable that the driving power for the stepping motor SM be set in consideration of the ambient temperature in addition to the above noted conditions such as angular velocity information and the number of driving pulses per unit of time. The zoom lens 10 is provided with a temperature sensor 53 (see FIGS. 5, 22 and 25) so that the driving power for the stepping motor SM can be set in consideration of temperature data input from the temperature sensor 53. Another type of control for setting the driving power for the stepping motor SM in consideration of this temperature data in addition to the above noted conditions will be discussed hereinafter with reference to the flow charts shown in FIGS. 30 and 31.

Figure 30:
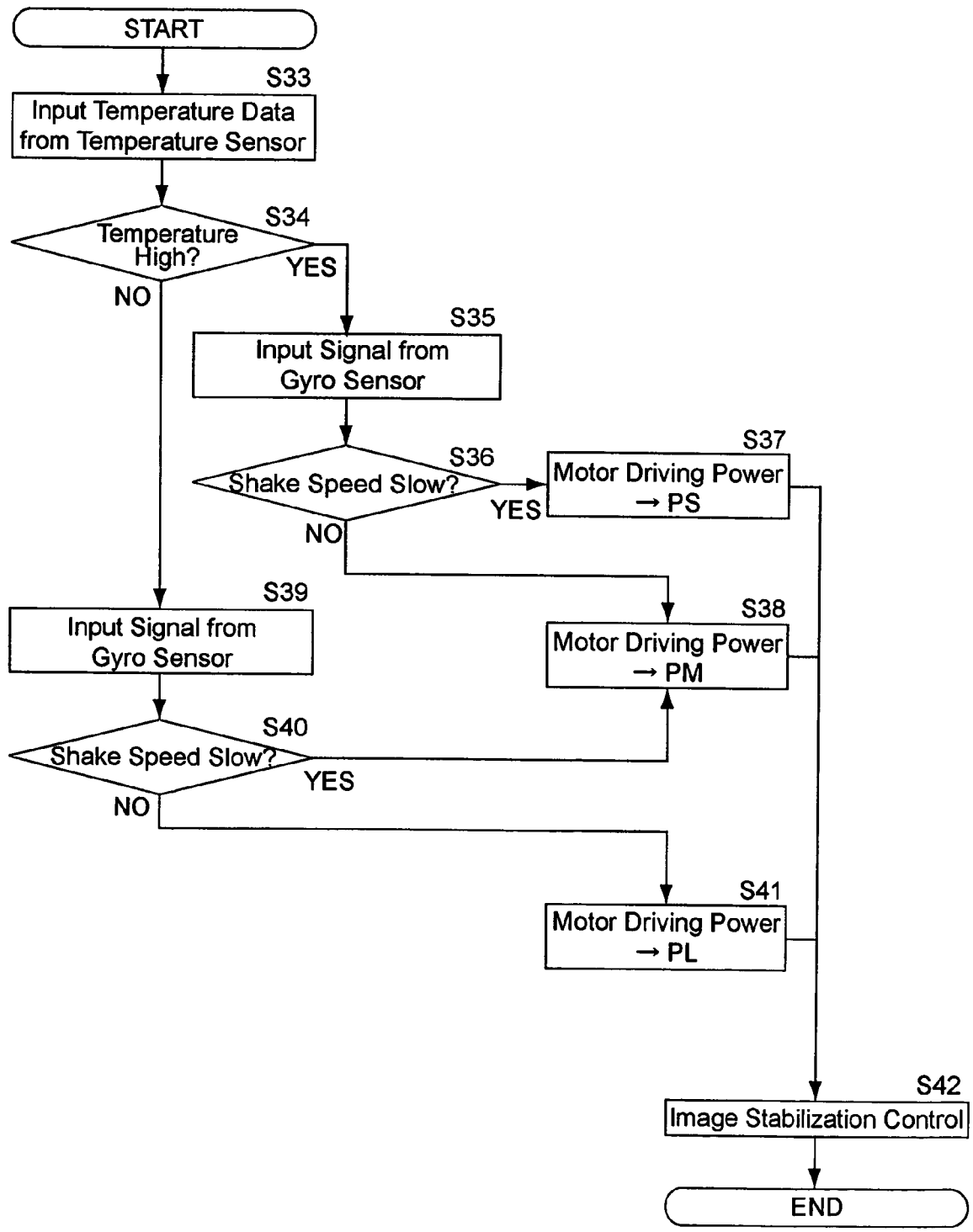
FIG. 30 is a flow chart showing a type of control which sets the driving power for each stepping motor in consideration of data on the ambient temperature in addition to data on the speed of camera shake that is input from a gyro sensor.

The flow chart shown in FIG. 30 shows a type of control for setting the driving power for the stepping motor SM in accordance with the angular velocity signal output from the gyro sensor GS, similar to the control represented by the flow chart shown in FIG. 28. Immediately after an image stabilization mode is selected, firstly temperature data output from the temperature sensor 53 is input (step S33), and subsequently it is determined whether the temperature is higher than a predetermined temperature (step S34). If the temperature is higher than the predetermined temperature (if YES at step S34), control proceeds to step S35 at which the angular velocity signal is input from the gyro sensor GS and subsequently proceeds to step S36 at which it is determined whether the speed of camera shake is lower than a predetermined value. If the speed of camera shake is lower than the predetermined value (if YES at step S36), the driving power is set to minimum power PS (step S37). If the speed of camera shake is equal to or greater than the predetermined value (if NO at step S36), the driving power is set to power PM which is higher than power PS (step S38). If the temperature is equal to or lower than the predetermined temperature (if NO at step S34), control proceeds to step S39 at which the angular velocity signal is input from the gyro sensor GS, and subsequently proceeds to step S40 at which it is determined whether the speed of camera shake is lower than the predetermined value. If the speed of camera shake is lower than the predetermined value (if YES at step S40), the driving power for the stepping motor SM is set to power PM (step S38). On the other hand, if the speed of camera shake is equal to or greater than the predetermined value (if NO at step S40), the driving power is set to maximum power PL (step S41). After each of the operations at steps S37, S38 and S41, the stepping motor SM is driven at the set driving power PS, PM or PL to move the image shake counteracting optical elements OV so that the image stabilization control is performed (step S42). In the image stabilization control at step S42, the angular velocity signal input from the gyro sensor GS is converted into a displacement of the imaging surface to determine the driving amount of the CCD 13g, the number of driving pulses for driving the stepping motor SM is calculated, and the stepping motor SM is driven based on the calculated number of driving pulses. To set the driving power to powers PS, PM and PL at step S37, S38 and S41, respectively, only one of the above described techniques (1), (2) and (3) needs to be used. In practice, the image stabilization control shown in FIG. 30 of the x-axis direction image stabilizing operation with the use of the x-gyro sensor 51 and the first stepping motor 46, and the image stabilization control shown in FIG. 30 of the y-axis direction image stabilizing operation with the use of the y-gyro sensor 52 and the second stepping motor 70, are carried out independently.

Namely, in the control shown in FIG. 30, the driving power for the stepping motor SM is set to minimum power PS under minimum load conditions in which the temperature is high while the speed of camera shake is low, the driving power for the stepping motor SM is set to maximum power PL under maximum load conditions in which the temperature is low while the speed of camera shake is high, and the driving power for the stepping motor SM is set to intermediate power PM if the loads caused by one and the other of the temperature and the speed of camera shake are high and low, respectively. Hence, it possible to drive the stepping motor SM at an appropriate driving power to thereby reduce the power consumption of the stepping motor SM.

Figure 31:
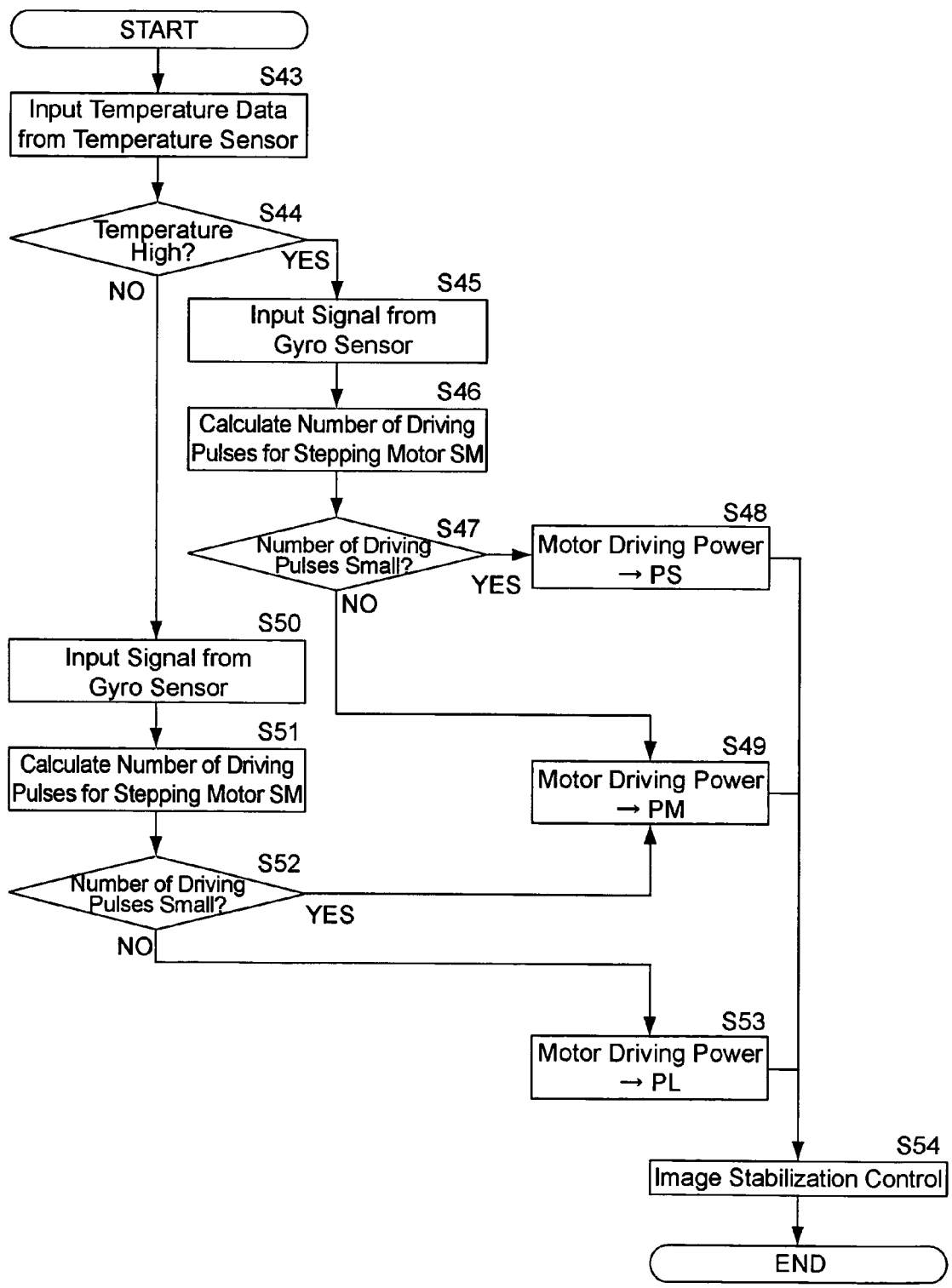
FIG. 31 is a flow chart showing a type of control which sets the driving power for each stepping motor in consideration of data on the ambient temperature in addition to the number of driving pulses which is obtained by calculation.

The flow chart in FIG. 31 shows a type of control which uses the calculated number of driving pulses for driving the stepping motor SM used for setting the driving power for the stepping motor SM, similar to the control represented by the flow chart shown in FIG. 29. Immediately after an image stabilization mode is selected, firstly temperature data output from the temperature sensor 53 is input (step S43), and subsequently it is determined whether the temperature is higher than a predetermined temperature (step S44). If the temperature is higher than the predetermined temperature (if YES at step S44), control proceeds to step S45 at which the angular velocity signal is input from the gyro sensor GS, and subsequently proceeds to step S46 at which the number of driving pulses for driving the stepping motor SM (46 and 70) is calculated in accordance with the angular velocity signal input from the gyro sensor GS. Subsequently, it is determined whether this calculated number of driving pulses per unit of time is smaller than a predetermined number (step S47). If the calculated number of driving pulses per unit of time is smaller than the predetermined number (if YES at step S47), the driving power is set to minimum power PS (step S48). If the calculated number of driving pulses per unit of time is equal to or greater than the predetermined number (if NO at step S47), the driving power is set to power PM which is higher than power PS (step S49). If the temperature is equal to or lower than the predetermined temperature (if NO at step S44), control proceeds to step S50 at which the angular velocity signal is input from the gyro sensor GS and subsequently proceeds to step S51 at which the number of driving pulses for driving the stepping motor SM (46 and 70) is calculated in accordance with the angular velocity signal input from the gyro sensor GS. Subsequently, it is determined whether this calculated number of driving pulses per unit of time is smaller than a predetermined number (step S52). If the calculated number of driving pulses per unit of time is smaller than the predetermined number (if YES at step S52), the driving power is set to power PM (step S49). If the calculated number of driving pulses per unit of time is equal to or greater than the predetermined number (if NO at step S52), the driving power is set to maximum power PL (step S53). After each of the operations at steps S48, S49 and S53, the stepping motor SM is driven at the set driving power PS, PM or PL to move the image shake counteracting optical elements OV so that the image stabilization control is performed (step S54). To set the driving power to powers PS, PM and PL at step S48, S49 and S53, respectively, one of the above described techniques (1), (2) and (3) only needs to be used. In practice, the image stabilization control shown in FIG. 31 of the x-axis direction image stabilizing operation with the use of the x-gyro sensor 51 and the first stepping motor 46, and the image stabilization control shown in FIG. 31 of the y-axis direction image stabilizing operation with the use of the y-gyro sensor 52 and the second stepping motor 70, are carried out independently.

Namely, in the control shown in FIG. 31, the driving power for the stepping motor SM is set to minimum power PS under minimum load conditions in which the temperature is high while the calculated number of driving pulses per unit of time is small, the driving power for the stepping motor SM is set to maximum power PL under maximum load conditions in which the temperature is low while the calculated number of driving pulses per unit of time is great, and the driving power for the stepping motor SM is set to intermediate power PM if the loads caused by one and the other of the temperature and the calculated number of driving pulses per unit of time are high and low, respectively. Hence, it possible to drive the stepping motor SM at an appropriate driving power to thereby reduce the power consumption of the stepping motor SM.

In this manner, setting the driving power for the stepping motor SM in consideration of variations in the ambient temperature makes accurate power management possible, thus making it possible to improve the power-saving efficiency of the stepping motor SM. Although the driving power for the stepping motor SM is changed in three levels in each of the two types of controls shown in FIGS. 30 and 31, this driving power changing manner is only one example. Namely, the driving power for the stepping motor SM can be changed in more than three levels. For instance, although the common driving power PM is set under two conditions in each of the two types of controls shown in FIGS. 30 and 31, two driving powers having different power levels can be set under the two conditions, respectively. Additionally, more accurate power management is possible by further dividing the determining criteria of each of conditions such as the ambient temperature, the speed of camera shake and the number of driving pulses for driving the stepping motor SM.

As an additional advantage, the driving amount of the stepping motor SM when an image stabilizing operation is performed varies in accordance with variations in focal length of the zoom lens 10, the driving amount decreases and increases as the focal length becomes shorter and longer, respectively. Hence, the power consumption of the stepping motor SM can be reduced by changing the driving power for the stepping motor SM in accordance with focal length information obtained from the zoom encoder 50.

Figure 32:
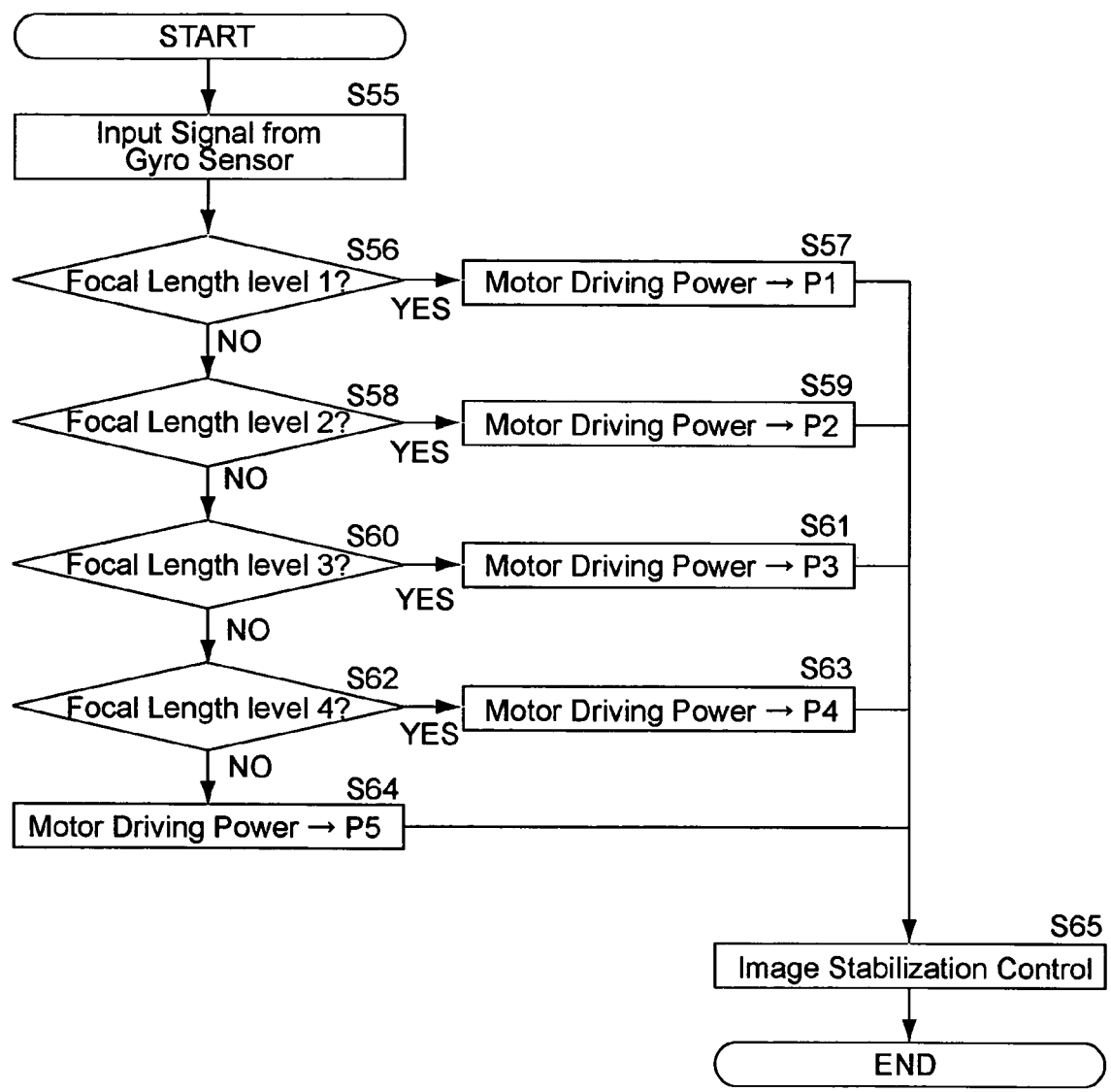
FIG. 32 is a flow chart showing a type of control which sets the driving power for each stepping motor based on focal length information.

This type of control is represented by the flow chart shown in FIG. 32. Control enters this flow chart upon an image stabilization mode being selected, and each of the following steps is controlled by the CPU 60. Firstly, at step S55 focal length information (information on focal length of the photographing optical system of the zoom lens 10) is input to the CPU 60 from the zoom encoder 50. In the control represented by the flow chart shown in FIG. 32, the range of focal lengths is classified into five levels: level 1 (a short-focal length range that is closest to the wide-angle extremity) to level 5 (a long-focal length range that is closest to the telephoto extremity), and it is determined which of five levels the focal length information input from the zoom encoder 50 is in. If the focal length is within level 1 (if YES at step S56), the driving power is set to minimum power P1 (step S57). If the focal length is greater than level 1 and within level 2 (if NO at step S56 and YES at step S58), the driving power is set to the second smallest power: power P2 (step S59). Subsequently, in a similar manner, the driving power is set to P3 (step S61) if the focal length is greater than level 2 and within level 3 (if NO at step S58 and YES at step S60), or the driving power is set to P4 (step S63) if the focal length is greater than level 3 and within level 4 (if NO at step S60 and YES at step S62). If the focal length is greater than level 4 (if NO at step S62), this means the focal length is in level 5 that is closest to the telephoto extremity, so that the driving power is set to maximum power P5 (step S64). After each of the driving power setting operations at steps S57, S59, S61, S63 and S64, control proceeds to step S65 at which an image stabilization control is performed. The magnitude of the driving power Pn (n is any number between 1 and 5) set at each of steps S57, S59, S61, S63 and S64 is a sufficient value for obtaining at least the necessary driving torque QN at the corresponding level n (n is any number between 1 and 5) of angular velocity, and has the relationship "P1<P2<P3<P4<P5" (see FIG. 21). Setting and changing the driving power herein can be carried out by one of the above noted three techniques: (1) changing the output voltage per unit of pulse, (2) changing the duty ratio (pulse width) in time-divided pulses obtained as a result of time-dividing each unit pulse, and (3) changing the frequency of time-divided pulses obtained as a result of time-dividing each unit pulse.

For instance, regarding technique (1), with reference to the circuit shown in FIG. 22, the CPU 60 sets the power supply voltage supplied to the motor driver 87 to a minimum voltage V1 and a maximum voltage V5 if the focal length is in level 1 and level 5, respectively, and a voltage control signal corresponding to the set power supply voltage is input to the control IC 85. Thereupon, the control IC 85 controls ON/OFF operations of the switching transistor 82 in accordance with the voltage control signal input to the control IC 85 to make the power supply voltage that is supplied to the motor driver 87 one of the five voltages V1 to V5 which corresponds to the focal length. Thereupon, the stepping motor SM is driven at the set driving power to move the image shake counteracting optical elements OV so that the image stabilization control is performed (step S65). In the image stabilization control at step S65, the angular velocity signal input from the gyro sensor GS is converted into a displacement of the imaging surface to determine the driving amount of the image shake counteracting optical elements OV, the number of driving pulses for driving the stepping motor SM is calculated, and the stepping motor SM is driven based on the calculated number of driving pulses. Since the driving amount of the stepping motor SM is also sensitive to variations in focal length of the zoom lens 10, the number of driving pulses for driving the stepping motor SM is calculated in consideration of the focal length information obtained via the zoom encoder 50. As long as the camera is in the image stabilization mode, the routine from step S55 to step S65 is repeated at a predetermined interval. In practice, the image stabilization control shown in FIG. 32 of the x-axis direction image stabilizing operation with the use of the x-gyro sensor 51 and the first stepping motor 46, and the image stabilization control shown in FIG. 32 of the y-axis direction image stabilizing operation with the use of the y-gyro sensor 52 and the second stepping motor 70, are carried out independently.

As can be understood from the above description, the power consumption of the stepping motor SM can be reduced by changing power supplied to the stepping motor SM from the power circuit as appropriate in accordance with focal length information obtained via the zoom encoder 50. Since the set driving power P1, P2, P3, P4 or P5 with which the necessary driving torque QN (see FIG. 21) can be obtained is appropriately selected under such focal length conditions, the image shake counteracting optical elements OV can be driven at an adequate speed with no deterioration in performance of the optical image stabilizer even if the driving power is varied. Although the driving power for the stepping motor SM is changed in five levels in the type of control shown in FIG. 32, this driving power changing manner is only one example. Namely, the driving power for the stepping motor SM can be changed in more than five levels or less than five levels. Moreover, although the number of driving pulses is calculated at step S65 after the driving power for the stepping motor is set based on focal length information, the number of driving pulses can be calculated before the driving power is set, or the driving-power setting operation and the driving-pulse-number calculating operation can be performed simultaneously if possible.

As mentioned above, the driving torque of the stepping motor SM which is necessary for driving the image shake counteracting optical elements OV is also sensitive to the ambient temperature (see FIG. 21). The necessary driving torque QN increases as the ambient temperature decreases (see QNd in FIG. 21), and the necessary driving torque QN decreases as the ambient temperature increases (see QNu in FIG. 21). Therefore, it is more desirable that the driving power for the stepping motor SM be set in consideration of the ambient temperature in addition to variations in focal length of the zoom lens 10. Another type of control for setting the driving power for the stepping motor SM in consideration of temperature data input from the temperature sensor 53 in addition to focal length data will be discussed hereinafter with reference to the flow charts shown in FIG. 33.

In the control represented by the flow chart shown in FIG. 33, upon an image stabilization mode being selected, firstly temperature data output from the temperature sensor 53 is input (step S66), and subsequently it is determined whether the temperature is higher than a predetermined temperature (step S67). If the temperature is higher than the predetermined temperature (if YES at step S67), control proceeds to step S68 at which focal length information is input from the zoom encoder 50 and subsequently proceeds to step S69 at which it is determined whether the focal length is shorter than a predetermined focal length. If the focal length is shorter than the predetermined focal length (if YES at step S69), the driving power is set to minimum power PS (step S70). If the focal length is equal to or longer than the predetermined focal length (if NO at step S69), the driving power is set to power PM which is higher than power PS (step S71). If the temperature is equal to or lower than the predetermined temperature (if NO at step S67), control proceeds to step S72 at which focal length information is input from the zoom encoder 50 and subsequently proceeds to step S73 at which it is determined whether the focal length is shorter than the predetermined focal length. If the focal length is shorter than the predetermined focal length (if YES at step S73), the driving power for the stepping motor SM is set to power PM (step S71). On the other hand, if the focal length is equal to or longer than the predetermined focal length (if NO at step S73), the driving power is set to maximum power PL (step S74). After each of the operations at steps S70, S71 and S74, the stepping motor SM is driven at the set driving power PS, PM or PL to move the image shake counteracting optical elements OV so that the image stabilization control is performed (step S75). In the image stabilization control at step S75, the angular velocity signal input from the gyro sensor GS is converted into a displacement of the imaging surface to determine the driving amount of the CCD 13g, the number of driving pulses for driving the stepping motor SM is calculated, and the stepping motor SM is driven based on the calculated number of driving pulses. In the calculation of the number of driving pulses for driving the stepping motor, the number of driving pulses is calculated in consideration of the focal length information obtained via the zoom encoder 50. To set the driving power to powers PS, PM and PL at step S70, S71 and S74, respectively, only one of the above described techniques (1), (2) and (3) needs to be used. In practice, the image stabilization control shown in FIG. 33 of the x-axis direction image stabilizing operation with the use of the x-gyro sensor 51 and the first stepping motor 46, and the image stabilization control shown in FIG. 33 of the y-axis direction image stabilizing operation with the use of the y-gyro sensor 52 and the second stepping motor 70, are carried out independently.

Figure 33:
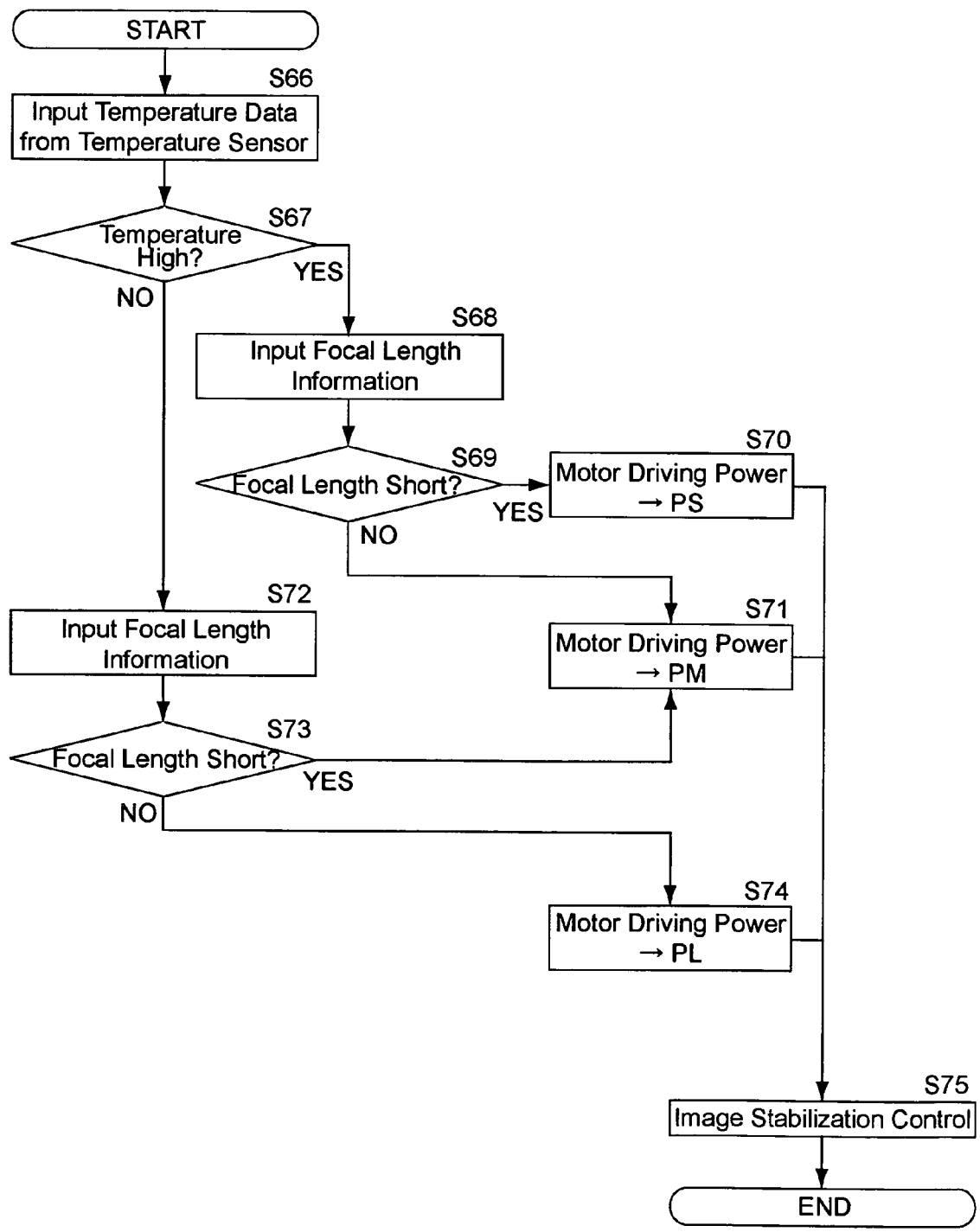
FIG. 33 is a flow chart showing a type of control which sets the driving power for each stepping motor in consideration of data on the ambient temperature in addition to focal length information.

Namely, in the control shown in FIG. 33, the driving power for the stepping motor SM is set to minimum power PS under minimum load conditions in which the temperature is high while the focal length is short, the driving power for the stepping motor SM is set to maximum power PL under maximum load conditions in which the temperature is low while the focal length is long, and the driving power for the stepping motor SM is set to intermediate power PM if the loads caused by one and the other of the temperature and the focal length are high (or long) and low (or short), respectively. Hence, it possible to drive the stepping motor SM at an appropriate driving power to thereby reduce the power consumption of the stepping motor SM.

In this manner, setting the driving power for the stepping motor SM in consideration of variations in the ambient temperature makes accurate power management possible, thus making it possible to improve the power-saving efficiency of the stepping motor SM. Although the driving power for the stepping motor SM is changed in three levels in the type of control shown in FIG. 33, this driving power changing manner is only one example. Namely, the driving power for the stepping motor SM can be changed in more than three levels. For instance, although the common driving power PM is set under two conditions in the type of control shown in FIG. 33, two driving powers having different power levels can be set under the two conditions, respectively. Additionally, more accurate power management is possible by further dividing the determining criteria of each of conditions such as the ambient temperature and focal length.

In the controlling methods shown in FIGS. 32 and 33, the driving power for the stepping motor SM is set in consideration of information on the speed of camera shake that is output from the gyro sensor GS in addition to focal length information input from the zoom encoder 50 at steps S65 and S75 in FIGS. 32 and 33, respectively, since the number of driving pulses for the stepping motor SM varies according to, not only focal length, but also the speed of camera shake.

Although the zoom lens 10 having a non-interchangeable lens has been discussed above, the present invention can be applied to not only an imaging device having such a zoom lens but also an imaging device having a fixed-focal-length type of interchangeable lens. Accordingly, in terms of the focal length being changeable, interchanging fixed-focal-length interchangeable lenses having different focal lengths is substantially the same as changing the focal length of a zoom lens. Hence, in a configuration wherein interchangeable lenses for an imaging device have readable focal length information so that this information is read out to be input to a controller for an image stabilizing operation of the imaging device upon the interchangeable lens being mounted to the imaging device, power consumption can be reduced by changing the driving power supplied to the stepping motor in accordance with focal length, similar to the above described control for a zoom lens.

Figure 34:
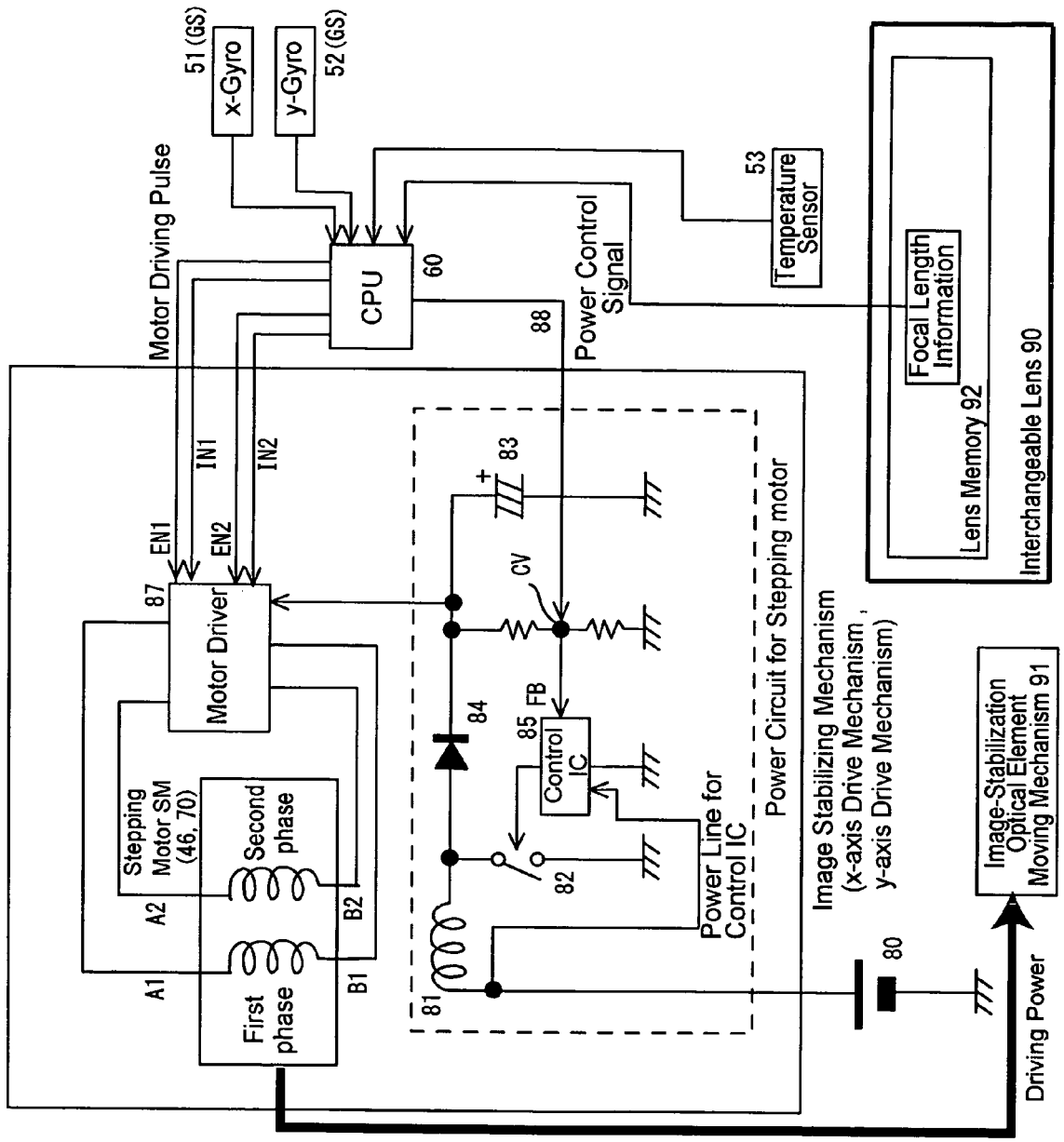
FIG. 34 is a schematic block diagram of an embodiment of a type of power circuit which corresponds to the type of power circuit shown in FIG. 22 in the case where a fixed-focal-length interchangeable lens is used.
Figure 35:
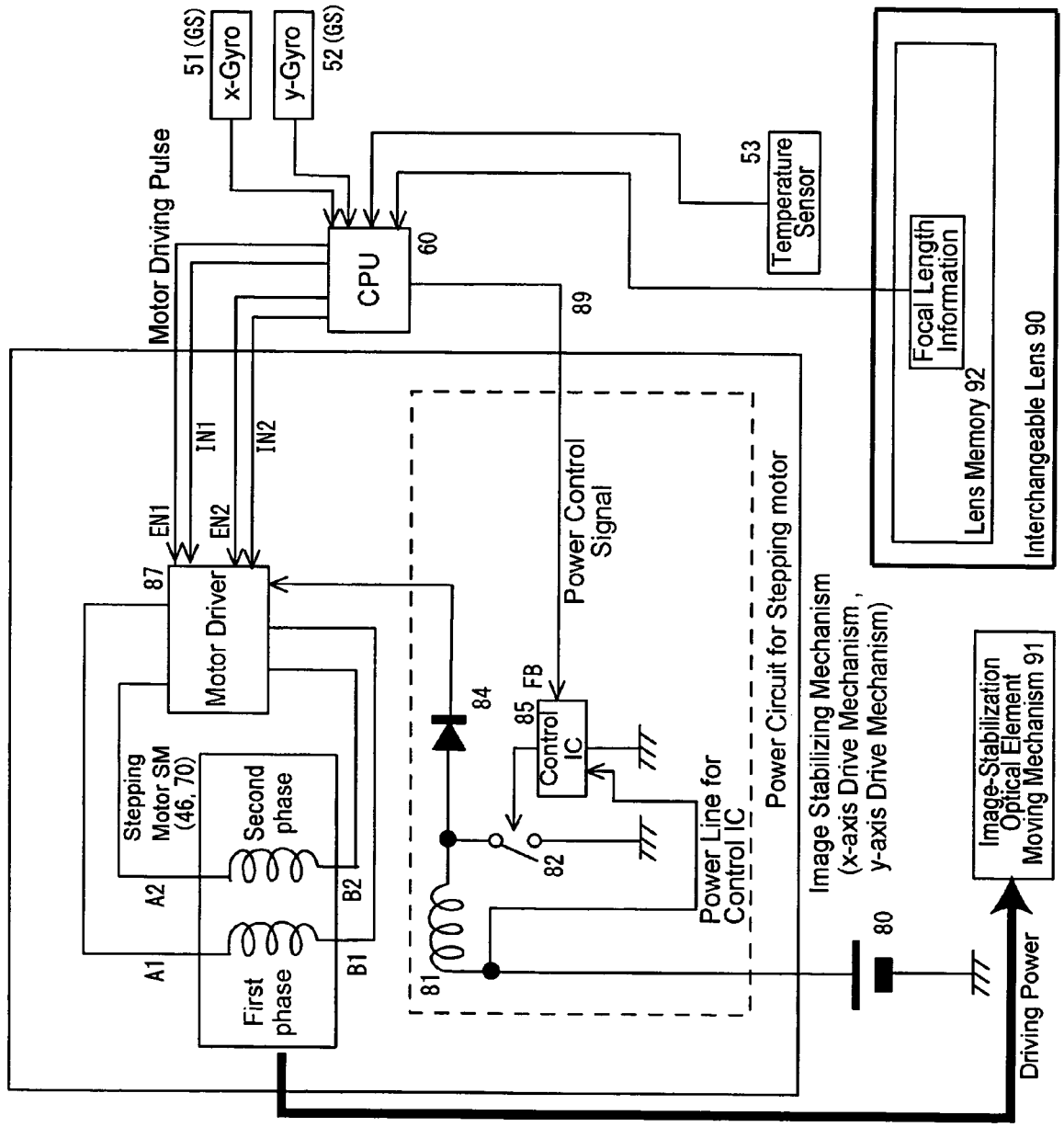
FIG. 35 is a schematic block diagram of an embodiment of a type of power circuit which corresponds to the type of power circuit shown in FIG. 25 in the case using a fixed-focal-length interchangeable lens.

FIGS. 34 and 35 show two types of power circuits, each of which is designed for a fixed-focal-length interchangeable lens as a photographing optical system of an imaging device. The components of the circuit shown in FIG. 34 correspond to those of the circuit shown in FIG. 22 and the components of the circuit shown in FIG. 35 correspond to those of the circuit shown in FIG. 25. In each of FIGS. 34 and 35, a portion thereof which is enclosed by a rectangle with a solid line corresponds to a fixed-focal-length interchangeable lens 90. A camera body (not shown) is provided therein with an image-stabilization optical element moving mechanism 91 which supports the image shake counteracting optical elements OV (which serve as elements of a photographing optical system) in a manner to allow the image shake counteracting optical elements OV to be movable in a plane orthogonal to the optical axis Z1. The driving power of the stepping motor SM is transferred to the image-stabilization optical element moving mechanism 91. The fixed-focal-length interchangeable lens 90 is provided therein with a lens memory 92. The lens memory 92 stores information (focal length information) on the focal length of the interchangeable lens 90. This focal length information is sent to the CPU 60 via connectors (not shown) provided between the interchangeable lens 90 and the camera body upon the interchangeable lens 90 being mounted to the camera body. Thereafter, the CPU 60 sets the driving power for the stepping motor SM at an optimum power level for the interchangeable lens 90 and drives the stepping motor SM at the set driving power to perform an image stabilizing operation. Specific examples of this technique of setting the driving power for the stepping motor SM have been described above and will not be discussed hereinafter.

Although the present invention has been described based on the above illustrated embodiments, the present invention is not limited solely to these particular embodiments. For instance, although in the illustrated embodiments, the CCD holder 30 including the CCD 13g is driven in the x-axis direction and the y-axis direction to counteract image shake, the optical elements driven for image stabilization can be alternatively a lens group including no image sensor.

The present invention can be applied to not only a camera such as the above illustrated embodiment but also to another type of optical instrument such as a pair of binoculars.

Although FIGS. 22 and 25 each show an embodiment of a step-up power circuit, a step-down power circuit can be used instead.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An optical image stabilizer comprising:
    an optical system including at least one image shake counteracting optical element movable in a plane orthogonal to an optical axis;
    at least one stepping motor for moving said image shake counteracting optical element in said plane;
    at least one shake velocity sensor which senses the speed of shake applied to said optical system; and
    a controller which calculates the number of driving pulses for said stepping motor based on shake speed information output from said shake velocity sensor, and drives said stepping motor so that said image shake counteracting optical element moves in said plane to counteract image shake on an imaging surface of said optical system,
    wherein said controller changes power supplied to said stepping motor in accordance with said shake speed information during a single period in which said controller is continuously driving said stepping motor to supply power.

2. The optical image stabilizer according to claim 1, wherein said controller changes a driving voltage for said stepping motor in accordance with said shake speed information that is output from said shake velocity sensor.

3. The optical image stabilizer according to claim 1, wherein said controller changes a pulse width of time-divided pulses obtained as a result of time-dividing each unit pulse in accordance with said shake speed information that is output from said shake velocity sensor.

4. The optical image stabilizer according to claim 1, wherein said controller changes a frequency of time-divided pulses obtained as a result of time-dividing each unit pulse in accordance with said shake speed information that is output from said shake velocity sensor.

5. The optical image stabilizer according to claim 1, further comprising a temperature sensor,
    wherein said controller changes said power supplied to said stepping motor in accordance with said shake speed information that is output from said shake velocity sensor and temperature information output from said temperature sensor.

6. The optical image stabilizer according to claim 1, wherein said shake velocity sensor comprises an angular velocity sensor.

7. The optical image stabilizer according to claim 1, wherein said stepping motor comprises a first stepping motor and a second stepping motor for moving said image shake counteracting optical element in said plane in two directions intersecting each other, respectively, and
    wherein said controller changes power supplied to each of said first stepping motor and said second stepping motor in accordance with said shake speed information that is output from said shake velocity sensor.

8. The optical image stabilizer according to claim 1, wherein said image shake counteracting optical element comprises an image sensor.

9. An optical image stabilizer comprising:
an optical system including at least one image shake counteracting optical element movable in a plane orthogonal to an optical axis;
at least one stepping motor for moving said image shake counteracting optical element in said plane;
at least one shake velocity sensor which senses the speed of shake applied to said optical system; and
a controller which calculates the number of driving pulses for said stepping motor based on shake speed information output from said shake velocity sensor, and drives said stepping motor so that said image shake counteracting optical element moves in said plane to counteract image shake on an imaging surface of said optical system,
wherein said controller changes power supplied to said stepping motor in accordance with the number of driving pulses for said stepping motor per unit of time during a single period in which said controller is continuously driving said stepping motor to supply power.

10. The optical image stabilizer according to claim 9, wherein said controller changes a driving voltage for said stepping motor in accordance with said number of driving pulses per unit of time.

11. The optical image stabilizer according to claim 9, wherein said controller changes a pulse width of time-divided pulses obtained as a result of time-dividing each unit pulse in accordance with said number of driving pulses per unit of time.

12. The optical image stabilizer according to claim 9, wherein said controller changes a frequency of time-divided pulses obtained as a result of time-dividing each unit pulse in accordance with said number of driving pulses per unit of time.

13. The optical image stabilizer according to claim 9, further comprising a temperature sensor,
wherein said controller changes said power supplied to said stepping motor in accordance with said number of driving pulses per unit of time and temperature information output from said temperature sensor.

14. The optical image stabilizer according to claim 9, wherein said shake velocity sensor comprises an angular velocity sensor.

15. The optical image stabilizer according to claim 9, wherein said stepping motor comprises a first stepping motor and a second stepping motor for moving said image shake counteracting optical element in said plane in two directions intersecting each other, respectively, and
wherein said controller changes power supplied to each of said first stepping motor and said second stepping motor in accordance with said number of driving pulses per unit of time.

16. The optical image stabilizer according to claim 9, wherein said image shake counteracting optical element comprises an image sensor.

17. A method of controlling an optical image stabilizer which moves at least one image shake counteracting optical element of an optical system in a plane orthogonal to an optical axis by at least one stepping motor in a manner so as to counteract image shake on an imaging surface of said optical system, wherein said method comprises:
detecting the speed of shake applied to said optical system;
setting a power level supplied to said stepping motor in accordance with information on said shake speed;
calculating the number of driving pulses for said stepping motor based on said information on said shake speed; and
driving said stepping motor at said power level,
wherein said power level supplied to said stepping motor is changed in accordance with said information on said shake speed during a single period in which power is continuously supplied to said stepping motor.

18. A method of controlling an optical image stabilizer which moves at least one image shake counteracting optical element of an optical system in a plane orthogonal to an optical axis by at least one stepping motor in a manner so as to counteract image shake on an imaging surface of said optical system, wherein said method comprises:
detecting the speed of shake applied to said optical system;
calculating the number of driving pulses for said stepping motor based on information on said shake speed;
setting a power level supplied to said stepping motor in accordance with said number of driving pulses per unit of time; and
driving said stepping motor at said power level,
wherein said power level supplied to said stepping motor is changed in accordance with said number of driving pulses per unit of time during a single period in which power is continuously supplied to said stepping motor.

19. An optical image stabilizer comprising:
an optical system including at least one image shake counteracting optical element movable in a plane orthogonal to an optical axis;
at least one stepping motor for moving said image shake counteracting optical element in said plane;
a controller which senses the speed of shake applied to said optical system, calculates the number of driving pulses for said stepping motor based on information on said shake speed, and drives said stepping motor so that said image shake counteracting optical element moves in said plane to counteract image shake on an imaging surface of said optical system; and
a focal length detector which detects a focal length of said optical system,
wherein said controller changes power supplied to said stepping motor in accordance with information on said focal length of said optical system, which is detected by said focal length detector, when driving said stepping motor.

20. The optical image stabilizer according to claim 19, wherein said controller changes a driving voltage for said stepping motor in accordance with said information on said focal length of said optical system.

21. The optical image stabilizer according to claim 19, wherein said controller changes a pulse width of time-divided pulses obtained as a result of time-dividing each unit pulse in accordance with said information on said focal length of said optical system.

22. The optical image stabilizer according to claim 19, wherein said controller changes a frequency of time-divided pulses obtained as a result of time-dividing each unit pulse in accordance with said information on said focal length of said optical system.

23. The optical image stabilizer according to claim 19, further comprising a temperature sensor,
wherein said controller changes said power supplied to said stepping motor in accordance with said information on said focal length of said optical system and temperature information output from said temperature sensor.

24. The optical image stabilizer according to claim 19, wherein said controller decreases said power supplied to said stepping motor as said focal length of said optical system becomes shorter.

25. The optical image stabilizer according to claim 19, wherein said optical system comprises a zoom lens.

26. The optical image stabilizer according to claim 19, wherein said optical system comprises a fixed-focal-length interchangeable lens selected from among a plurality of fixed-focal-length interchangeable lenses having different focal lengths.

27. The optical image stabilizer according to claim 19, wherein said stepping motor comprises a first stepping motor and a second stepping motor for moving said image shake counteracting optical element in said plane in two directions intersecting each other, respectively, and wherein said controller changes power supplied to each of said first stepping motor and said second stepping motor in accordance with said information on said focal length of said optical system.

28. The optical image stabilizer according to claim 27, wherein said image shake counteracting optical element comprises an image sensor.

29. A method of controlling an optical image stabilizer which moves at least one image shake counteracting optical element of an optical system in a plane orthogonal to an optical axis by at least one stepping motor in a manner so as to counteract image shake on an imaging surface of said optical system, wherein said method comprises:

detecting focal length of said optical system;

detecting the speed of shake applied to said optical system;

calculating the number of driving pulses for said stepping motor based on information on said shake speed and information on said focal length of said optical system;

setting a power level supplied to said stepping motor in accordance with said information on said focal length of said optical system when driving said stepping motor; and driving said stepping motor at said power level.

* * * * *